(12) United States Patent
Leafe et al.

(10) Patent No.: US 9,141,410 B2
(45) Date of Patent: Sep. 22, 2015

(54) PLUGGABLE ALLOCATION IN A CLOUD COMPUTING SYSTEM

(75) Inventors: Edward Leafe, San Antonio, TX (US); Alexander Walsh, Halifax (CA); Paul Voccio, Windcrest, TX (US); Antony Joel Messerli, San Antonio, TX (US); Charles B. Thier, San Antonio, TX (US); John A. Dickinson, Schertz, TX (US); Gregory Lee Holt, Hollywood Park, TX (US); Christopher James Behrens, Brentwood, CA (US); Trey Eugene Morris, Spring, TX (US); Matthew Charles Dietz, San Antonio, TX (US); Jason LuVern Kolker, Live Oak, TX (US); Ziad Sawalha, San Antonio, TX (US); Yogeshwar Srikrishnan, Selma, TX (US); William Randolph Mathews, IV, San Antonio, TX (US); Vishvananda Ishaya, San Francisco, CA (US)

(73) Assignee: Rackspace US, Inc., San Antonio, TX (US)

( * ) Notice: Subject to any disclaimer, the term of this patent is extended or adjusted under 35 U.S.C. 154(b) by 521 days.

(21) Appl. No.: 13/478,608

(22) Filed: May 23, 2012

(65) Prior Publication Data

US 2012/0233668 A1 Sep. 13, 2012

Related U.S. Application Data

(63) Continuation-in-part of application No. 13/422,135, filed on Mar. 16, 2012, and a continuation-in-part of application No. 13/089,442, filed on Apr. 19, 2011, now Pat. No. 8,538,926, application No. 13/478,608, (Continued)

(51) Int. Cl.
*G06F 15/16* (2006.01)
*G06F 15/173* (2006.01)
(Continued)

(52) U.S. Cl.
CPC .......... *G06F 9/44526* (2013.01); *G06F 9/5022* (2013.01); *G06F 21/6218* (2013.01); *G06F 2221/2137* (2013.01)

(58) Field of Classification Search
CPC ... G06F 9/5077; G06F 9/45533; G06F 9/505; G06F 9/5055; G06F 9/5061; G06F 9/5066; G06F 9/5072; G06F 9/44526; G06F 9/45558; G06F 9/5027; G06F 21/6218; G06F 2221/2137; G06F 2221/2141; H04L 63/0227; H04L 63/20; H04L 63/0815; H04L 63/0272; H04L 63/0884; H04L 63/00; H04L 63/0209; H04L 63/0428; H04L 63/164; H04L 63/18; H04L 67/1097; H04L 67/16; H04L 67/02; H04L 67/10; H04L 67/2842; H04L 67/34; H04L 67/1095; H04L 67/26; H04L 67/2814; H04L 67/327; H04L 12/4641; H04L 12/4625; H04L 12/04
USPC ......... 709/201, 217, 218, 219, 220, 221, 222, 709/223, 224, 225, 226, 227; 718/1, 104, 718/105; 370/395.53, 401; 707/827, 623, 707/634, 639, 648, 661, 803, E17.005, 707/E17.032, E17.044; 726/4, 8, 11, 122, 726/23, 26
See application file for complete search history.

(56) References Cited

U.S. PATENT DOCUMENTS 7,644,161 B1 1/2010 Graupner
8,141,090 B1 3/2012 Graupner et al.
(Continued)

OTHER PUBLICATIONS

International Search Report and Written Opinion issued for PCT/US2013/030469 dated Jul. 2, 2013, 10 pages.
(Continued)

*Primary Examiner* — Saket K Daftuar
(74) *Attorney, Agent, or Firm* — Haynes and Boone, LLP

(57) ABSTRACT

In one embodiment, a cloud computing system provides user extensibility by providing a plugin interface for major systems. Plugin interfaces for a compute service, object service, network service, authentication and authorization service, message service, and image service are disclosed. One or more of the plugin interfaces can be used to alter the allocation of virtual to physical resources across multiple services. Compound services and smart allocation facilities are possible with user-directed modification.

18 Claims, 19 Drawing Sheets

Related U.S. Application Data which is a continuation-in-part of application No. 13/270,737, filed on Oct. 11, 2011, which is a continuation-in-part of application No. 13/367,481, filed on Feb. 7, 2012.

(60) Provisional application No. 61/450,166, filed on Mar. 8, 2011, provisional application No. 61/480,784, filed on Apr. 29, 2011, provisional application No. 61/479,294, filed on Apr. 26, 2011.

(51) Int. Cl.
*G06F 9/445* (2006.01)
*G06F 9/50* (2006.01)
*G06F 21/62* (2013.01)

(56) References Cited

U.S. PATENT DOCUMENTS

| | | | |
|---|---|---|---|
| 8,514,868 B2 * | 8/2013 | Hill | 370/401 |
| 8,578,076 B2 * | 11/2013 | van der Linden et al. | 710/72 |
| 8,607,054 B2 * | 12/2013 | Ramarathinam et al. | 713/172 |
| 8,656,019 B2 * | 2/2014 | Chikando et al. | 709/226 |
| 8,667,574 B2 * | 3/2014 | Piazza et al. | 726/11 |
| 8,782,637 B2 * | 7/2014 | Khalid | 718/1 |
| 8,805,951 B1 * | 8/2014 | Faibish et al. | 709/213 |
| 2002/0087611 A1 | 7/2002 | Tanaka et al. | |
| 2005/0050545 A1 | 3/2005 | Moakley | |
| 2005/0081208 A1 | 4/2005 | Gargya | |
| 2008/0163206 A1 | 7/2008 | Nair | |
| 2009/0287772 A1 * | 11/2009 | Stone et al. | 709/203 |
| 2010/0027552 A1 * | 2/2010 | Hill | 370/401 |
| 2010/0223385 A1 | 9/2010 | Gulley | |
| 2011/0022812 A1 * | 1/2011 | van der Linden et al. | 711/163 |
| 2011/0055215 A1 | 3/2011 | Uppala | |
| 2011/0131504 A1 * | 6/2011 | Shustef | 715/745 |
| 2011/0153824 A1 * | 6/2011 | Chikando et al. | 709/226 |
| 2011/0185063 A1 | 7/2011 | Head | |
| 2011/0276673 A1 * | 11/2011 | Piazza et al. | 709/223 |
| 2011/0289520 A1 * | 11/2011 | Grigoriev et al. | 719/331 |
| 2011/0307889 A1 * | 12/2011 | Moriki et al. | 718/1 |
| 2012/0005263 A1 * | 1/2012 | McWhirter et al. | 709/203 |
| 2012/0054265 A1 * | 3/2012 | Kazerani et al. | 709/203 |
| 2012/0054266 A1 * | 3/2012 | Kazerani et al. | 709/203 |
| 2012/0096271 A1 * | 4/2012 | Ramarathinam et al. | 713/172 |
| 2012/0144034 A1 * | 6/2012 | McCarty | 709/225 |
| 2012/0203908 A1 * | 8/2012 | Beaty et al. | 709/226 |
| 2012/0204169 A1 * | 8/2012 | Breiter et al. | 717/171 |
| 2012/0204187 A1 * | 8/2012 | Breiter et al. | 718/105 |

OTHER PUBLICATIONS

International Search Report and Written Opinion issued for PCT/US2013/024751 dated Jul. 16, 2013, 13 pages.

Anonymous, "Introduction to Parallel Computing", Internet Citation, http://web.archive.org/web/20041011094500/http://www.llnl.gov/computing/tutorials/parallel_comp/ dated Oct. 11, 2004, 32 pgs.

Grama et al., "Introduction to Parallel Computing, Principles of Parallel Algorithm Design", $2^{nd}$ Edition, Prentice Hall, Jan. 1, 2003, 39 pgs.

Graupner et al., "Adaptive Control System for Server Groups in Enterprise Data Centers", 2004 IEEE International Symposium on Cluster Computing and the Grid, Copyright Hewlett-Packard 2003, 9 pgs.

* cited by examiner

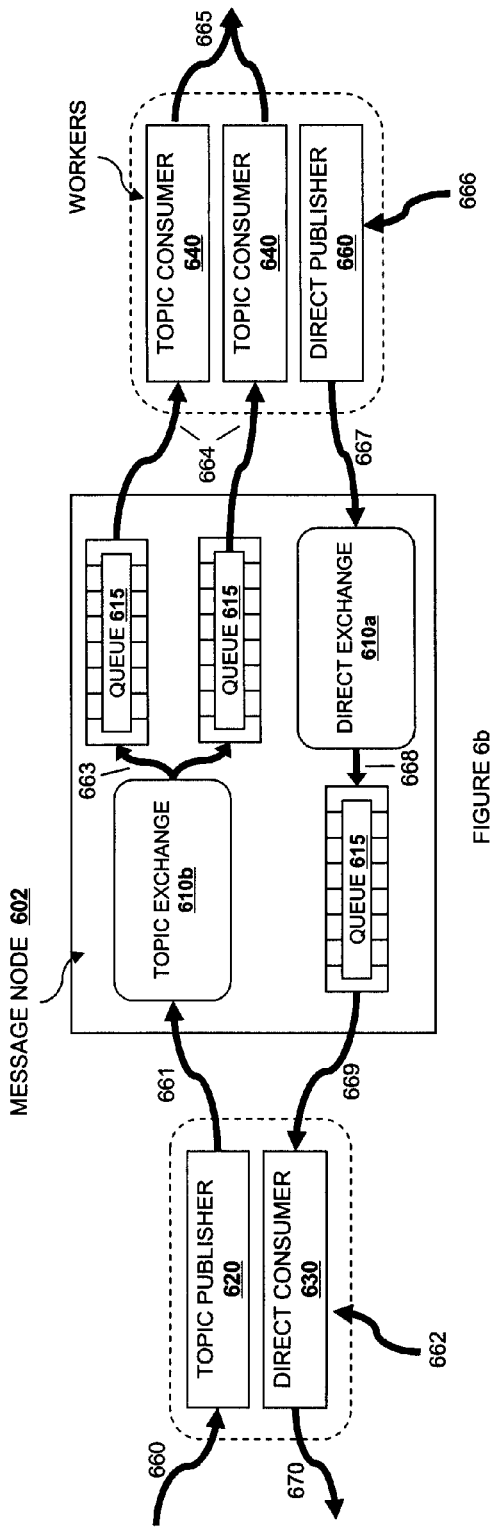
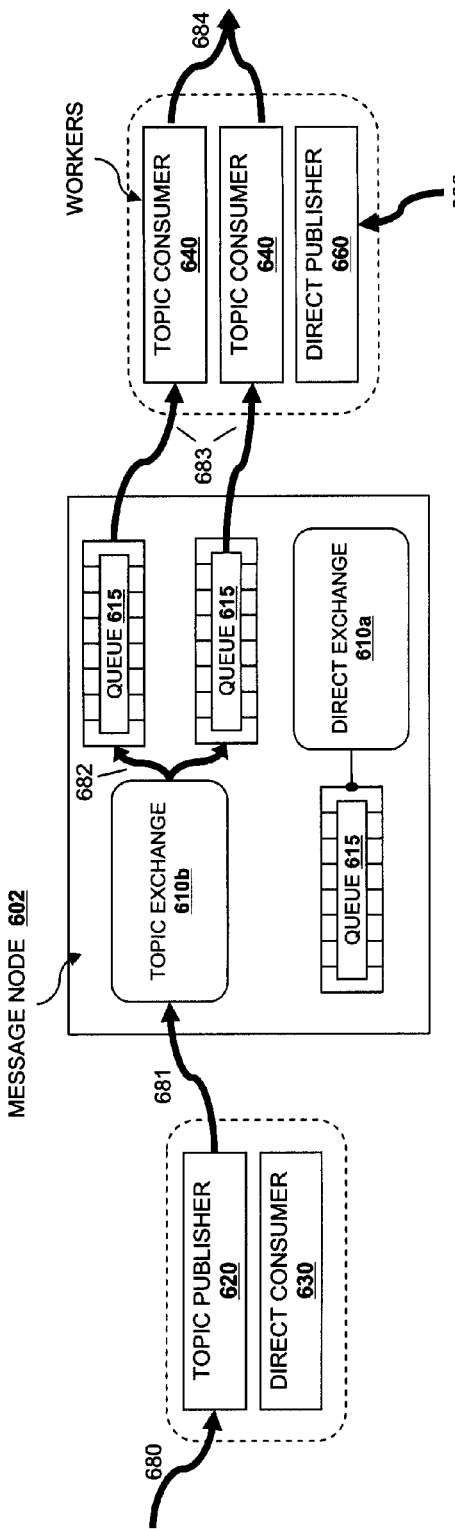
FIGURE 6b
FIGURE 6c

PLUGGABLE ALLOCATION IN A CLOUD COMPUTING SYSTEM

The present application claims benefit of the following U.S. non-provisional patent applications as a continuation-in-part: Ser. No. 13/422,135, filed Mar. 16, 2012, entitled "Method and System for Utilizing Spare Cloud Resources;" Ser. No. 13/089,442 filed Apr. 19, 2011, entitled "Massively Scalable Object Storage System, which claims priority to U.S. provisional patent application 61/450,166, filed Mar. 8, 2011, entitled "Massively Scalable File Storage System;" Ser. No. 13/270,737 filed Oct. 11, 2011, entitled "Method and System for Transferring a Virtual Machine, which claims priority to U.S. provisional patent application 61/480,784 filed Apr. 29, 2011, entitled "Hypervisor Agnostic Method to Persist and Backup Virtual Machine Configurations, U.S. provisional patent application 61/479,294 filed Apr. 26, 2011, entitled "Massively Scalable Server System, and U.S. provisional patent application 61/450,166 filed Mar. 8, 2011, entitled "Massively Scalable File Storage System;" and Ser. No. 13/367,481 filed Feb. 7, 2012, entitled "Elastic, Massively Parallel Processing Data Warehouse." The entirety of these disclosures is hereby incorporated by reference.

BACKGROUND

The present disclosure relates generally to cloud computing, and more particularly to a customizable multi-vendor, multi-tenant cloud computing system.

Cloud computing services can provide computational capacity, data access, networking/routing and storage services via a large pool of shared resources operated by a cloud computing provider. Because the computing resources are delivered over a network, cloud computing is location-independent computing, with all resources being provided to end-users on demand with control of the physical resources separated from control of the computing resources.

Originally the term cloud came from a diagram that contained a cloud-like shape to contain the services that afforded computing power that was harnessed to get work done. Much like the electrical power we receive each day, cloud computing is a model for enabling access to a shared collection of computing resources—networks for transfer, servers for storage, and applications or services for completing work. More specifically, the term "cloud computing" describes a consumption and delivery model for IT services based on the Internet, and it typically involves over-the-Internet provisioning of dynamically scalable and often virtualized resources. This frequently takes the form of web-based tools or applications that users can access and use through a web browser as if it was a program installed locally on their own computer. Details are abstracted from consumers, who no longer have need for expertise in, or control over, the technology infrastructure "in the cloud" that supports them. Most cloud computing infrastructures consist of services delivered through common centers and built on servers. Clouds often appear as single points of access for consumers' computing needs, and do not require end-user knowledge of the physical location and configuration of the system that delivers the services.

The utility model of cloud computing is useful because many of the computers in place in data centers today are underutilized in computing power and networking bandwidth. People may briefly need a large amount of computing capacity to complete a computation for example, but may not need the computing power once the computation is done. The cloud computing utility model provides computing resources on an on-demand basis with the flexibility to bring it up or down through automation or with little intervention.

As a result of the utility model of cloud computing, there are a number of aspects of cloud-based systems that can present challenges to existing application infrastructure. First, clouds should enable self-service, so that users can provision servers and networks with little human intervention. Second, network access; because computational resources are delivered over the network, the individual service endpoints need to be network-addressable over standard protocols and through standardized mechanisms. Third, multi-tenancy. Clouds are designed to serve multiple consumers according to demand, and it is important that resources be shared fairly and that individual users not suffer performance degradation. Fourth, elasticity. Clouds are designed for rapid creation and destruction of computing resources, typically based upon virtual containers. Provisioning these different types of resources must be rapid and scale up or down based on need. Further, the cloud itself as well as applications that use cloud computing resources must be prepared for impermanent, fungible resources; application or cloud state must be explicitly managed because there is no guaranteed permanence of the infrastructure. Fifth, clouds typically provide metered or measured service—like utilities that are paid for by the hour, clouds should optimize resource use and control it for the level of service or type of servers such as storage or processing.

Cloud computing offers different service models depending on the capabilities a consumer may require, including SaaS, PaaS, and IaaS-style clouds. SaaS (Software as a Service) clouds provide the users the ability to use software over the network and on a distributed basis. SaaS clouds typically do not expose any of the underlying cloud infrastructure to the user. PaaS (Platform as a Service) clouds provide users the ability to deploy applications through a programming language or tools supported by the cloud platform provider. Users interact with the cloud through standardized APIs, but the actual cloud mechanisms are abstracted away. Finally, IaaS (Infrastructure as a Service) clouds provide computer resources that mimic physical resources, such as computer instances, network connections, and storage devices. The actual scaling of the instances may be hidden from the developer, but users are required to control the scaling infrastructure.

One way in which different cloud computing systems may differ from each other is in how they deal with control of the underlying hardware and privacy of data. The different approaches are sometimes referred to a "public clouds," "private clouds," "hybrid clouds," and "multi-vendor clouds." A public cloud has an infrastructure that is available to the general public or a large industry group and is likely owned by a cloud services company. A private cloud operates for a single organization, but can be managed on-premise or off-premise. A hybrid cloud can be a deployment model, as a composition of both public and private clouds, or a hybrid model for cloud computing may involve both virtual and physical servers. A multi-vendor cloud is a hybrid cloud that may involve multiple public clouds, multiple private clouds, or some mixture.

Because the flow of services provided by the cloud is not directly under the control of the cloud computing provider, cloud computing requires the rapid and dynamic creation and destruction of computational units, frequently realized as virtualized resources. Maintaining the reliable flow and delivery of dynamically changing computational resources on top of a pool of limited and less-reliable physical servers provides unique challenges. Accordingly, it is desirable to provide a better-functioning cloud computing system with superior operational capabilities.

There are existing cloud computing systems being offered in the market, but the underlying workings of these systems are opaque and not modifiable by the end-user or by a reseller of cloud services. Each one of these systems has a number of underlying operational parameters that are fixed and considered "optimal" by the cloud computing provider relative to the underlying constraints of their existing system and their existing client load. To the extent that these operational parameters are changed over time, the changes are meant to optimize the running of the system within a single operational context—that of the cloud service provider.

It is well-known, however, that workloads vary between individuals, between customers, and over time, and that a "general purpose" architecture is frequently worse than a special-purpose architecture where the operational parameters have been chosen to emphasize performance in one particular area. A closed cloud system is of necessity general purpose, or at minimum more general-purpose than a system modified for a single customer workload. It is possible, though, to use an open and pluggable system to allow end-users to modify the internal parameters of the cloud system to address particularized and special-purpose use cases, and thus allow for both general-purpose applicability and special-purpose performance.

BRIEF DESCRIPTION OF THE DRAWINGS

FIG. 6b is a diagram showing how a directed message is sent using the message service according to various embodiments.

FIG. 6c is a diagram showing how a broadcast message is sent using the message service according to various embodiments.

DETAILED DESCRIPTION

The following disclosure has reference to computing services delivered on top of a cloud architecture.

Figure 1:
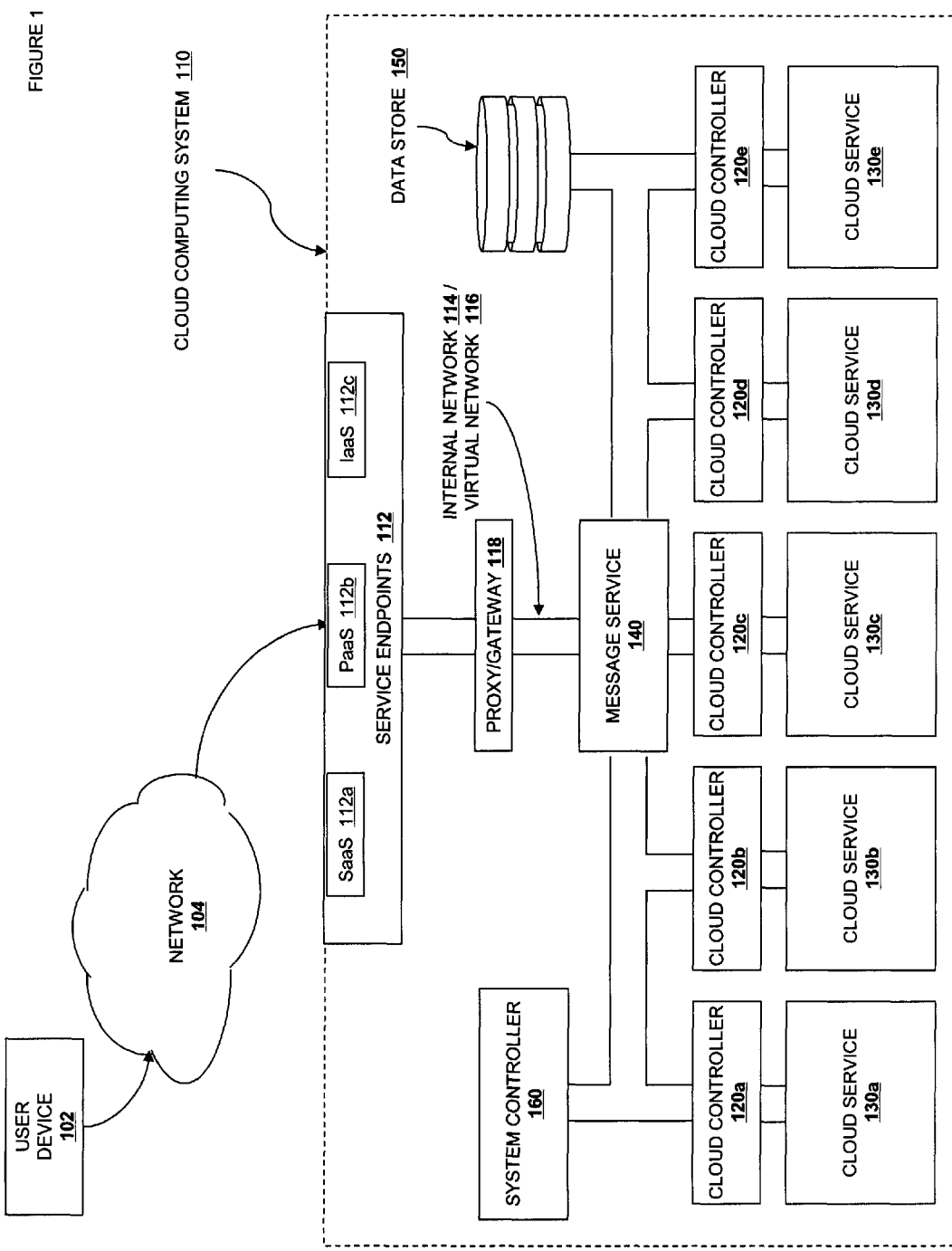
FIG. 1 is a schematic view illustrating an external view of a cloud computing system.

Referring now to FIG. 1, an external view of one embodiment of a cloud computing system 100 is illustrated. The object storage service 100 includes a user device 102 connected to a network 104 such as, for example, a Transport Control Protocol/Internet Protocol (TCP/IP) network (e.g., the Internet.) The user device 102 is coupled to the cloud computing system 110 via one or more service endpoints 112. Depending on the type of cloud service provided, these endpoints give varying amounts of control relative to the provisioning of resources within the cloud computing system 110. For example, SaaS endpoint 112a will typically only give information and access relative to the application running on the cloud storage system, and the scaling and processing aspects of the cloud computing system will be obscured from the user. PaaS endpoint 112b will typically give an abstract Application Programming Interface (API) that allows developers to declaratively request or command the backend storage, computation, and scaling resources provided by the cloud, without giving exact control to the user. IaaS endpoint 112c will typically provide the ability to directly request the provisioning of resources, such as computation units (typically virtual machines), software-defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions. This allows the cloud computing system 110 to be used for new, user-defined services without requiring specific support.

It is important to recognize that the control allowed via an IaaS endpoint is not complete. Within the cloud computing system 110 are one more cloud controllers 120 (running what is sometimes called a "cloud operating system") that work on an even lower level, interacting with physical machines, managing the contradictory demands of the multi-tenant cloud computing system 110. The workings of the cloud controllers 120 are typically not exposed outside of the cloud computing system 110, even in an IaaS context. In one embodiment, the commands received through one of the service endpoints 112 are then routed via one or more internal networks 114. The internal network 114 couples the different services to each other. The internal network 114 may encompass various protocols or services, including but not limited to electrical, optical, or wireless connections at the physical layer; Ethernet, Fibre channel, ATM, and SONET at the MAC layer; TCP, UDP, ZeroMQ or other services at the connection layer; and XMPP, HTTP, AMPQ, STOMP, SMS, SMTP, SNMP, or other standards at the protocol layer. The internal network 114 is typically not exposed outside the cloud computing system, except to the extent that one or more virtual networks 116 may be exposed that control the internal routing according to various rules. The virtual networks 116 typically do not expose as much complexity as may exist in the actual internal network 114; but varying levels of granularity can be exposed to the control of the user, particularly in IaaS services.

In one or more embodiments, it may be useful to include various processing or routing nodes in the network layers 114 and 116, such as proxy/gateway 118. Other types of processing or routing nodes may include switches, routers, switch fabrics, caches, format modifiers, or correlators. These processing and routing nodes may or may not be visible to the outside. It is typical that one level of processing or routing nodes may be internal only, coupled to the internal network 114, whereas other types of network services may be defined by or accessible to users, and show up in one or more virtual networks 116. Either of the internal network 114 or the virtual networks 116 may be encrypted or authenticated according to the protocols and services described below.

In various embodiments, one or more parts of the cloud computing system 110 may be disposed on a single host. Accordingly, some of the "network" layers 114 and 116 may be composed of an internal call graph, inter-process communication (IPC), or a shared memory communication system.

Once a communication passes from the endpoints via a network layer 114 or 116, as well as possibly via one or more switches or processing devices 118, it is received by one or more applicable cloud controllers 120. The cloud controllers 120 are responsible for interpreting the message and coordinating the performance of the necessary corresponding services, returning a response if necessary. Although the cloud controllers 120 may provide services directly, more typically the cloud controllers 120 are in operative contact with the service resources 130 necessary to provide the corresponding services. For example, it is possible for different services to be provided at different levels of abstraction. For example, a "compute" service 130a may work at an IaaS level, allowing the creation and control of user-defined virtual computing resources. In the same cloud computing system 110, a PaaS-level object storage service 130b may provide a declarative storage API, and a SaaS-level Queue service 130c, DNS service 130d, or Database service 130e may provide application services without exposing any of the underlying scaling or computational resources. Other services are contemplated as discussed in detail below.

In various embodiments, various cloud computing services or the cloud computing system itself may require a message passing system. The message routing service 140 is available to address this need, but it is not a required part of the system architecture in at least one embodiment. In one embodiment, the message routing service is used to transfer messages from one component to another without explicitly linking the state of the two components. Note that this message routing service 140 may or may not be available for user-addressable systems; in one preferred embodiment, there is a separation between storage for cloud service state and for user data, including user service state.

In various embodiments, various cloud computing services or the cloud computing system itself may require a persistent storage for system state. The data store 150 is available to address this need, but it is not a required part of the system architecture in at least one embodiment. In one embodiment, various aspects of system state are saved in redundant databases on various hosts or as special files in an object storage service. In a second embodiment, a relational database service is used to store system state. In a third embodiment, a column, graph, or document-oriented database is used. Note that this persistent storage may or may not be available for user-addressable systems; in one preferred embodiment, there is a separation between storage for cloud service state and for user data, including user service state.

In various embodiments, it may be useful for the cloud computing system 110 to have a system controller 160. In one embodiment, the system controller 160 is similar to the cloud computing controllers 120, except that it is used to control or direct operations at the level of the cloud computing system 110 rather than at the level of an individual service.

For clarity of discussion above, only one user device 102 has been illustrated as connected to the cloud computing system 110, and the discussion generally referred to receiving a communication from outside the cloud computing system, routing it to a cloud controller 120, and coordinating processing of the message via a service 130, the infrastructure described is also equally available for sending out messages. These messages may be sent out as replies to previous communications, or they may be internally sourced. Routing messages from a particular service 130 to a user device 102 is accomplished in the same manner as receiving a message from user device 102 to a service 130, just in reverse. The precise manner of receiving, processing, responding, and sending messages is described below with reference to the various discussed service embodiments. One of skill in the art will recognize, however, that a plurality of user devices 102 may, and typically will, be connected to the cloud computing system 110 and that each element or set of elements within the cloud computing system is replicable as necessary. Further, the cloud computing system 110, whether or not it has one endpoint or multiple endpoints, is expected to encompass embodiments including public clouds, private clouds, hybrid clouds, and multi-vendor clouds.

Figure 2:
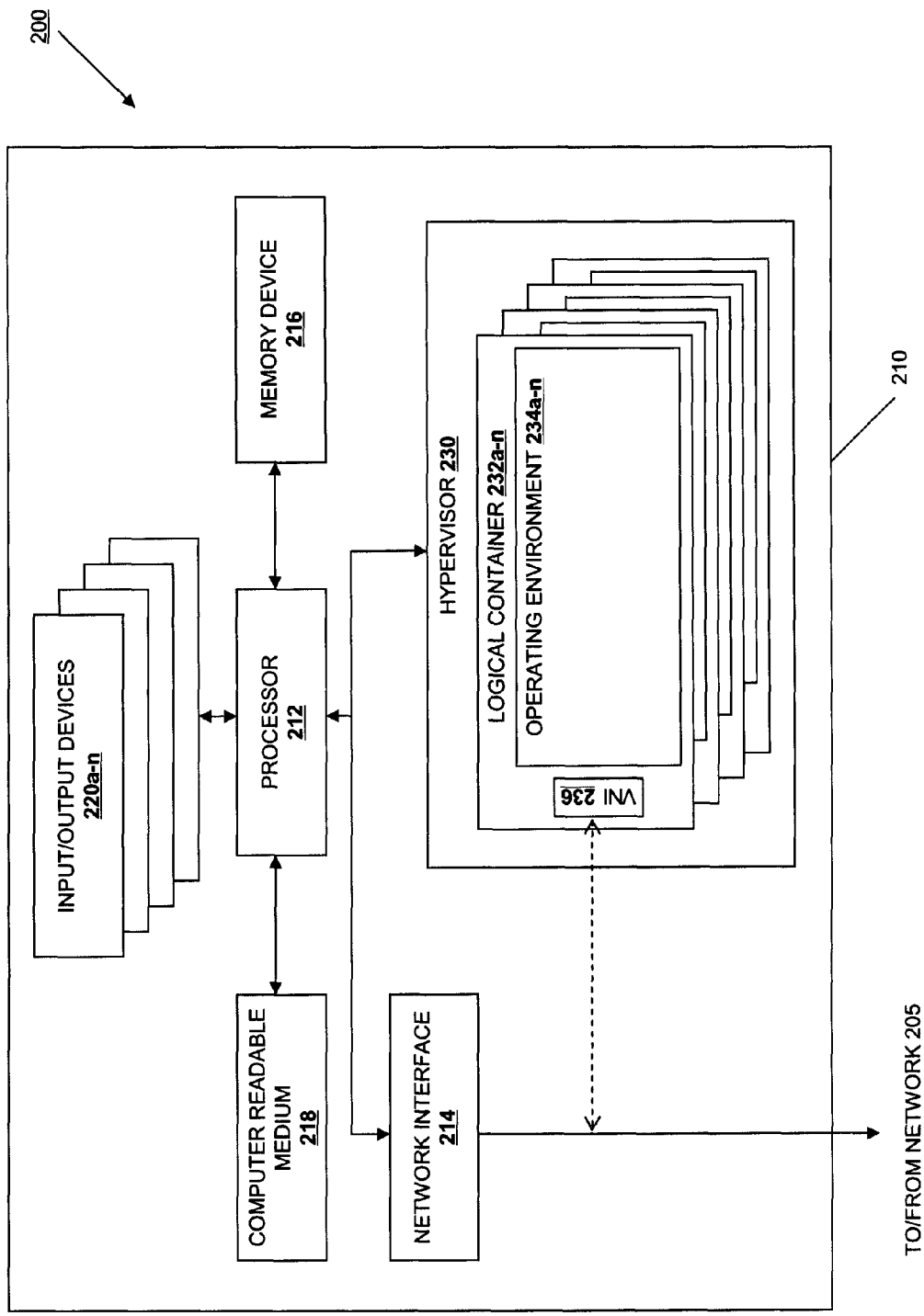
FIG. 2 is a schematic view illustrating an information processing system as used in various embodiments.

Each of the user device 102, the cloud computing system 110, the endpoints 112, the network switches and processing nodes 118, the cloud controllers 120 and the cloud services 130 typically include a respective information processing system, a subsystem, or a part of a subsystem for executing processes and performing operations (e.g., processing or communicating information). An information processing system is an electronic device capable of processing, executing or otherwise handling information, such as a computer. FIG. 2 shows an information processing system 210 that is representative of one of, or a portion of, the information processing systems described above.

Referring now to FIG. 2, diagram 200 shows an information processing system 210 configured to host one or more virtual machines, coupled to a network 205. The network 205 could be one or both of the networks 114 and 116 described above. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 210 shown is representative of, one of, or a portion of, the information processing systems described above.

The information processing system 210 may include any or all of the following: (a) a processor 212 for executing and otherwise processing instructions, (b) one or more network interfaces 214 (e.g., circuitry) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below.

In one embodiment, there is more than one network interface 214, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 210 may include a plurality of input/output devices 220*a-n* which are operably coupled to the processor 212, for inputting or outputting information, such as a display device 220*a*, a print device 220*b*, or other electronic circuitry 220*c-n* for performing other operations of the information processing system 210 known in the art.

With reference to the computer-readable media, including both memory device 216 and secondary computer-readable medium 218, the computer-readable media and the processor 212 are structurally and functionally interrelated with one another as described below in further detail, and information processing system of the illustrative embodiment is structurally and functionally interrelated with a respective computer-readable medium similar to the manner in which the processor 212 is structurally and functionally interrelated with the computer-readable media 216 and 218. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 200). Such interrelationships permit the data structures' functionality to be realized. For example, in one embodiment the processor 212 reads (e.g., accesses or copies) such functional descriptive material from the network interface 214, the computer-readable media 218 onto the memory device 216 of the information processing system 210, and the information processing system 210 (more particularly, the processor 212) performs its operations, as described elsewhere herein, in response to such material stored in the memory device of the information processing system 210. In addition to reading such functional descriptive material from the computer-readable medium 218, the processor 212 is capable of reading such functional descriptive material from (or through) the network 105. In one embodiment, the information processing system 210 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 210, without limiting them to a specific location or implementation.

The information processing system 210 includes a hypervisor 230. The hypervisor 230 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 218. The hypervisor may be included logically "below" a host operating system, as a host itself, as part of a larger host operating system, or as a program or process running "above" or "on top of" a host operating system. Examples of hypervisors include Xenserver, KVM, VMware, Microsoft's Hyper-V, and emulation programs such as QEMU.

The hypervisor 230 includes the functionality to add, remove, and modify a number of logical containers 232*a-n* associated with the hypervisor. Zero, one, or many of the logical containers 232*a-n* contain associated operating environments 234*a-n*. The logical containers 232*a-n* can implement various interfaces depending upon the desired characteristics of the operating environment. In one embodiment, a logical container 232 implements a hardware-like interface, such that the associated operating environment 234 appears to be running on or within an information processing system such as the information processing system 210. For example, one embodiment of a logical container 234 could implement an interface resembling an x86, x86-64, ARM, or other computer instruction set with appropriate RAM, busses, disks, and network devices. A corresponding operating environment 234 for this embodiment could be an operating system such as Microsoft Windows, Linux, Linux-Android, or Mac OS X. In another embodiment, a logical container 232 implements an operating system-like interface, such that the associated operating environment 234 appears to be running on or within an operating system. For example one embodiment of this type of logical container 232 could appear to be a Microsoft Windows, Linux, or Mac OS X operating system. Another possible operating system includes an Android operating system, which includes significant runtime functionality on top of a lower-level kernel. A corresponding operating environment 234 could enforce separation between users and processes such that each process or group of processes appeared to have sole access to the resources of the operating system. In a third environment, a logical container 232 implements a software-defined interface, such a language runtime or logical process that the associated operating environment 234 can use to run and interact with its environment. For example one embodiment of this type of logical container 232 could appear to be a Java, Dalvik, Lua, Python, or other language virtual machine. A corresponding operating environment 234 would use the built-in threading, processing, and code loading capabilities to load and run code. Adding, removing, or modifying a logical container 232 may or may not also involve adding, removing, or modifying an associated operating environment 234. For ease of explanation below, these operating environments will be described in terms of an embodiment as "Virtual Machines," or "VMs," but this is simply one implementation among the options listed above.

In one or more embodiments, a VM has one or more virtual network interfaces 236. How the virtual network interface is exposed to the operating environment depends upon the implementation of the operating environment. In an operating environment that mimics a hardware computer, the virtual network interface 236 appears as one or more virtual network interface cards. In an operating environment that appears as an operating system, the virtual network interface 236 appears as a virtual character device or socket. In an operating environment that appears as a language runtime, the virtual network interface appears as a socket, queue, message service, or other appropriate construct. The virtual network interfaces (VNIs) 236 may be associated with a virtual switch (Vswitch) at either the hypervisor or container level. The VNI 236 logically couples the operating environment 234 to the network, and allows the VMs to send and receive network traffic. In one embodiment, the physical network interface card 214 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

Figure 3:
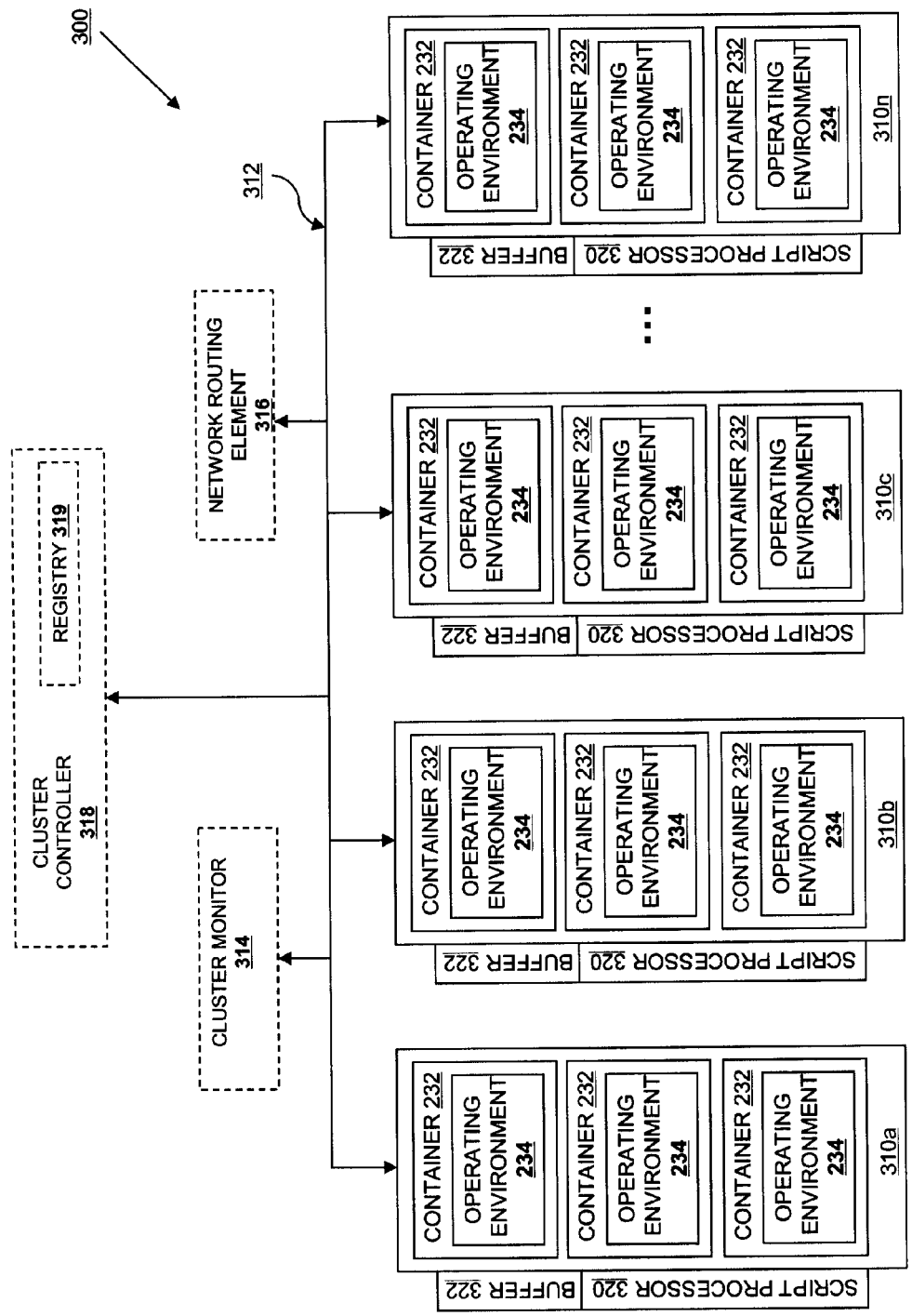
FIG. 3 is a virtual machine management system as used in various embodiments.

Turning now to FIG. 3, a simple network operating environment 300 for a cloud controller or cloud service is shown. The network operating environment 300 includes multiple information processing systems 310a-n, each of which correspond to a single information processing system 210 as described relative to FIG. 2, including a hypervisor 230, zero or more logical containers 232 and zero or more operating environments 234. The information processing systems 310a-n are connected via a communication medium 312, typically implemented using a known network protocol such as Ethernet, Fibre Channel, Infiniband, or IEEE 1394. For ease of explanation, the network operating environment 300 will be referred to as a "cluster," "group," or "zone" of operating environments. The cluster may also include a cluster monitor 314 and a network routing element 316. The cluster monitor 314 and network routing element 316 may be implemented as hardware, as software running on hardware, or may be implemented completely as software. In one implementation, one or both of the cluster monitor 314 or network routing element 316 is implemented in a logical container 232 using an operating environment 234 as described above. In another embodiment, one or both of the cluster monitor 314 or network routing element 316 is implemented so that the cluster corresponds to a group of physically co-located information processing systems, such as in a rack, row, or group of physical machines.

The cluster monitor 314 provides an interface to the cluster in general, and provides a single point of contact allowing someone outside the system to query and control any one of the information processing systems 310, the logical containers 232 and the operating environments 234. In one embodiment, the cluster monitor also provides monitoring and reporting capabilities.

The network routing element 316 allows the information processing systems 310, the logical containers 232 and the operating environments 234 to be connected together in a network topology. The illustrated tree topology is only one possible topology; the information processing systems and operating environments can be logically arrayed in a ring, in a star, in a graph, or in multiple logical arrangements through the use of vLANs.

In one embodiment, the cluster also includes a cluster controller 318. The cluster controller is outside the cluster, and is used to store or provide identifying information associated with the different addressable elements in the cluster—specifically the cluster generally (addressable as the cluster monitor 314), the cluster network router (addressable as the network routing element 316), each information processing system 310, and with each information processing system the associated logical containers 232 and operating environments 234.

The cluster controller 318 is outside the cluster, and is used to store or provide identifying information associated with the different addressable elements in the cluster—specifically the cluster generally (addressable as the cluster monitor 314), the cluster network router (addressable as the network routing element 316), each information processing system 310, and with each information processing system the associated logical containers 232 and operating environments 234. In one embodiment, the cluster controller 318 includes a registry of VM information 319. In a second embodiment, the registry 319 is associated with but not included in the cluster controller 318.

In one embodiment, the cluster also includes one or more instruction processors 320. In the embodiment shown, the instruction processor is located in the hypervisor, but it is also contemplated to locate an instruction processor within an active VM or at a cluster level, for example in a piece of machinery associated with a rack or cluster. In one embodiment, the instruction processor 320 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium. Further, one or more embodiments have associated with them a buffer 322. The buffer 322 can take the form of data structures, a memory, a computer-readable medium, or an off-script-processor facility. For example, one embodiment uses a language runtime as an instruction processor 320. The language runtime can be run directly on top of the hypervisor, as a process in an active operating environment, or can be run from a low-power embedded processor. In a second embodiment, the instruction processor 320 takes the form of a series of interoperating but discrete components, some or all of which may be implemented as software programs. For example, in this embodiment, an interoperating bash shell, gzip program, an rsync program, and a cryptographic accelerator chip are all components that may be used in an instruction processor 320. In another embodiment, the instruction processor 320 is a discrete component, using a small amount of flash and a low power processor, such as a low-power ARM processor. This hardware-based instruction processor can be embedded on a network interface card, built into the hardware of a rack, or provided as an add-on to the physical chips associated with an information processing system 310. It is expected that in many embodiments, the instruction processor 320 will have an integrated battery and will be able to spend an extended period of time without drawing current. Various embodiments also contemplate the use of an embedded Linux or Linux-Android environment.

In the disclosure that follows, the information processing devices as described relative to FIG. 2 and the clusters as described relative to FIG. 3 are used as underlying infrastructure to build and administer various cloud services. Except where noted specifically, either a single information processing device or a cluster can be used interchangeably to implement a single "node," "service," or "controller." Where a plurality of resources are described, such as a plurality of storage nodes or a plurality of compute nodes, the plurality of resources can be implemented as a plurality of information processing devices, as a one-to-one relationship of information processing devices, logical containers, and operating environments, or in an M×N relationship of information processing devices to logical containers and operating environments.

Various aspects of the services implemented in the cloud computing system may be referred to as "virtual machines" or "virtual devices"; as described above, those refer to a particular logical container and operating environment, configured to perform the service described. The term "instance" is sometimes used to refer to a particular virtual machine running inside the cloud computing system. An "instance type" describes the compute, memory and storage capacity of particular VM instances.

In various embodiments, groups of resources (information processing systems, logical containers, operating environments, users, accounts, etc.) may be organized into "zones." A zone is defined as a group of one or more resources that share one or more common characteristics and are grouped together to achieve some function. For example, one example of a zone is an availability zone, which is a group of resources subject to a correlated loss of access or data as a result of a particular event. For example, a group of operating environments that use a common underlying network connection, power connection, or computer-readable medium is subject to loss of access to its stored objects as a result of a failure of one of these resources. A group of resources in the same cluster may suffer a loss of access if the cluster is contained within a single physical building.

Zones may overlap and may be defined for different reasons. For example, a group of resources that share a computer-readable medium may be defined to be in one zone. A plurality of information processing devices 210 (and their underlying hypervisors 230, logical containers 232 and operating environments 234) in a given storage rack or cabinet may be defined to be in a zone, A plurality of information processing devices 210 (and their underlying hypervisors 230, logical containers 232 and operating environments 234) coupled to the same networking switch may be defined to be in a zone; and a plurality of information processing devices 210 (and their underlying hypervisors 230, logical containers 232 and operating environments 234), in a given datacenter may be defined to be in a zone.

In another embodiment, a zone is defined by the availability of specialized hardware or by hardware of a certain class. For example, a plurality of information processing devices 210 (and their underlying hypervisors 230, logical containers 232 and operating environments 234) that have access to high-throughput and low-latency storage, like a solid state disk, may be defined to be in a zone. Zones may be organized to reflect differing amounts of memory, processor speeds, age of installation, type of operating system or hypervisor, or any other underlying difference in platforms.

One of skill in the art will recognize that the examples of zones provided above are not limiting, and a variety of possible organizational schemes fall into the scope of the present disclosure.

Within the architecture described above, various services are provided, and different capabilities can be included through a plug-in architecture. Although specific services and plugins are detailed below, these disclosures are intended to be representative of the services and plugins available for integration across the entire cloud computing system 110.

Networking

Figure 4:
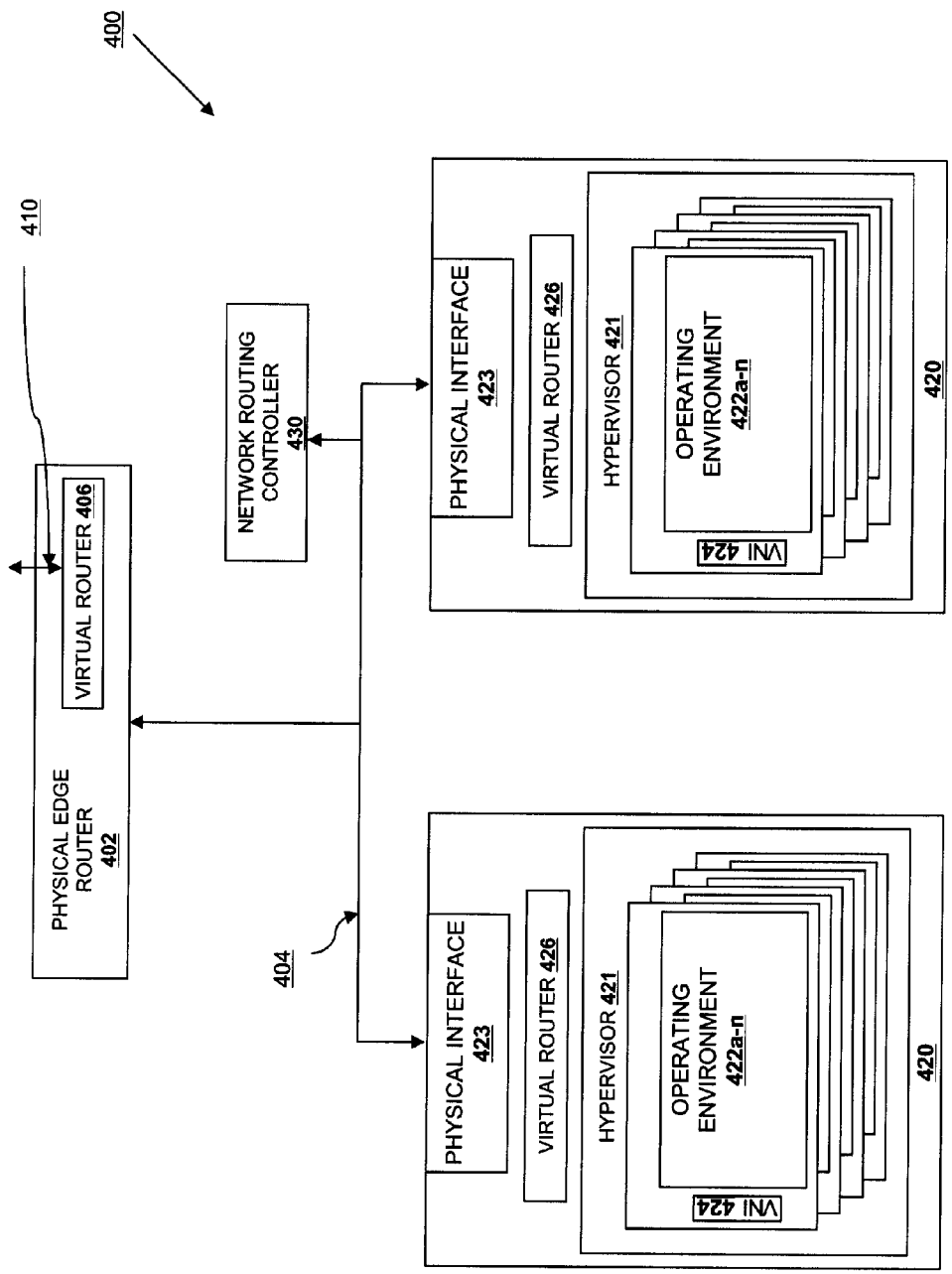
FIG. 4 is an IaaS-style network service according to various embodiments.

Referring now to FIG. 4, a diagram of an IaaS-style network service 400 is shown according to one embodiment. The network has one or more physical edge routers 402 which connect to the broader Internet. These edge routers 402 are connected to an underlying physical distribution network 404. The implementation of the physical distribution network 404 may encompass various protocols or services, including but not limited to electrical, optical, or wireless connections at the physical layer; Ethernet, Fibre channel, ATM, and SONET at the MAC layer; MPLS between layers 2 and 3, and TCP, UDP, ZeroMQ or other services at the connection layer. The physical distribution network 404 corresponds to the internal network 114 described relative to FIG. 1. The physical distribution network 404 is connected to physical interfaces 423 at each physical information processing system 420. The physical information processing systems 420 correspond to the information processing systems 210 as described relative to FIG. 2, with a hypervisor 421, and operating environments within logical containers 422, each of which with one or more virtual network interfaces (VNIs) 424.

On top of the physical distribution network is a virtual network service defining one or more virtual networks and virtual network devices. The virtual network service 400 corresponds to the virtual network 116 as describe relative to FIG. 1. The virtual network service 400 defines packet flows between hosts in the network and is used to logically route packets independent of the underlying physical infrastructure. In one embodiment, the virtual network service uses virtual routers 406 and 426 to define and manage these flows. Each virtual router (both virtual routers 406 and 426) have an API 410 that allows the routing tables, packet filters, and underlying logical network fabric to be remotely reconfigured. The virtual routers may be located in the physical edge routers 402, or within one of the information processing systems 420, within the hypervisor 421, within a particular operating environment 422, or at an outside network routing controller 430. These virtual network devices can work together to present multiple logical connections and networks that are independent from each other even though they are running on the same physical distribution network 404. Information from a particular flow is tunneled or bridged from one physical network segment to another or is kept logically connected by associating it with an ATM-like circuit or an MPLS-style label.

The virtual network service API 410 allows for creation and management of virtual networks each of which can have one or more ports. A port on a virtual network can be attached to a network interface, where a network interface is anything which can source traffic, such as physical interface 423 or one of the VNIs 424.

The API 410 allows users of the network as well as cloud administrators to declaratively define a network architecture including a series of virtual connections, routing rules, and filters. The VNIs 424 are then able to interact with the virtual network in the same way as a physical network without needing to also configure the underlying physical distribution network 404. Adapters are used to bridge between the virtual network devices and the physical devices without exposing the way in which the physical devices are actually connected.

In one embodiment, this is done by using programmable kernel bridges. A network device is instantiated within an operating system to communicate with physical interface 423 operating over a defined protocol, such as Ethernet or MPLS. A VNI 424 is also defined by the operating system. While the VNI 424 will often be associated with an operating environment, logical container, or virtual machine, those of skill in the art will recognize that VNIs 424 can be created as pure abstractions to help administer or logically control the network flows. Finally, one or more kernel bridges are defined routing the layer 2 packets from the physical network interface 423 to one or more VNIs 424. The raw packets arriving on the physical interface 423 are routed according to the established bridges and then used by the operating environments, hypervisor, or physical device.

Because the connections across the kernel bridges are software-defined and completely arbitrary, the routing fabric associated with a particular physical network interface 423 can be reconfigured by changing the bridges associated with that interface. On a more fine-grained level, the routing between VNIs 424 is also software-defined, making the flows across the VNIs 424 similarly malleable to software manipulation via the API 410.

In a further embodiment, an entire flow coming off of a physical network interface 423 or a flow coming off of a VNI 424 can be filtered, diverted, or inspected independently. In this way, advanced networking functionality such as load balancing, firewalls, layer 7 routing, and geographic routing can be accomplished in a multi-tenant environment. One implementation of this uses standard networking utilities. The physical network device 423 and the VNIs 424, while different to the kernel, expose a standard network or socket API to upper-level layers and applications. Accordingly, a standard firewall is able to filter the packets and send them on without being aware that the packets being filtered are arriving over a virtual network interface instead of a physical one.

In another embodiment, the packet-routing logic within the cloud system as a whole can be centrally directed using network routing controller 430. In standard networks, each router has an independent routing table and seeks to find the best route for each packet that arrives by examining its existing routing tables and probing the network around it using various protocols adapted for that purpose. The network service 400 can work identically to standard networks in this respect, but the ability to dynamically sense and control the flows using API 410 allows routing decisions to be made centrally when that makes more sense. Network routing controller 430 may, for example, control the routing across virtual routers 406 and 426 to direct traffic in a way that may not be locally optimal but provides for greater global throughput and higher overall utilization.

To accommodate these use cases, one embodiment of the virtual network service 400 provides a plug-in architecture allowing entry routing (controlled by virtual router 406), overall network routing (controlled by the network routing controller 430 or by the combination of virtual routers) or any particular router 426 to have a tenant-defined flow routing and filtering policy. For example, one plugin allows a tenant-specific security policy to be implemented on a flow. In this embodiment, a virtual router 426 is instantiated for use by a particular user (the "user router"). The user router can be implemented in the hypervisor 421 or in a distinct operating environment 422. The user router has an API 410, just like the other virtual routers 426. In one embodiment, routing rules can be set using the API 410. In a second embodiment, a series of rules can be provided and loaded by the user router 426. This loadable ruleset can be implemented using a dynamically loadable or runnable program that has a series of expected inputs and provides its information on a defined series of outputs. In one embodiment these are "stdin" and "stdout." In a second embodiment, these are provided as function calls within a program module. When a packet arrives at edge router 402, the virtual router 406 identifies it as being logically addressed to a particular operating environment associated with the user and routes it to flow to the defined user router 426 instantiated for the customer by way of the physical interface 423 and possibly other virtual routers 426 along the way. When the packet arrives at user router 426, the tenant-defined rules and filters are applied to the packet and the flow is stopped, edited, or redirected accordingly.

A second embodiment allows QoS policies to be implemented on a flow. As noted above, a centralized routing policy allows global maximization of network utilization. In this embodiment, a user-defined network routing controller 430 (the "user controller") is defined, or a plug-in or ruleset is loaded into a system-wide network routing controller using the same functionality described above. When a high-priority packet arrives or is sent, the user controller can route other packets on less-speedy routes and keep the most direct route free for high-priority packets. In this way the delay on best-effort packets is due mostly to a higher number of hops as opposed to rate limiting; each individual router (either physical or virtual) is operating at its peak capacity. The load is managed by virtually spreading out the number of routers handling packets rather than by limiting the numbers of packets being routed at a particular node.

Figure 5A:
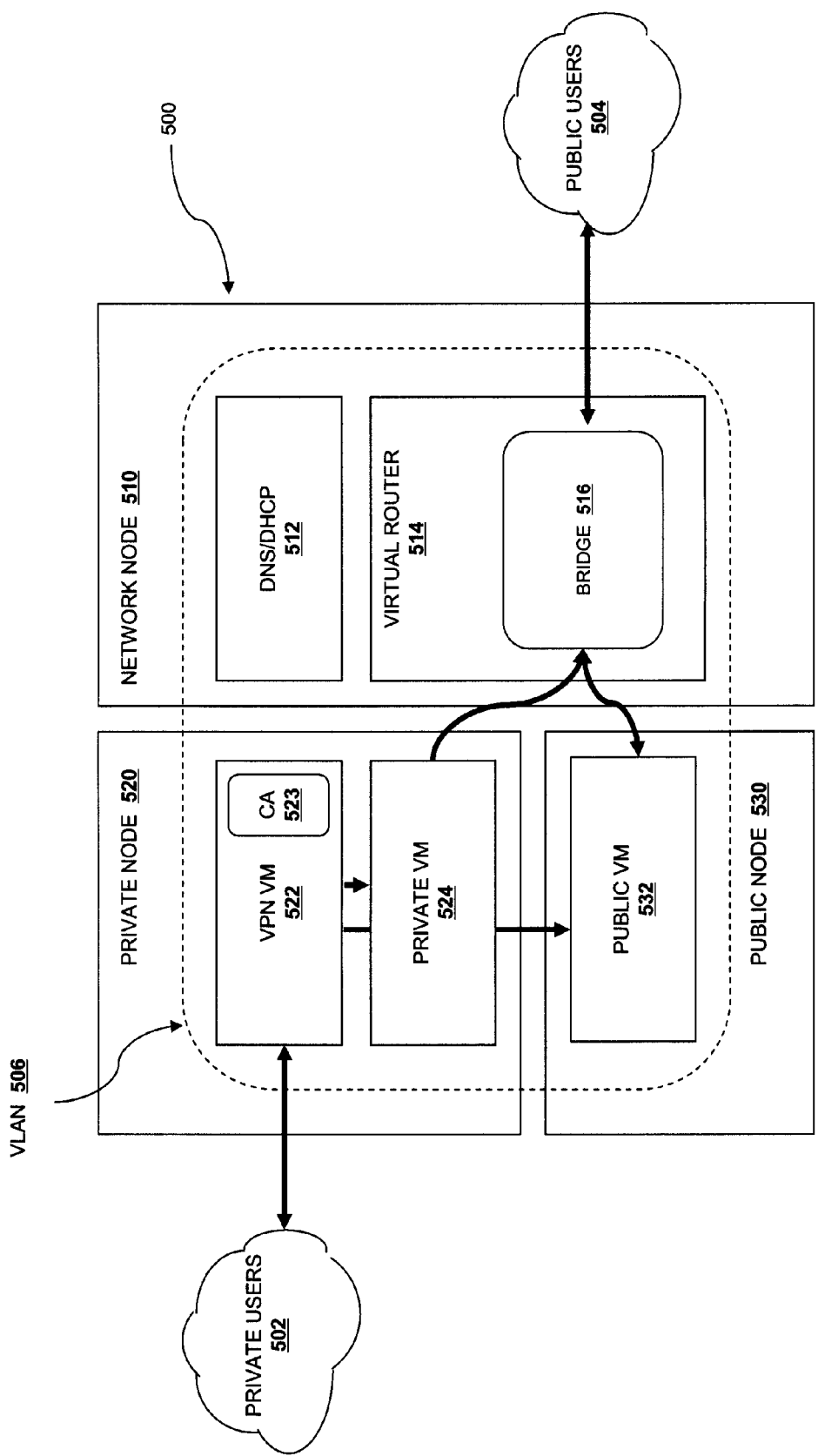
FIG. 5a is a diagram showing types of network access available to virtual machines in a cloud computing system according to various embodiments.

Referring now to FIG. 5*a*, a network service-implemented VLAN available to one embodiment of the system is shown. The network 500 is one embodiment of a virtual network 116 as discussed relative to FIG. 1, and is implemented on top of the internal network layer 114. A particular node is connected to the virtual network 500 through a virtual network interface 236 operating through physical network interface 214. The VLANs, VSwitches, VPNs, and other pieces of network hardware (real or virtual) are may be network routing elements 316 or may serve another function in the communications medium 312.

In one embodiment, the cloud computing system 110 uses both "fixed" IPs and "floating" IPs to address virtual machines. Fixed IPs are assigned to an instance on creation and stay the same until the instance is explicitly terminated. Floating IPs are IP addresses that can be dynamically associated with an instance. A floating IP address can be disassociated and associated with another instance at any time.

Different embodiments include various strategies for implementing and allocating fixed IPs, including "flat" mode, a "flat DHCP" mode, and a "VLAN DHCP" mode.

In one embodiment, fixed IP addresses are managed using a flat Mode. In this embodiment, an instance receives a fixed IP from a pool of available IP addresses. All instances are attached to the same bridge by default. Other networking configuration instructions are placed into the instance before it is booted or on boot.

In another embodiment, fixed IP addresses are managed using a flat DHCP mode. Flat DHCP mode is similar to the flat mode, in that all instances are attached to the same bridge. Instances will attempt to bridge using the default Ethernet device or socket. Instead of allocation from a fixed pool, a DHCP server listens on the bridge and instances receive their fixed IPs by doing a dhcpdiscover.

Turning now to one embodiment using VLAN DHCP mode, there are two groups of off-local-network users, the private users 502 and the public internet users 504. To respond to communications from the private users 502 and the public users 504, the network 500 includes three nodes, network node 510, private node 520, and public node 530. The nodes include one or more virtual machines or virtual devices, such as DNS/DHCP server 512 and virtual router 514 on network node 510, VPN 522 and private VM 524 on private node 520, and public VM 532 on public node 530.

In one embodiment, VLAN DHCP mode requires a switch that supports host-managed VLAN tagging. In one embodiment, there is a VLAN 506 and bridge 516 for each project or group. In the illustrated embodiment, there is a VLAN associated with a particular project. The project receives a range of private IP addresses that are only accessible from inside the VLAN, and assigns an IP address from this range to private node 520, as well as to a VNI in the virtual devices in the VLAN. In one embodiment, DHCP server 512 is running on a VM that receives a static VLAN IP address at a known address, and virtual router 514, VPN 522, private VM 524, and public VM 532 all receive private IP addresses upon request to the DHCP server running on the DHCP server VM. In addition, the DHCP server provides a public IP address to the virtual router 514 and optionally to the public VM 532. In a second embodiment, the DHCP server 512 is running on or available from the virtual router 514, and the public IP address of the virtual router 514 is used as the DHCP address.

In an embodiment using VLAN DHCP mode, there is a private network segment for each project's or group's instances that can be accessed via a dedicated VPN connection from the Internet. As described below, each VLAN project or group gets its own VLAN, network bridge, and subnet. In one embodiment, subnets are specified by the network administrator, and assigned dynamically to a project or group when required. A DHCP Server is started for each VLAN to pass out IP addresses to VM instances from the assigned subnet. All instances belonging to the VLAN project or group are bridged into the same VLAN. In this fashion, network traffic between VM instances belonging to the same VLAN is always open but the system can enforce isolation of network traffic between different projects by enforcing one VLAN per project.

As shown in FIG. 5a, VLAN DHCP mode includes provisions for both private and public access. For private access (shown by the arrows to and from the private users cloud 502), users create an access keypair (as described further below) for access to the virtual private network through the gateway VPN 522. From the VPN 522, both the private VM 524 and the public VM 532 are accessible via the private IP addresses valid on the VLAN.

Public access is shown by the arrows to and from the public users cloud 504. Communications that come in from the public users cloud arrive at the virtual router 514 and are subject to network address translation (NAT) to access the public virtual machine via the bridge 516. Communications out from the private VM 524 are source NATted by the bridge 516 so that the external source appears to be the virtual router 514. If the public VM 532 does not have an externally routable address, communications out from the public VM 532 may be source NATted as well.

In one embodiment of VLAN DHCP mode, the second IP in each private network is reserved for the VPN instance 522. This gives a consistent IP to the instance so that forwarding rules can be more easily created. The network for each project is given a specific high-numbered port on the public IP of the network node 510. This port is automatically forwarded to the appropriate VPN port on the VPN 522.

In one embodiment, each group or project has its own certificate authority (CA) 523. The CA 523 is used to sign the certificate for the VPN 522, and is also passed to users on the private users cloud 502. When a certificate is revoked, a new Certificate Revocation List (CRL) is generated. The VPN 522 will block revoked users from connecting to the VPN if they attempt to connect using a revoked certificate.

In a project VLAN organized similarly to the embodiment described above, the project has an independent RFC 1918 IP space; public IP via NAT; has no default inbound network access without public NAT; has limited, controllable outbound network access; limited, controllable access to other project segments; and VPN access to instance and cloud APIs. Further, there is a DMZ segment for support services, allowing project metadata and reporting to be provided in a secure manner.

In one embodiment, VLANs are segregated using 802.1q VLAN tagging in the switching layer, but other tagging schemes such as 802.1ad, MPLS, or frame tagging are also contemplated. The flows are defined by the virtual network 400 as described relative to FIG. 4, so the underlying implementation can be chosen independent of the logical virtual network on top. Network hosts create VLAN-specific interfaces and bridges as required using a user router 426.

In one embodiment, private VM 524 has per-VLAN interfaces and bridges created as required. These do not have IP addresses in the host to protect host access. Access is provided via routing table entries created per project and instance to protect against IP/MAC address spoofing and ARP poisoning.

Figure 5B:
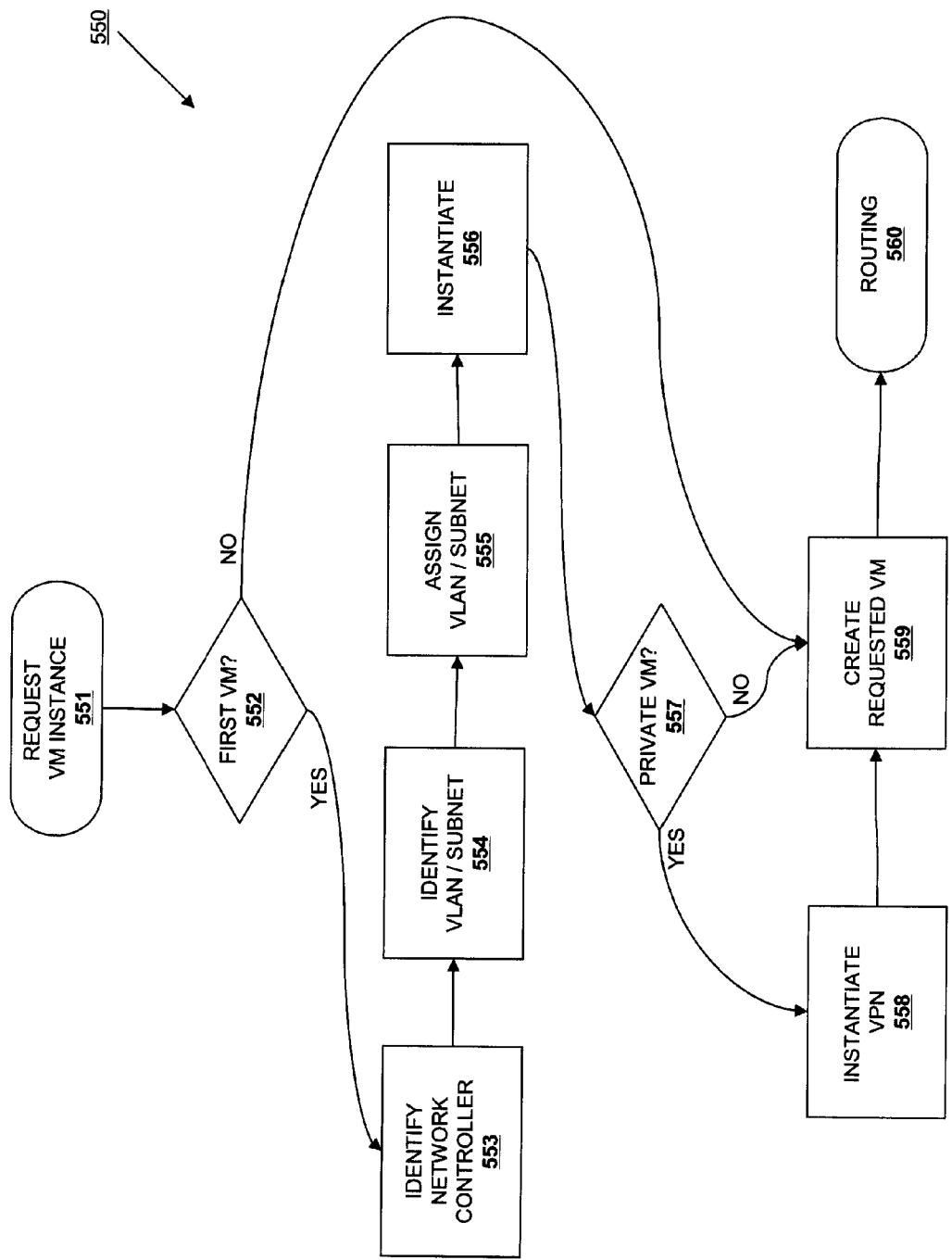
FIG. 5b is a flowchart showing the establishment of a VLAN for a project according to various embodiments.

FIG. 5b is a flowchart showing the establishment of a VLAN for a project according to one embodiment. The process 550 starts at step 551, when a VM instance for the project is requested. When running a VM instance, a user needs to specify a project for the instances, and the applicable security rules and security groups (as described herein) that the instance should join. At step 552, a cloud controller determines if this is the first instance to be created for the project. If this is the first, then the process proceeds to step 553. If the project already exists, then the process moves to step 559. At step 553, a user controller is identified to act as the network host for the project. This may involve creating a virtual network device and assigning it the role of network controller. In one embodiment, this is a virtual router 514. At step 555, an unused VLAN id and unused subnet are identified. At step 555, the VLAN id and subnet are assigned to the project. At step 556, DHCP server 512 and bridge 516 are instantiated and registered. At step 557, the VM instance request is examined to see if the request is for a private VM 524 or public VM 532. If the request is for a private VM, the process moves to step 558. Otherwise, the process moves to step 560. At step 558, the VPN 522 is instantiated and allocated the second IP in the assigned subnet. At step 559, the subnet and a VLAN have already been assigned to the project. Accordingly, the requested VM is created and assigned and assigned a private IP within the project's subnet. At step 560, the routing rules in bridge 516 are updated to properly NAT traffic to or from the requested VM.

Those of skill in the art will note that the VPN and VLAN functionality described relative to FIGS. 5a and 5b can appear to be configured and provisioned as in a legacy network, or can be completely implemented virtually using plugins, virtual routers, and centralized routing. The underlying implementation is transparent to the consumer of the network services. Other plugin implementations are defined similarly; load balancing can be dynamically adjusted based upon actual load; failover or service scaling can be defined "in the network," and can occur transparently. Various services are envisioned, including basic network connectivity, network packet filtering, IP address management, load balancing, QoS, layer 7 routing, VLANs, L2-in-L3 (and other layer) tunneling, advanced security services and geo-routing. Multiple plugins can be combined to provide layered capabilities, with each plugin service being defined within a separate "segment" of the network for visibility and debuggability.

Message Service

Between the various virtual machines and virtual devices, it may be necessary to have a reliable messaging infrastructure. In various embodiments, a message queuing service is used for both local and remote communication so that there is no requirement that any of the services exist on the same physical machine. Various existing messaging infrastructures are contemplated, including AMQP, ZeroMQ, STOMP and XMPP. Note that this messaging system may or may not be available for user-addressable systems; in one preferred embodiment, there is a separation between internal messaging services and any messaging services associated with user data. The messaging service may run alongside or on top of the network service 400 described relative to FIGS. 4-5b.

In one embodiment, the message service sits between various components and allows them to communicate in a loosely coupled fashion. This can be accomplished using Remote Procedure Calls (RPC hereinafter) to communicate between components, built atop either direct messages and/or an underlying publish/subscribe infrastructure. In a typical embodiment, it is expected that both direct and topic-based exchanges are used. This allows for decoupling of the components, full asynchronous communications, and transparent balancing between equivalent components. In some embodiments, calls between different APIs can be supported over the distributed system by providing an adapter class which takes care of marshalling and unmarshalling of messages into function calls.

In one embodiment, a cloud controller 120 (or the applicable cloud service 130) creates two queues at initialization time, one that accepts node-specific messages and another that accepts generic messages addressed to any node of a particular type. This allows both specific node control as well as orchestration of the cloud service without limiting the particular implementation of a node. In an embodiment in which these message queues are bridged to an API, the API can act as a consumer, server, or publisher.

Figure 6A:
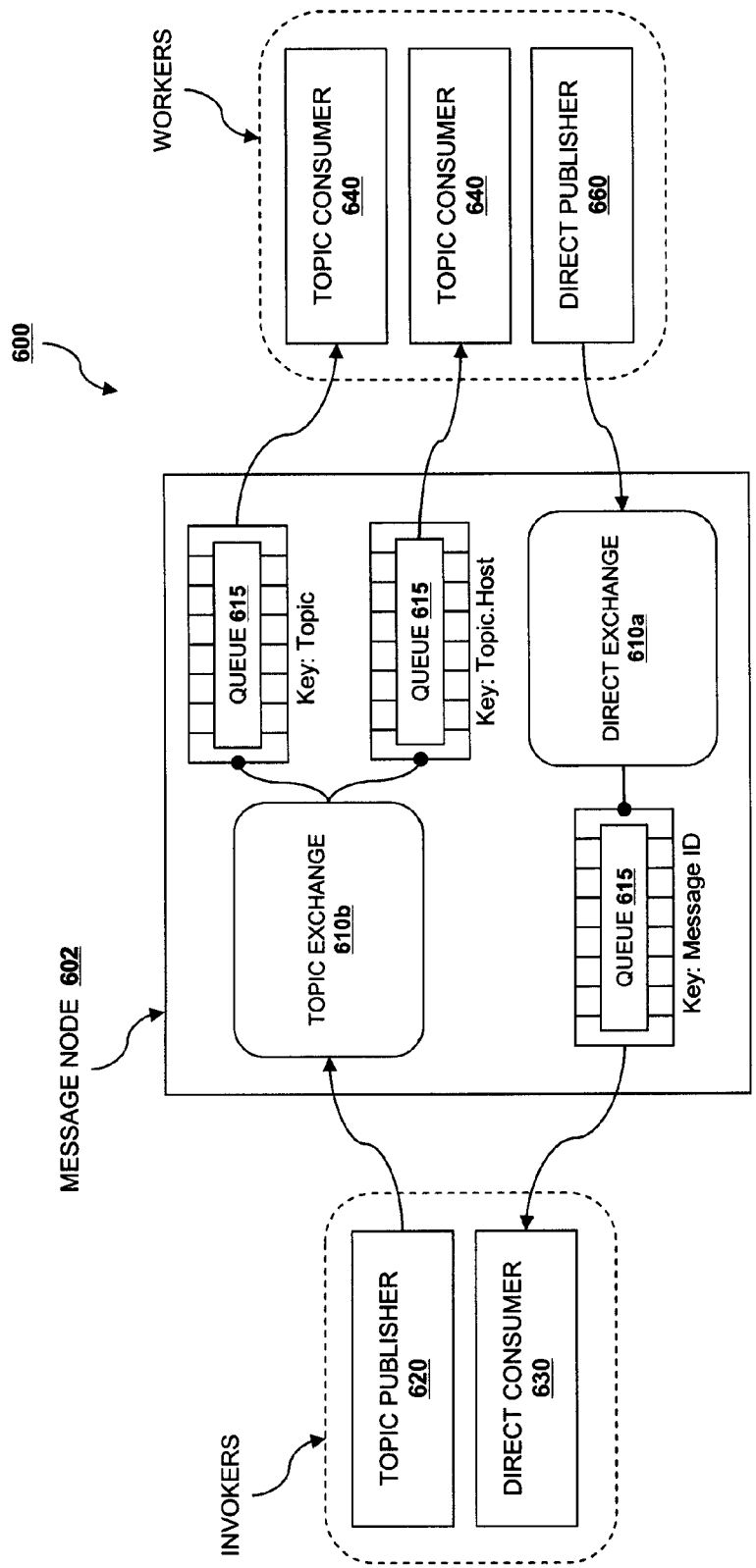
FIG. 6a shows a message service system according to various embodiments.

Turning now to FIG. 6a, one implementation of a message service 140 is shown at reference number 600. For simplicity of description, FIG. 6a shows the message service 600 when a single instance 602 is deployed and shared in the cloud computing system 110, but the message service 600 can be either centralized or fully distributed.

In one embodiment, the message service 600 keeps traffic associated with different queues or routing keys separate, so that disparate services can use the message service without interfering with each other. Accordingly, the message queue service may be used to communicate messages between network elements, between cloud services 130, between cloud controllers 120, between network elements, or between any group of sub-elements within the above. More than one message service 600 may be used, and a cloud service 130 may use its own message service as required.

For clarity of exposition, access to the message service 600 will be described in terms of "Invokers" and "Workers," but these labels are purely expository and are not intended to convey a limitation on purpose; in some embodiments, a single component (such as a VM) may act first as an Invoker, then as a Worker, the other way around, or simultaneously in each role. An Invoker is a component that sends messages in the system via two operations: 1) an RPC (Remote Procedure Call) directed message and ii) an RPC broadcast. A Worker is a component that receives messages from the message system and replies accordingly.

In one embodiment, there is a message server including one or more exchanges 610. In a second embodiment, the message system is "brokerless," and one or more exchanges are located at each client. The exchanges 610 act as internal message routing elements so that components interacting with the message service 600 can send and receive messages. In one embodiment, these exchanges are subdivided further into a direct exchange 610a and a topic exchange 610b. An exchange 610 is a routing structure or system that exists in a particular context. In a currently preferred embodiment, multiple contexts can be included within a single message service with each one acting independently of the others. In one embodiment, the type of exchange, such as a direct exchange 610a vs. topic exchange 610b determines the routing policy. In a second embodiment, the routing policy is determined via a series of routing rules evaluated by the exchange 610 via a plugin service described further below.

The direct exchange 610a is a routing element created during or for RPC directed message operations. In one embodiment, there are many instances of a direct exchange 610a that are created as needed for the message service 600. In a further embodiment, there is one direct exchange 610a created for each RPC directed message received by the system.

The topic exchange 610b is a routing element created during or for RPC directed broadcast operations. In one simple embodiment, every message received by the topic exchange is received by every other connected component. In a second embodiment, the routing rule within a topic exchange is described as publish-subscribe, wherein different components can specify a discriminating function and only topics matching the discriminator are passed along. In one embodiment, there are many instances of a topic exchange 610b that are created as needed for the message service 600. In one embodiment, there is one topic-based exchange for every topic created in the cloud computing system. In a second embodiment, there are a set number of topics that have pre-created and persistent topic exchanges 610b.

Within one or more of the exchanges 610, it may be useful to have a queue element 615. A queue 615 is a message stream; messages sent into the stream are kept in the queue 615 until a consuming component connects to the queue and fetches the message. A queue 615 can be shared or can be exclusive. In one embodiment, queues with the same topic are shared amongst Workers subscribed to that topic.

In a typical embodiment, a queue 615 will implement a FIFO policy for messages and ensure that they are delivered in the same order that they are received. In other embodiments, however, a queue 615 may implement other policies, such as LIFO, a priority queue (highest-priority messages are delivered first), or age (oldest objects in the queue are delivered first), or other configurable delivery policies. In other embodiments, a queue 615 may or may not make any guarantees related to message delivery or message persistence.

In one embodiment, element 620 is a topic publisher. A topic publisher 620 is created, instantiated, or awakened when an RPC directed message or an RPC broadcast operation is executed; this object is instantiated and used to push a message to the messages system. Every publisher connects always to the same topic-based exchange; its life-cycle is limited to the message delivery.

In one embodiment, element 630 is a direct consumer. A direct consumer 630 is created, instantiated, or awakened if an RPC directed message operation is executed; this component is instantiated and used to receive a response message from the queuing system. Every direct consumer 630 connects to a unique direct-based exchange via a unique exclusive queue, identified by a UUID or other unique name. The life-cycle of the direct consumer 630 is limited to the message delivery. In one embodiment, the exchange and queue identifiers are included the message sent by the topic publisher 620 for RPC directed message operations.

In one embodiment, element 640 is a topic consumer. In one embodiment, a topic consumer 640 is created, instantiated, or awakened at system start. In a second embodiment, a topic consumer 640 is created, instantiated, or awakened when a topic is registered with the message system 600. In a third embodiment, a topic consumer 640 is created, instantiated, or awakened at the same time that a Worker or Workers are instantiated and persists as long as the associated Worker or Workers have not been destroyed. In this embodiment, the topic consumer 640 is used to receive messages from the queue and it invokes the appropriate action as defined by the Worker role. A topic consumer 640 connects to the topic-based exchange either via a shared queue or via a unique exclusive queue. In one embodiment, every Worker has two associated topic consumers 640, one that is addressed only during an RPC broadcast operations (and it connects to a shared queue whose exchange key is defined by the topic) and the other that is addressed only during an RPC directed message operations, connected to a unique queue whose with the exchange key is defined by the topic and the host.

In one embodiment, element 660 is a direct publisher. In one embodiment, a direct publisher 660 is created, instantiated, or awakened for RPC directed message operations and it is instantiated to return the message required by the request/response operation. The object connects to a direct-based exchange whose identity is dictated by the incoming message.

Turning now to FIG. 6b, one embodiment of the process of sending an RPC directed message is shown relative to the elements of the message system 600 as described relative to FIG. 6a. At step 660, a topic publisher 620 is instantiated. At step 661, the topic publisher 620 sends a message to an exchange 610b. At step 662, a direct consumer 630 is instantiated to wait for the response message. At step 663, the message is dispatched by the exchange 610b. At step 664, the message is fetched by the topic consumer 640 dictated by the routing key (either by topic or by topic and host). At step 666, the message is passed to a Worker associated with the topic consumer 640. If needed, at step 666, a direct publisher 660 is instantiated to send a response message via the message system 600. At step 667, the direct publisher 640 sends a message to an exchange 610a. At step 668, the response message is dispatched by the exchange 610a. At step 669, the response message is fetched by the direct consumer 630 instantiated to receive the response and dictated by the routing key. At step 670, the message response is passed to the Invoker.

Turning now to FIG. 6c, one embodiment of the process of sending an RPC broadcast message is shown relative to the elements of the message system 600 as described relative to FIG. 6a. At step 680, a topic publisher 620 is instantiated. At step 681, the topic publisher 620 sends a message to an exchange 610b. At step 682, the message is dispatched by the exchange 610b. At step 683, the message is fetched by a topic consumer 640 dictated by the routing key (either by topic or by topic and host). At step 684, the message is passed to a Worker associated with the topic consumer 640.

In some embodiments, a response to an RPC broadcast message can be requested. In that case, the process follows the steps outlined relative to FIG. 6b to return a response to the Invoker.

As noted above, in one embodiment the routing policy is determined via a series of routing rules evaluated by the exchange 610 via a plugin service. Unlike the network service 400, the message service 600 is already software-defined, so it is not necessary to create pseudo-hardware ports to bridge the physical-virtual gap. Instead, the routing functions of the message service can be directly accessed or modified using an API and/or a plugin interface. In one embodiment, a plugin is implemented as a series of loadable and executable rules that can be provided to the message service 600 and run by the direct exchange 610a or the topic exchange 610b as part of its routing. In one embodiment, this loadable ruleset can be implemented using a dynamically loadable or runnable program that has a series of expected inputs and provides its information on a defined series of outputs. In one embodiment these are "stdin" and "stdout." In a second embodiment, these are provided as function calls within a program module.

In one embodiment, the plugin interface is a messaging "device" that implements a particular messaging pattern. For example, one embodiment uses a "forwarding" device. This is particularly useful in a cloud architecture where the endpoints of a message are relatively dynamic and there may not be a stable connection point. This plugin controls the routing of messages in a queue and passes messages from one (possibly dynamic) messaging endpoint to another. Another possible plugin "device" embodiment implements a pipeline-style messaging architecture. Messages arriving at one end of the device are sent to one or more downstream Workers, where the messages can be processed in parallel instead of serially. A third embodiment of a plugin device is a load balancer.

In the image below we can see such a device being used, in this situation both the client and the server initialize a connection to the forwarder, which binds to two different ports. Using such a device will remove the need of extra application logic, as you will not need to maintain a list of connected peers.

Rule Engines and Plugins

Because many aspects of the cloud computing system do not allow direct access to the underlying hardware or services, many aspects of the cloud computing system are handled declaratively, through rule-based computing. Rule-based computing organizes statements into a data model that can be used for deduction, rewriting, and other inferential or transformational tasks. The data model can then be used to represent some problem domain and reason about the objects in that domain and the relations between them. In one embodiment, one or more controllers or services have an associated rule processor that performs rule-based deduction, inference, and reasoning. Rule engines are particularly applicable as a plugin interface, where particular outcome can be presented either as the outcome of a series of rules provided by an end user or as the output of a "black box" that takes one or more defined inputs and returns an output.

Rule Engines can be implemented similarly to script processors as described relative to FIG. 3, and may be implemented as a sub-module of a script processor where needed. In other embodiments, Rule Engines can be implemented as discrete components, for example as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-rule-engine facility. For example, one embodiment uses a language runtime as a rule engine, running as a discrete operating environment, as a process in an active operating environment, or can be run from a low-power embedded processor. In a second embodiment, the rule engine takes the form of a series of interoperating but discrete components, some or all of which may be implemented as software programs. In another embodiment, the rule engine is a discrete component, using a small amount of flash and a low power processor, such as a low-power ARM processor.

Security and Access Control

Figure 7:
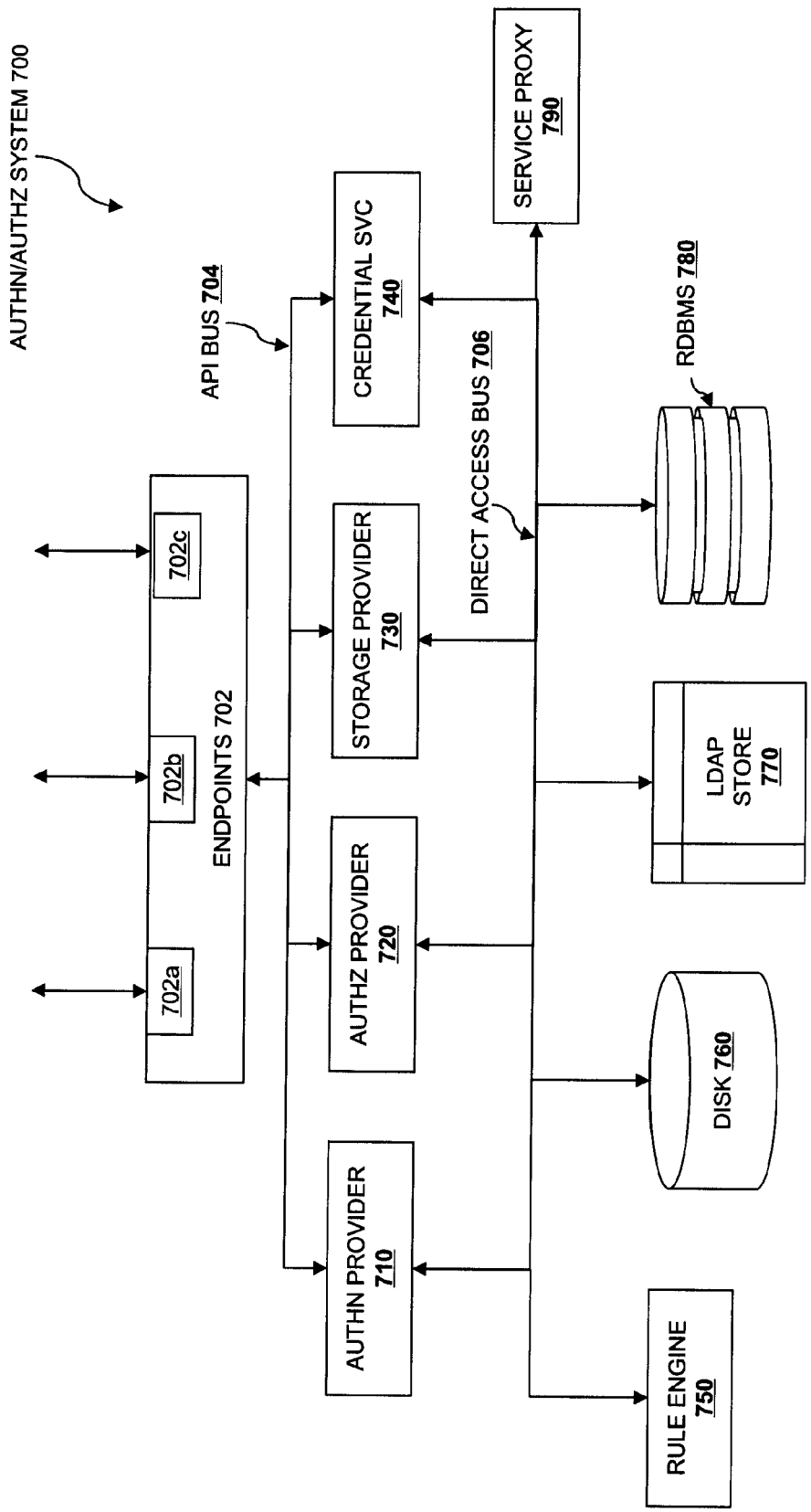
FIG. 7 is a PaaS-style identity and authentication service according to various embodiments.

One common need for cloud computing systems is an authentication and authorization system. Turning now to FIG. 7, one exemplary authentication ("authn") and authorization ("authz") system is shown at 700. The authn/authz system shown at 700 is exemplary only and can be used in several different aspects within a cloud computing system. For example, one embodiment uses a single authn/authz system for the entire cloud computing "platform," including all subsidiary services. Another embodiment has separate authn/authz services for each subsidiary service. A third embodiment has a split authn/authz service, with authn being handled globally so that user, project, tenant, and account details are consistent, but allowing authz to be handled within each subsidiary service so that the privileges granted are logically and physically separable. A further embodiment has multiple authn/authz services, where there are one or more authn/authz services 600 that are used to mediate the authentication and authorization of users to interact with the cloud computing platform and its subsidiary components, and one or more authn/authz services 700 that are tenant-specific and used to control and expose internal virtual cloud resources in a controlled fashion. Rule-based access controls govern the use and interactions of these logical entities.

In a preferred embodiment, a role-based computing system is a system in which identities and resources are managed by aggregating them into "roles" based on job functions, physical location, legal controls, and other criteria. These roles can be used to model organizational structures, manage assets, or organize data. By arranging roles and the associated rules into graphs or hierarchies, these roles can be used to reason about and manage various resources.

In one application, role-based strategies have been used to form a security model called Role-Based Access Control (RBAC). RBAC associates special rules, called "permissions," with roles; each role is granted only the minimum permissions necessary for the performance of the functions associated with that role. Identities are assigned to roles, giving the users and other entities the permissions necessary to accomplish job functions. RBAC has been formalized mathematically by NIST and accepted as a standard by ANSI. American National Standard 359-2004 is the information technology industry consensus standard for RBAC, and is incorporated herein by reference in its entirety.

In a preferred embodiment, a user is defined as an entity that will act in one or more roles. A user is typically associated with an internal or external entity that will interact with the cloud computing system in some respect. A user can have multiple roles simultaneously. In one embodiment of the system, a user's roles define which API commands that user can perform.

Although the "user" construct may sometimes represent a physical human being, there is no limitation that a user must be a person. Rather, a user may be a person, system, or service who interacts with the cloud computing system and is associable with a distinct identity. The authn/authz service 700 validates requests and API calls with reference to the declared user. No particular implementation of the user construct is required; users may be locally unique within a defined realm or globally unique within the cloud computing system. In most embodiments, a user will be identified using one or more "IDs." These user IDs can be numbers, strings of characters, or compound multi-valued objects. In some embodiments, this user ID is (or is associated with) a "login"—a sequence of characters presented to the authn/authz system 700 to identify the user. In some embodiments, users can also have further non-security-related metadata associated with them, such as names, companies, email addresses, locations, etc.

In a preferred embodiment, a resource is defined as some object to which access is restricted. In various embodiments, resources can include network or user access to a virtual machine or virtual device, the ability to use the computational abilities of a device, access to storage, an amount of storage, API access, ability to configure a network, ability to access a network, network bandwidth, network speed, network latency, ability to access or set authentication rules, ability to access or set rules regarding resources, etc. In general, any item which may be restricted or metered is modeled as a resource.

In one embodiment, resources may have quotas associated with them. A quota is a rule limiting the use or access to a resource. A quota can be placed on a per-project level, a per-role level, a per-user level, or a per-group level. In one embodiment, quotas can be applied to the number of volumes which can be created, the total size of all volumes within a project or group, the number of instances which can be launched, both total and per instance type, the number of processor cores which can be allocated, and publicly accessible IP addresses. Other restrictions are also contemplated as described herein.

In a preferred embodiment, a project is defined as a flexible association of users, acting in certain roles, which will define and access various resources. A project is typically defined by an administrative user according to varying demands. There may be templates for certain types of projects, but a project is a logical grouping created for administrative purposes and may or may not bear a necessary relation to anything outside the project. In a preferred embodiment, arbitrary roles can be defined relating to one or more particular projects only.

In a preferred embodiment, a group is defined as a logical association of some other defined entity. There may be groups of users, groups of resources, groups of projects, groups of quotas, or groups which contain multiple different types of defined entities. For example, in one embodiment, a group "development" is defined. The development group may include a group of users with the tag "developers" and a group of virtual machine resources ("developer machines"). These may be connected to a developer-only virtual network ("dev-net"). The development group may have a number of ongoing development projects, each with an associated "manager" role. There may be per-user quotas on storage and a group-wide quota on the total monthly bill associated with all development resources.

The applicable set of rules, roles, and quotas is based upon context. In one embodiment, there are global roles, user-specific roles, project-specific roles, and group-specific roles. In one embodiment, a user's actual permissions in a particular project are the intersection of the global roles, user-specific roles, project-specific roles, and group-specific roles associated with that user, as well as any rules associated with project or group resources possibly affected by the user. Other embodiments may also use other grouping or organizational identifiers, such as domains, realms, locations, and organizations.

In a preferred embodiment, a credential is an identifying token. This token can be either something that is uniquely known or controlled by the user, such as a password, key, certificate, token, or other piece of information, or it can be something associated with the user's identity, such as voice prints, iris or retinal scan data, fingerprints, etc. In one embodiment, unique machine-identifying data can also be used as a credential, such as IP addresses, MAC addresses, embedded key, computer chip, or serial number information, or computationally secure data processing circuits. In one embodiment, the identity-based credential is unique to the user being identified. In a second embodiment, credentials are treated probabilistically, and a number of credentials can be combined to increase the confidence that the user has been authenticated correctly.

In a preferred embodiment, authentication is the act of confirming the identity of a user or the truth of a claim. The authn/authz service 700 confirms that incoming requests are being made by the user who claims to be making the call by validating a set of claims provided by the user. In one embodiment, the claims are initially in the form of a set of credentials (username & password, or login and API key). After initial confirmation, The authn/authz service 700 issues a token that can serve as a credential.

In a preferred embodiment, authorization is the act of confirming the capability of a user to perform some action. The authn/authz service 700 confirms that the user is authorized to perform the actions corresponding to the user's incoming requests. An individual authorization is called a "permission." In one embodiment, if a user is not authenticated, a "default" or "anonymous" profile is used as the default identity. A token can contain or refer to a set of authorization permissions.

In a preferred embodiment, a token is a data (such as a string) that corresponds to an identity. Tokens are generally cryptographically generated to prevent forging and are associated with access controls. Each token has a scope and a timeframe that describe the resources that can be accessed using the token.

In a preferred embodiment, an endpoint is a network-accessible address, usually described by URL or URI, where a service may be accessed.

These different pieces can be used to collectively authenticate and authorize a user. Although the authn/authz service will be described in terms of specific embodiments below, the logical constructs are more important than the particular implementations, and the representation of any particular part of the system may change from embodiment to embodiment.

Turning again to FIG. 7, the authn/authz service 700 is organized as a group of internal services exposed on one or many endpoints 702. Many of these services are used in a combined fashion by the frontend APIs (such as the service endpoints 112 described relative to FIG. 1). In one embodiment, the authz/authn service 700 immediately authenticates and authorizes a request arriving to the cloud computing system and creates and return a token credential that can be used internally to authorize and authenticate the services without having to duplicate the original credential checks. This token may be returned to the user or may be a hidden internal implementation detail for operational efficiency within the cloud computing system as a whole. In another embodiment, the authn/authz service 700 has a service-specific endpoint within each subsidiary service of the cloud computing system, such as endpoints 702a, 702b, and 702c. These endpoints can be exposed over HTTP, OAUTH, XAUTH, XML-RPC, SOAP, CORBA, LDAP, COM, Kerberos, RADIUS, OpenID, SAML, or other protocols known in the art.

The authn/authz service 700 has four primary divisions, the authn provider 710, the authz provider 720, the storage provider 730, and the credential service 740. The authn provider 710 performs the calculations or comparisons needed to authenticate a user given the provided credentials. The authz provider 720 performs the necessary analysis to determine whether an identified user has the necessary permissions to perform a requested action. The storage provider 730 provides access to a durable storage that contains authentication and authorization rules, tokens, credentials, and other necessary data. The credential service 740 provides new credentials on demand.

Each of these four divisions presents a unified API for consumers, regardless of the underlying implementation. In one or more embodiments, there are various backend services that actually implement, store, or calculate the data needed to provide the authentication, authorization, user/credential storage and generation services exposed by the providers 710, 720, 730, and 740. These backend services may include but are not limited to a rule engine 750, a disk store 760, an LDAP database 770, or an RDBMS 780. Although the embodiment shown in FIG. 7 shows only one backend provider of each type and an architecture in which all backend providers are commonly accessible, this is for purposes of illustration only and should not be considered a limitation.

For example, a first embodiment of the rule engine 750 encompasses multiple rule engines working in parallel or a single rule engine 750. The rule engine 750 may or may not have access to one or more disks 760, LDAP stores 770, RDBMS's 780. In another embodiment, some of the backend services may be combined. Looking again at the rule engine 750, one embodiment uses database logic, triggers, and stored procedures to implement the rule engine 750. Another implementation uses an RBAC analysis engine associated with an LDAP datastore like Active Directory or OpenLDAP. A third embodiment of the rule engine 750 is implemented as described elsewhere in this document. Other embodiments may use other implementations as known in the art.

In one embodiment, the disk store 760 is implemented using structured files on a computer-readable medium. For example, one embodiment of a disk store 760 comprises /etc/passwd and /etc/grp files. A second embodiment of a disk store 760 is a structured data store, such as a CSV, XML, SQLite or BerkelyDB-formatted and structured file on a disk. A third embodiment uses an object storage service. Other embodiments may use other implementations as known in the art.

In one embodiment, the LDAP store 770 is implemented using commercially available tree-structured directory such as Active Directory, OpenLDAP, the Red Hat directory service or Novell eDirectory. In another embodiment, the LDAP store 770 is implemented using a graph database or a key-value database, a document database, or a tree-structured filesystem with disk-based storage and attributes. Other embodiments may use other implementations as known in the art.

In one embodiment, the RDBMS 780 is implemented using commercially available relational database such as MySQL, PostgreSQL, Oracle database server, Microsoft SQL Server, SQLite, DB2, or other relational databases as known in the art.

Each of the four main divisions of the authn/authz service 700 can call out to other portions of the service, either using the API bus 704 or the direct access bus 706. The API bus 704 is a communications medium, such as a message service or network connection, that allows one provider to call another provider's API as part of its functionality. For example, in one embodiment the credential service 740 uses the API bus 704 to retrieve a representation of the permissions associated with a particular user so that the permissions can be encoded into a generated token.

The direct access bus 706 is a communications medium, such as a message service or network connection, which allows one provider to call out to one or more of the backend services to provide part or all of its functionality. For example, in one embodiment the authz provider 720 uses organizational information stored in the LDAP store 770 to evaluate whether a particular action is authorized.

The final component shown in FIG. 7 is the service proxy 790. The service proxy 790, either as a singular proxy or via multiple service proxies 790, transparently connect a remote implementation of one or more of the providers (710, 720, 730, 740) or services (750, 760, 770, 780) for execution in a remote location. In various embodiments the service proxy supports federation, caching, and user-specific business logic in the authn/authz system 700.

In one embodiment, two services capable of providing authn/authz service exist, authn/authz system 1 and authn/authz system 2. Each system has a set of local backend services providing authn, authz, storage, and credential access via the endpoints 702 for a set of users, where the two sets of users are disjoint. Further, a secure communication channel exists between the service proxy 790 of each service and the remote service. In one implementation, "fallback" logic is provided for each of the authn provider 710, authz provider 720, and storage provider 730. The fallback logic first looks to the local implementation for authentication and authorization of users and permissions. If the lookup fails, either in authentication or in authorization, or if the information necessary for calculation of authentication or authorization is not available to the local storage provider 730, then the service proxy 790 is used to present the same user request to the remote system. Only if both the local and remote calculation of authentication, authorization, or storage fails is a rejection returned.

Those of skill in the art will recognize several implications, extensions or modifications of the embodiment described above. First, it is preferred for the connection from the service proxy to go to an endpoint 702 or API bus 704 of a remote system so as to reduce the coupling between systems, but it is equally possible to use the service proxy to connect directly to a remote service implementation. Second, the remote service implementation does not need to be controlled by the cloud service provider, and in fact it may be more common to have a secure connection to a customer-internal authentication and authorization service so that sensitive authentication and authorization information can stay inside user-controlled systems and never be transmitted outside of a protected area. Third, the embodiment described above is bidirectional, but it would be equally easy to have a unidirectional federation by only connecting one service proxy 790 to the remote system without having the second reciprocal link. Fourth, the credential service 740 can also be proxied using the service proxy 790, but it may be more efficient in some circumstances to generate a new temporary credential at the local system so that the cross-service proxied call does not need to be made for subsequent accesses.

In a second embodiment, the service proxy 790 is used to support caching of remote information. This is related to the federation embodiment described above, except that a copy of the credentials and necessary information needed to identify the correct authentication and authorization responses can be saved in a local data store for use in subsequent connections. A "TTL" (time-to-live) value can be imposed on the cached values so as to force periodic reauthorization, and the connection between the service proxy 790 and the remote system can be used to revoke particular tokens or credentials for reasons other than the expiration of time. An advantage of particular embodiments is that the response to certain API calls can be cached without revealing the underlying mechanism used to compute the response.

In a third embodiment, the service proxy 790 is used to implement user-specific business logic via a plugin system. The service proxy 790 can be used to replace or proxy any provider or backend service to an arbitrary point, including a local service implementing user-specific logic. The service proxy 790 provides a plugin API or RPC API that allows user-defined authentication, authorization, storage, and credential services to be used transparently without any change in the outer API endpoints 702. In one implementation, this is performed similarly to the federation or caching examples above, but the "remote" service is actually provided at a local node running the user-provided plugin.

Other implementations of each of the services are also anticipated. In the same fashion described above, each provider or service is configurable to use a backend so that the authn/authz service 700 can fit a variety of environments and needs. In one embodiment, the backend for each service is defined in a configuration file and the proper backend is loaded at runtime.

Although graph-based, document-based, RDF-based, and key-value-based databases are not explicitly shown, their use is explicitly contemplated in the context of various embodiments. In one embodiment, a key-value store backend is implemented that can support primary key lookups, the most trivial implementation being an in-memory dictionary lookup. In a second embodiment, a relational database mapper can be used to provide many services on top of a traditional SQL backend, outside of simple RDBMS service. In third embodiment, PAM (Pluggable Authentication Modules) are used as a backend via a system's PAM service. This provides a one-to-one relationship between Users and Groups with the root User also having the 'admin' role.

In one preferred embodiment, authentication of a user is performed through public/private encryption, with keys used to authenticate particular users, or in some cases, particular resources such as particular machines. A user or machine may have multiple keypairs associated with different roles, projects, groups, or permissions. For example, a different key may be needed for general authentication and for project access. In one such embodiment, a user is identified within the system by the possession and use of one or more cryptographic keys, such as an access and secret key. A user's access key needs to be included in a request, and the request must be signed with the secret key. Upon receipt of API requests, the rules engine verifies the signature and executes commands on behalf of the user.

Some resources, such as virtual machine images, can be shared by many users. Accordingly, it can be impractical or insecure to include private cryptographic information in association with a shared resource. In one embodiment, the system supports providing public keys to resources dynamically. In one exemplary embodiment, a public key, such as an SSH key, is injected into a VM instance before it is booted. This allows a user to login to the instances securely, without sharing private key information and compromising security. Other shared resources that require per-instance authentication are handled similarly.

In one embodiment, a rule processor is also used to attach and evaluate rule-based restrictions on non-user entities within the system. In this embodiment, a "Cloud Security Group" (or just "security group") is a named collection of access rules that apply to one or more non-user entities. Typically these will include network access rules, such as firewall policies, applicable to a resource, but the rules may apply to any resource, project, or group. For example, in one embodiment a security group specifies which incoming network traffic should be delivered to all VM instances in the group, all other incoming traffic being discarded. Users with the appropriate permissions (as defined by their roles) can modify rules for a group. New rules are automatically enforced for all running instances and instances launched from then on.

When launching VM instances, a project or group administrator specifies which security groups it wants the VM to join. If the directive to join the groups has been given by an administrator with sufficient permissions, newly launched VMs will become a member of the specified security groups when they are launched. In one embodiment, an instance is assigned to a "default" group if no groups are specified. In a further embodiment, the default group allows all network traffic from other members of this group and discards traffic from other IP addresses and groups. The rules associated with the default group can be modified by users with roles having the appropriate permissions.

In some embodiments, a security group is similar to a role for a non-user, extending RBAC to projects, groups, and resources. For example, one rule in a security group can stipulate that servers with the "webapp" role must be able to connect to servers with the "database" role on port 3306. In some embodiments, an instance can be launched with membership of multiple security groups—similar to a server with multiple roles. Security groups are not necessarily limited, and can be equally expressive as any other type of RBAC security. In one preferred embodiment, all rules in security groups are ACCEPT rules, making them easily composable.

In one embodiment, each rule in a security group must specify the source of packets to be allowed. This can be specified using CIDR notation (such as 10.22.0.0/16, representing a private subnet in the 10.22 IP space, or 0.0.0.0/0 representing the entire Internet) or another security group. The creation of rules with other security groups specified as sources helps deal with the elastic nature of cloud computing; instances are impermanent and IP addresses frequently change. In this embodiment, security groups can be maintained dynamically without having to adjust actual IP addresses.

In one embodiment, the APIs, RBAC-based authentication system, and various specific roles are used to provide a US eAuthentication-compatible federated authentication system to achieve access controls and limits based on traditional operational roles. In a further embodiment, the implementation of auditing APIs provides the necessary environment to receive a certification under FIPS 199 Moderate classification for a hybrid cloud environment.

Typical implementations of US eAuth authentication systems are structured as a Federated LDAP user store, back-ending to a SAML Policy Controller. The SAML Policy Controller maps access requests or access paths, such as requests to particular URLs, to a Policy Agent in front of an eAuth-secured application. In a preferred embodiment, the application-specific account information is stored either in extended schema on the LDAP server itself, via the use of a translucent LDAP proxy, or in an independent datastore keyed off of the UID provided via SAML assertion.

As described above, in one embodiment API calls are secured via access and secret keys, which are used to sign API calls, along with traditional timestamps to prevent replay attacks. The APIs can be logically grouped into sets that align with the following typical roles:
Base User
System Administrator
Developer
Network Administrator
Project Administrator
Group Administrator
Cloud Administrator
Security
End-user/Third-party User In one currently preferred embodiment, System Administrators and Developers have the same permissions, Project and Group Administrators have the same permissions, and Cloud Administrators and Security have the same permissions. The End-user or Third-party User is optional and external, and may not have access to protected resources, including APIs. Additional granularity of permissions is possible by separating these roles. In various other embodiments, the RBAC security system described above is extended with SAML Token passing. The SAML token is added to the API calls, and the SAML UID is added to the instance metadata, providing end-to-end auditability of ownership and responsibility.

In an embodiment using the roles above, APIs can be grouped according to role.
Any Authenticated User May:
  Describe Instances
  Describe Images
  Describe Volumes
  Describe Keypairs
  Create Keypair
  Delete Keypair
  Create, Upload, Delete Buckets and Keys
System Administrators, Developers, Project Administrators, and Group Administrators May:
  Create, Attach, Delete Volume (Block Store)
  Launch, Reboot, Terminate Instance
  Register/Unregister Machine Image (project-wide)
  Request or Review Audit Scans
Project or Group Administrators May:
  Add and remove other users
  Set roles
  Manage groups
Network Administrators May:
  Change Machine Image properties (public/private)
  Change Firewall Rules
  Define Cloud Security Groups
  Allocate, Associate, Deassociate Public IP addresses In this embodiment, Cloud Administrators and Security personnel would have all permissions. In particular, access to the audit subsystem would be restricted. Audit queries may spawn long-running processes, consuming resources. Further, detailed system information is a system vulnerability, so proper restriction of audit resources and results would be restricted by role.

In an embodiment as described above, APIs are extended with three additional type declarations, mapping to the "Confidentiality, Integrity, Availability" ("C.I.A.") classifications of FIPS 199. These additional parameters would also apply to creation of block storage volumes and creation of object storage "buckets." C.I.A. classifications on a bucket would be inherited by the keys within the bucket. Establishing declarative semantics for individual API calls allows the cloud environment to seamlessly proxy API calls to external, third-party vendors when the requested C.I.A. levels match.

In one embodiment, a hybrid or multi-vendor cloud uses the networking architecture described relative to FIG. 4 and the RBAC controls to manage and secure inter-cluster networking. In this way the hybrid cloud environment provides dedicated, potentially co-located physical hardware with a network interconnect to the project or users' cloud virtual network. User-specific security policies are implemented as plugins on the network without necessarily disclosing the underlying implementation or specific business rules implemented by the plugin.

In one embodiment, the interconnect is a bridged VPN connection. In one embodiment, there is a VPN server at each side of the interconnect with a unique shared certificate. A security group is created specifying the access at each end of the bridged connection. In a second embodiment, the interconnect VPN implements audit controls so that the connections between each side of the bridged connection can be queried and controlled. Network discovery protocols (ARP, CDP) can be used to provide information directly, and existing protocols (SNMP location data, DNS LOC records) overloaded to provide audit information.

Object Storage Service

Figure 8:
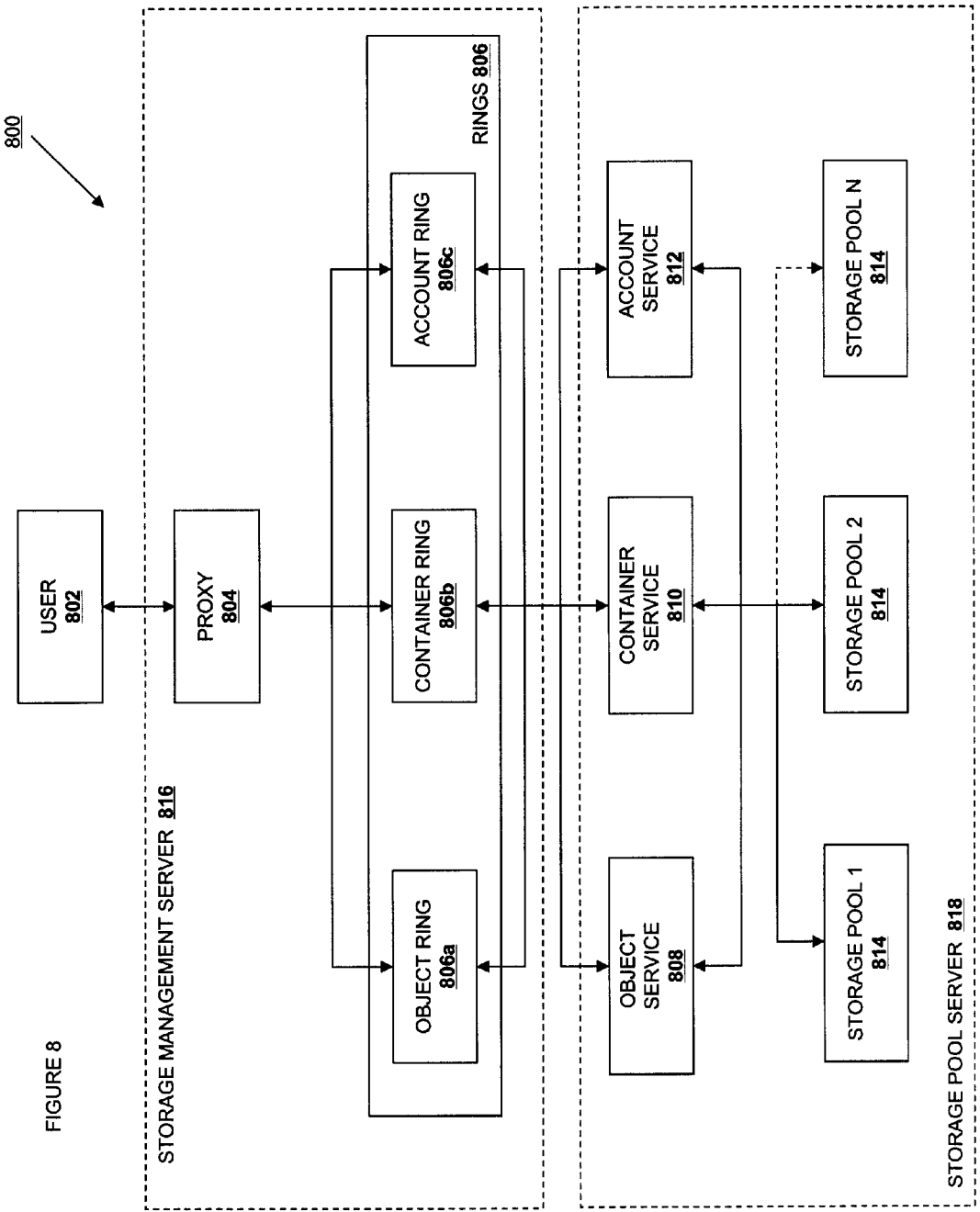
FIG. 8 is a PaaS-style object storage service according to various embodiments.

Referring now to FIG. 8, a diagram showing the logical structure of an object storage service is shown at reference 800. The structure connects a user 802 through a proxy 804, where the proxy 804 provides an API endpoint for interacting with the storage service 800. The proxy 804 is connected to one or more rings 806 such as an object ring 806a, a container ring 806b, and an account ring 806c, described in further detail below, that are connected to an object service 808, container service 810, and an account service 812, respectively, described in further detail below. In other embodiments, there are other types of objects managed by rings, such as a structured data ring, a graph storage ring, or another type of ring (not pictured). In such embodiments, each ring would be connected to an appropriate service, such as a structured data service, a graph service, or another service (not pictured).

In one embodiment, these rings and services are implemented as services integrated with or running on top of an information processing system 210 as described relative to FIG. 2. These could be running alone, or configured to host one or more virtual machines; the services and rings can be implemented on "bare metal," or within one or more of the virtual machines (logical containers and operating environments). The services and functionalities described relative to the object storage service may be centralized onto a smaller number of physical devices or may be expanded out to a large number of independent physical machines, including machines in different zones. For ease of explanation, two groupings are shown, wherein a storage management server 816 centralizes the proxy 804 and the rings 806, and a storage pool server 818 centralizes the object service 808, the container service, 810, the account service 812, and the storage pools 814. This grouping is for convenience in explanation only, however, and is not intended to be limiting. Further, each of these groupings may be logically present in a particular embodiment but may be implemented using a plurality of physical devices in a configuration that is different from the logical configuration presented.

In one embodiment, each storage pool 814 is provided by a separate storage server 818 or includes a virtual server that is included in a portion of one of the storage servers 818 or across a plurality of the storage servers 818. For example, the storage servers 818 may be physically located in one or more data centers, and the resources of the storage servers 818 may be virtualized according to the requirements of a plurality of users (e.g., the user 802) such that the plurality of storage pools 814 are provided to the plurality of users in order to store files and/or data objects. Thus, resources for a particular virtual server or storage pool may span across multiple storage servers 818.

Figure 9:
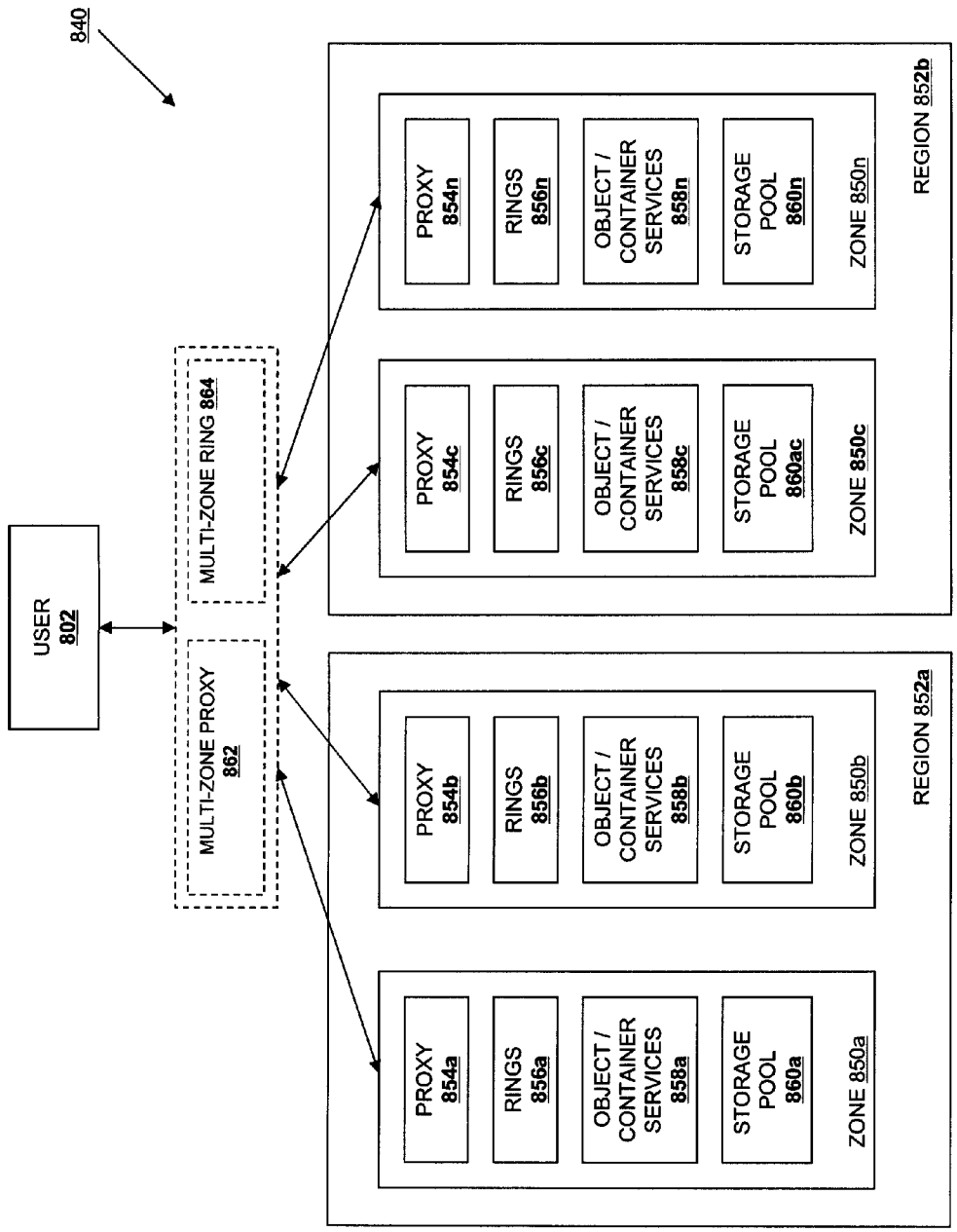
FIG. 9 is a schematic view illustrating an embodiment of a logical structure provided by the object storage service according to various embodiments.

Referring now to FIG. 9, a multi-zone object storage service is shown at reference 840. The multi-zone object storage service 840 encompasses multiple zones 850a-850n. These zones may be included in separate regions, such as the exemplary regions 852a and 852b. Each zone may also be under the control of a separate organization. Each zone includes a object storage service, such as the object storage service described relative to FIG. 8, possibly including in each object storage service a proxy 854a-n, one or more rings 856a-n, object, container, account, or other services 858a-n, and a storage pool 860a-n. In one embodiment, the user 802 interacts with each zone independently, addressing any requests directly to the proxies 854a-n. In a second embodiment of the multi-zone object storage service 840, there is an additional multi-zone proxy 862 or multi-zone ring 864. The multi-zone proxy 862 is used to provide a single entry point to the zones 850a-n, and the multi-zone ring 864 is used to balance requests across the zones 850a-n. An embodiment may use either a multi-zone proxy 862, or a multi-zone ring 864, or both, or neither. In an embodiment in which a multi-zone proxy 862 or a multi-zone ring 864 is used, the individual zones 850a-n can optionally forego the use of the zone-specific proxy 854a-n or zone-specific ring 856a-n.

Figure 10:
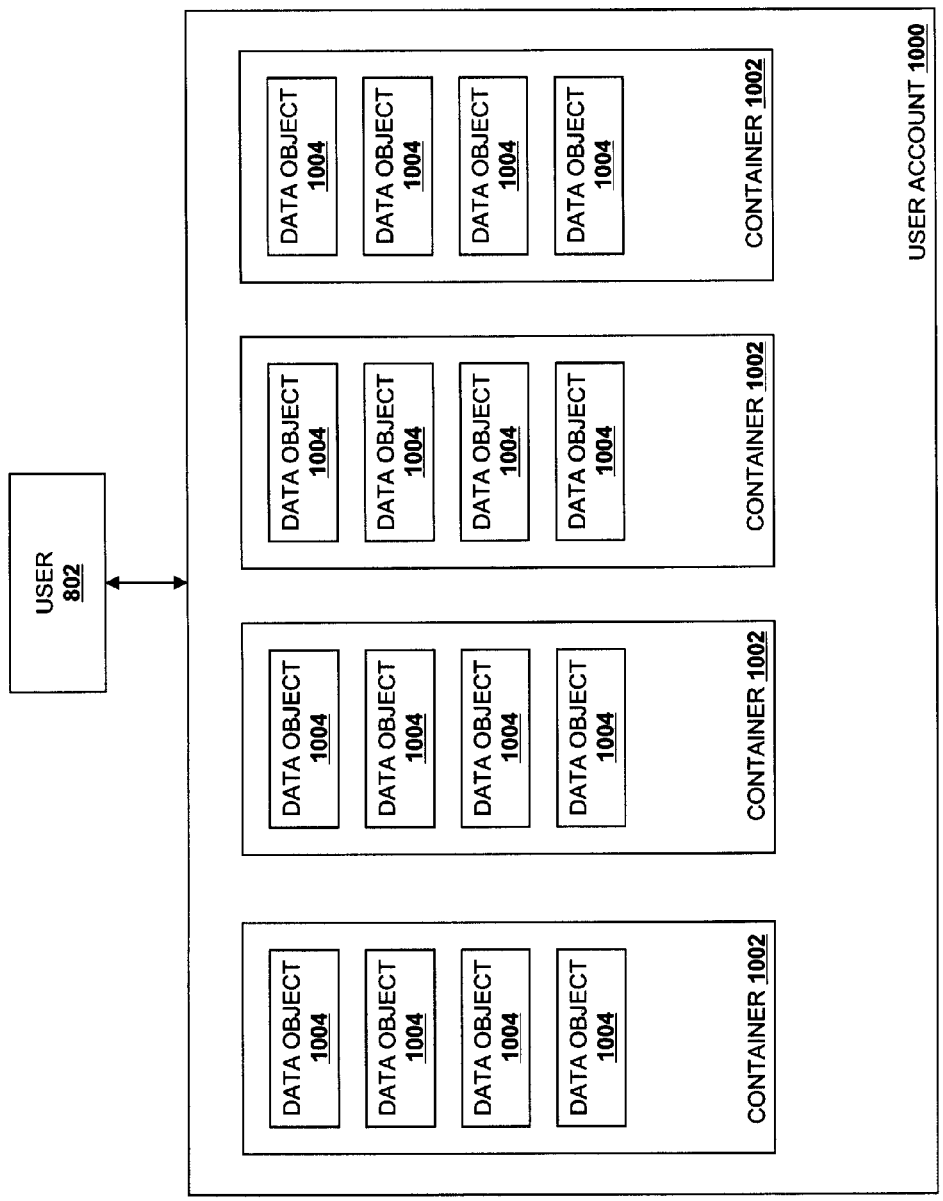
FIG. 10 is a schematic view of a user account storage structure according to one embodiment.

Referring now to FIG. 10, a particular user 802 interacts with the storage service 800 via the API to store and receive data objects. User 802 may create a plurality of containers 1002 in the user account 1000 and store a plurality of data objects 1004 in each of the containers 1002 for retrieval. In the discussion below, a user account is referred to as an "account," a container is referred to as a "container," and a data object is referred to as an "object" for clarity of discussion. One of skill in the art will recognize that the terms "account," "container" and "object" are generic forms of data naming that are used to direct the object storage service 800 to a specific data object. When other types of rings and services are used, an appropriate name may be substituted. For clarity, discussion of alternative rings and services will be limited to the "account," "container" and "object" rings and services. The account as shown in FIG. 10, as well as other rings and services, are consistent whether or not they are deployed on a logical structure within a single cluster, such as the structure illustrated in FIG. 10, or are arrayed across a multi-zone system, such as the structure illustrated in FIG. 9. When reference is made to the proxy 804, the rings 806, the services 808, 810, or 812, or the storage pools 814, equivalent structures are also contemplated within each zone 850a-n (specifically the proxies 854a-n, the rings 856a-n, the object/container services 858a-n, and the storage pools 860a-n). Similarly, equivalent structures to the proxy 804 and the rings 806 are contemplated relative to the multi-zone proxy 862 and the multi-cluster ring 864.

The components of the exemplary object storage service 800 and some of their functions will now be described in detail relative to various embodiments.

The Rings 806

As discussed above, the rings 806 are implemented in a tailored electrical circuit or as software instructions to be used in conjunction with a processor to create a hardware-software combination that implements the specific functionality described herein. To the extent that software is used to implement the rings, it may include software that is stored on a computer-readable medium location in the storage management server 816 and/or the storage servers 818. Referring back to FIG. 2, the rings 806 include semiconductor circuits and/or computer-executable instructions that, when executed by a processor, provide subsystems of the object storage service 800 that provide a mapping between the entities stored in the object storage service 800 and the locations of those entities in the storage pools 814. In the illustrated embodiment, the object storage service 800 includes a separate object ring 806*a*, container ring 806*b*, and account ring 806*c*, and when components of the object storage service 800 need to perform any operation on an object, container, or account, those components interact with the object ring 806*a*, container ring 806*b*, and account ring 806*c*, respectively, to determine the location of that stored entity in the storage pools 814. However, one of skill in the art will recognize that different ring structures may be provided (e.g., a single ring for the objects, containers, and accounts, more than one ring for each of the objects, containers, and account, etc.) without departing from the scope of the present disclosure. The rings 806 maintain the availability and safety of data in the object storage service 800 through the use of zones, partitions, replicas, and the storage pools 814, as described below.

In one embodiment, availability zones are defined across one or more of the storage pools 814 that are subject to a correlated loss of access or data as a result of a particular event. In addition, zones can be used for identification and management of other aspects of the system, such as the use of specific storage technology. One of skill in the art will recognize that the examples of zones provided above are not limiting, and a variety of zones known in the art will fall into the scope of the present disclosure.

Logically, a partition is an abstract storage bucket. As discussed in further detail below, the object storage service 800 maps each partition to a plurality of storage pools 814 that are in different zones, and stores data using those partitions. The mapping of a given partition to a plurality of storage pools 814 creates a plurality of partition replicas of that partition (e.g., equal to the number of storage pools 814 the partition is mapped to.) For example, when a given partition is mapped to 3 storage pools 814 that are in different zones, 3 partition replicas of that partition are created.

The object ring 806*a* for the management of objects will be described in detail below. However, one of skill in the art will recognize how the discussion may be applied to the container ring 806*b*, the account ring 806*c*, and/or a ring for any other stored entity, without departing from the scope of the present disclosure.

In various replicated, network-based object storage services, an object from a user is received by a proxy. To determine where the object should be stored, some attribute of the object or the object data itself is hashed. If necessary, some attribute of the object is modified so that three different results are returned from the hashing function. The object is then replicated and stored in the storage pool corresponding to the number returned by the hash function.

Under typical circumstances, a consistent hashing function is used as the hash function. The use of the consistent hashing function ensures that there will be minimal changes to the assigned storage pools given a change in membership due to adding or removing new storage pools.

Although the consistent hashing function results in minimal changes to the storage location, sometimes the assignments made by the consistent hashing function or the rearrangements needed due to a change in membership may have undesirable storage characteristics. For example, such methods have been found to result in multiple object replicas for the same object being stored in one or more storage pools that are in the same zone. As discussed above, this is undesirable because then multiple (and possibly all) object replicas for the same object are subject to being lost as a result of a particular event. Alternatively, rebalancing the replicas due to a change in membership has been found to require the movement to two of the replicas 4% of the time, and the movement of all three replicas 1% of the time. It is desirable to never have to move more than one replica at a time.

Figure 11:
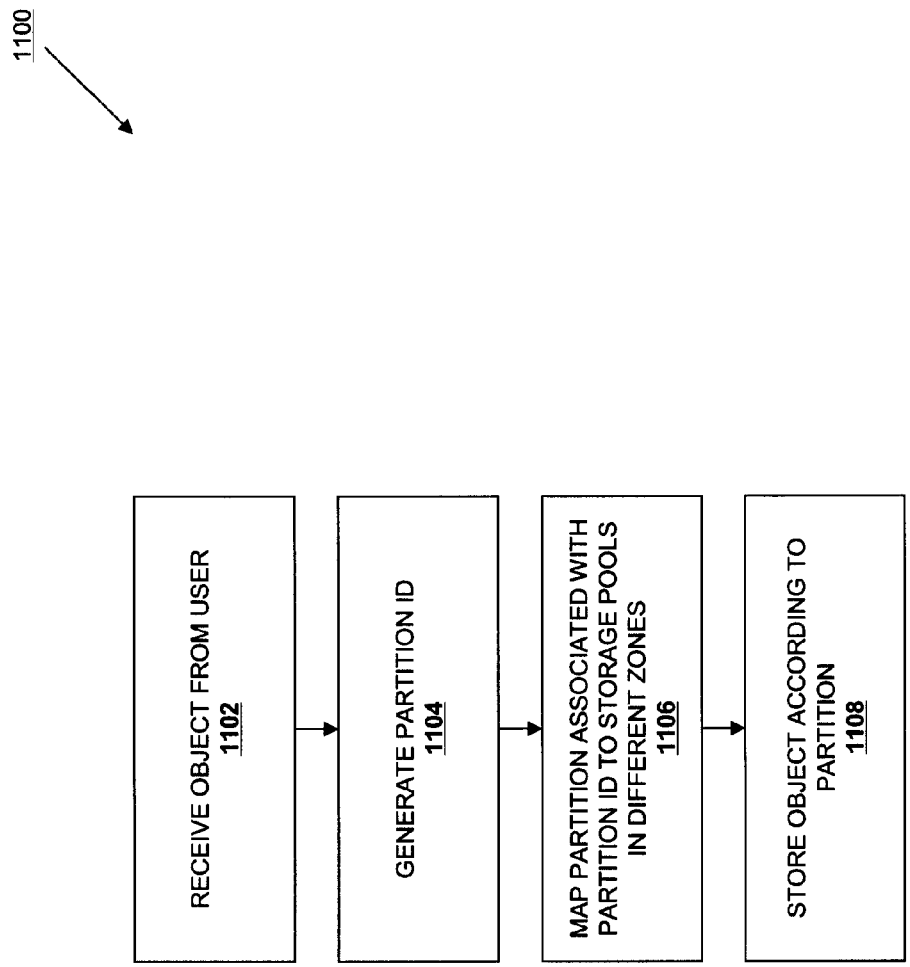
FIG. 11 is a flow chart illustrating a method for storing an object according to one embodiment.

In one embodiment, the object storage service 800 solves the problem of multiple object replicas for the same object being stored in storage pools that are in the same zone through the use of the rings 806. Referring now to FIG. 11, a method 1100 for storing stored entities is illustrated. At block 1102, an object us received by a user. In one embodiment, an object is received from the user 802 by the proxy 804. The method 1100 then proceeds to block 1104 where a partition identification is generated. In one embodiment, a consistent hash function is applied to the object received in block 1102, and the hash function returns a partition identification that corresponds to a partition. The method 1100 then proceeds to block 1106 where the partition associated with the partition identification is mapped to storage pools that are in different zones. This mapping function is constrained so that the physical location of the storage pools is required to have one or more desirable properties, such as having each partition replica in a separate zone.

There are various embodiments of the constrained mapping function. In one embodiment, the constrained mapping function is the output of a constraint satisfaction solver, in which the desired storage characteristics (such as the requirement that each replica of a partition be in a different availability zone) are inputs to the solving function. The solver then uses one or more search methodologies within the solution space to find a storage layout that maps partitions to storage pools in a desirable manner.

In a second embodiment, a constrained mapping function is applied to portions of the partition identification (e.g., the portions of the partition identification that the constrained mapping function is applied to) may be bits of the output of the original hashing function is applied to the object. For example, the number of bits to which the constrained mapping function is applied may be known as the partition power, and 2 to the partition power may indicate the partition count. The constrained mapping function is designed to return a storage pool location for each portion of the partition identification to which it is applied, and the storage pool locations returned for a given partition identification will each correspond to storage pools 814 in different zones. These storage pool locations are then associated with the partition identification. Thus, the partition corresponding to the partition identification is replicated multiple times in the object storage service 800 (i.e., a partition replica is included in each storage pool corresponding to the storage pool locations determined from the constrained mapping function.) The method 1100 then proceeds to block 1108 where the object is stored according to the partition. The object received by the user 802 in block 1102 of the method 1100 may then be stored according to the partition corresponding to the partition identification, which results in multiple object replicas for the object being stored in storage pools that are in different zones in the object storage service 800. In another embodiment, the constrained mapping function is used to determined storage pool locations that are in different zones for each partition prior to the object being received by the user 802, discussed in further detail below.

The output of the constrained mapping function signifies a particular storage pool where a replica of the partition should be stored. An example of this output is as follows: When an object is received from the user 802 at block 1102 of the method 1100, and at block 1104 of the method 1100, a hash function is applied to the object. In one exemplary embodiment, the user 802 provides data including an account/container/object name to the proxy 804, and a hash function is applied to the account/container/object name as follows:

Hash function (account/container/object name) ==123456789

Where 123456789 is the partition identification that is returned by the hash function. At block 1106 of the method 1100, the partition mapping number may then be divided into 3 parts (e.g., the first three digits, the second three digits, and the third three digits of the partition identification,) and the constrained mapping function is applied to each of those parts:

Constrained mapping function (123)==storage pool location (zone 1)

Constrained mapping function (456)==storage pool location (zone 7)

Constrained mapping function (789)==storage pool location (zone 3)

As discussed above, the constrained mapping function is designed to return the storage pool location (zone 1), storage pool location (zone 7), and storage pool location (zone 3) that correspond to storage pools that are in different zones (e.g., zones 1, 3, and 7). The storage pools locations are then associated with the partition identification:

Partition identification: (storage pool location (zone 1), storage pool location (zone 7), storage pool location (zone 3)

Thus, the partition corresponding to the partition identification is replicated across storage pools that are in different zones (here, zones 1, 3, and 7.) At block 1108 of the method 1100, the object received from the user 802 is then stored, using the partition corresponding to the partition identification, in each of the storage pools corresponding to the storage pool locations returned by the application of the constrained mapping function to portions of the partition identification. Thus, 3 replicas of the object received from the user 802 are stored in the object storage service 800 in storage pools that are located in different zones (zones 1, 3, and 7.) In one embodiment, each of the storage pool locations are IP addresses, i.e., when each of the storage pools are separate storage servers. In one embodiment, the constrained mapping function is a hash function. However, one of skill in the art will recognize that a variety of functions may be used to ensure that each partition is mapped to storage pools that are in different zones without departing from the scope of the present disclosure.

In another embodiment, the constrained mapping function is applied to the object storage service 800 before the object is received by the user 802 at block 1102 in order to accomplish the mapping of the partitions to storage pools described above with reference to block 1106 of the method 1100. For example, the total number of partitions and the total number of storage servers/storage pools in the object storage service 800 may (and typically will) be known. With that knowledge, the constrained mapping function is used to map each partition in the object storage service 800 to a plurality of storage pools that are in different zones, and that information is stored in a constrained mapping database. For example, a constrained mapping database may include partitions mapped to storage pools such as:

Partition 1: storage pool location (zone 1), storage pool location (zone 2), storage pool location (zone 3)

Partition 2: storage pool location (zone 4), storage pool location (zone 5), storage pool location (zone 6)

Partition 3: storage pool location (zone 7), storage pool location (zone 8), storage pool location (zone 9)

In one embodiment, the output of the constrained mapping function can be saved for optimized lookup. For example, the saved output may be embodied in a file provided to each of the storage pools 814, or stored in a database that is available for the appropriate systems to query. If the saved output is contained within a file, the storage pools 814 may then periodically check the modification time of this file and reload their in-memory copies of the ring structure as needed.

Thus, when an object is received from a user 802 at block 1102, the hash function is applied to that object to get the partition identification (e.g., partition 1, 2, or 3 in the example above) at block 1104, and then at block 1106, the partition identification may then be used with the constrained mapping database to determine the corresponding partition and its associated storage pool locations. This embodiment allows the processing necessary to map partitions to multiple storage pools in different zones to be conducted before objects are received from users so that such processing does not have to be conducted each time an object is received from a user.

Figure 12:
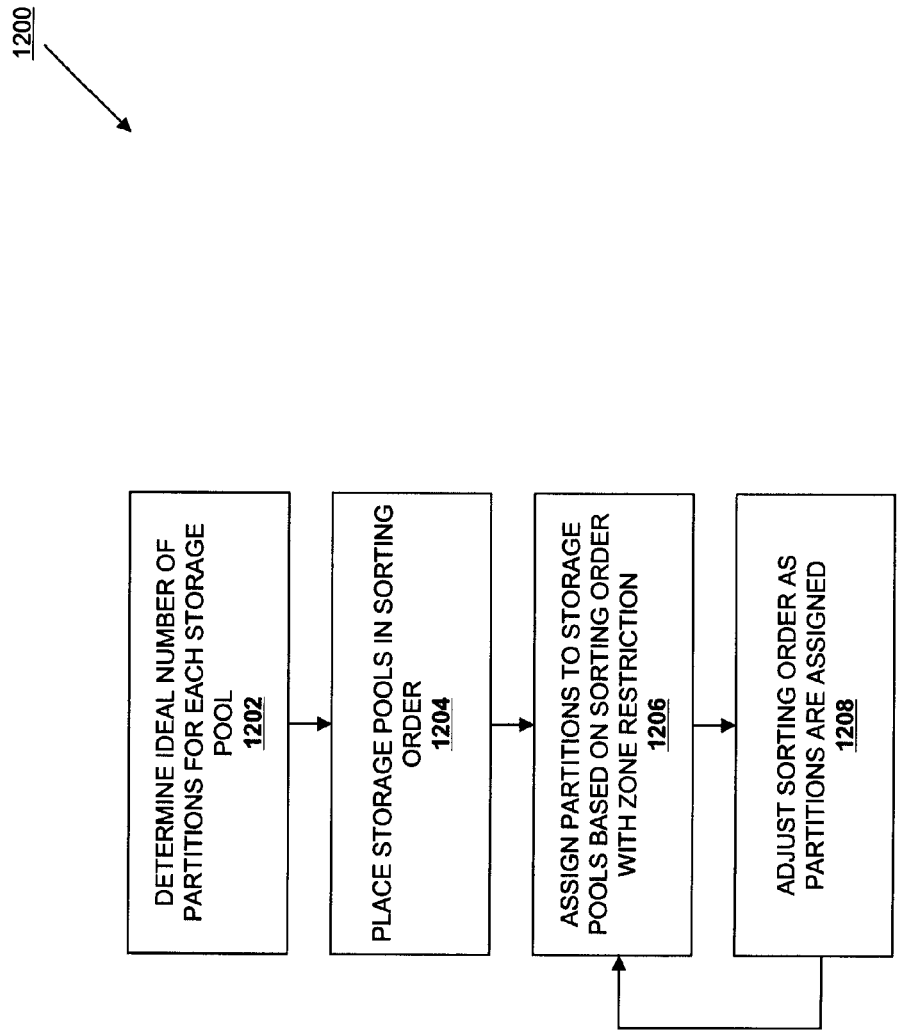
FIG. 12 is a flow chart illustrating an embodiment of a method for creating a ring according to one embodiment.

For example, referring now to FIG. 12, a method for building a ring 806 is illustrated. At block 1202, an ideal number of partitions for each storage pool in the object storage service is determined. In one embodiment, the number of partitions that should ideally be assigned to each storage pool 814 is calculated based the weight (e.g., storage capacity) of each storage pool 814. For example, if the partition power is 20, the ring 806 will have 1,048,576 ($2^{20}$) partitions. If there are 1,000 storage pools 814 of equal weight, each storage pool 814 will ideally be assigned 1,048.576 partitions. This may be referred to as an ideal partition count, and in the example, each storage pool 814 starts off empty with a 1,048.576 ideal partition count. The method 1200 then proceeds to block 1204 where the storage pools are placed in a sorting order. In one embodiment, the storage pools 814 are placed in a sorting order based on their ideal partition count (e.g., highest to lowest), and this sorting order is maintained throughout the method 1200 as partitions are assigned storage pools 814. The method 1200 then proceeds to block 1206 where partitions are assigned to storage pools based on their sorting order but with a zone restriction. In one embodiment, the partitions are assigned to the storage pool 814 with the highest ideal partition count, but subject to the restriction that the storage pool 814 to which a partition is being assigned is not in the same zone as any other storage pool 814 that includes a partition replica for that same partition. The method 1200 then proceeds to block 1208 where the sorting order of the storage pools is adjusted. In one embodiment, once a partition is assigned to a storage pool 814, that storage pool 814 will have its ideal partition count decremented and thus that storage pool 814 is moved to a lower position in the sorting order, and the method 1200 then returns to block 1206 to continue to assign partitions to storage pools based on their sorting order but with the zone restriction. In such a manner, each partition is assigned multiple storage pools 814 in different zones, and thus objects received from users may have multiple object replicas stored in storage pools in different zones simply by associating those objects with the partitions.

As mentioned above, another problem relates to the rebalancing of object replicas stored in the object storage service due to changing membership (i.e., adding or subtracting storage servers or storage pools from the object storage service.)

Such methods have been found to require the moving of multiple object replicas of the same object in response to a membership change, which is undesirable.

In one embodiment, the mapping of partitions to multiple storage pools in different zones in the object storage service 800 described above solves these problems. The use of the constrained mapping function to ensure that each partition is mapped to storage pools in different zones ensures that object replicas for the same object are never located in storage pools 814 that are in the same zone (i.e., because any given object received from a user is stored in a partition that is replicated in storage pools that are in different zones.) For example, with each storage server 816 defined as a separate zone, the addition or subtraction of a given storage server 816 from the object storage service 800 thus can only effect one partition replica, and hence one object replica of a given object (i.e., because only one of the partition replica will ever be located on a storage server that is defined as a separate zone.) In similar fashion, the rebalancing associated with changing the zone membership can be accomplished without affecting more than one replica because each zone is guaranteed to only contain one replica of a given partition.

Figure 13:
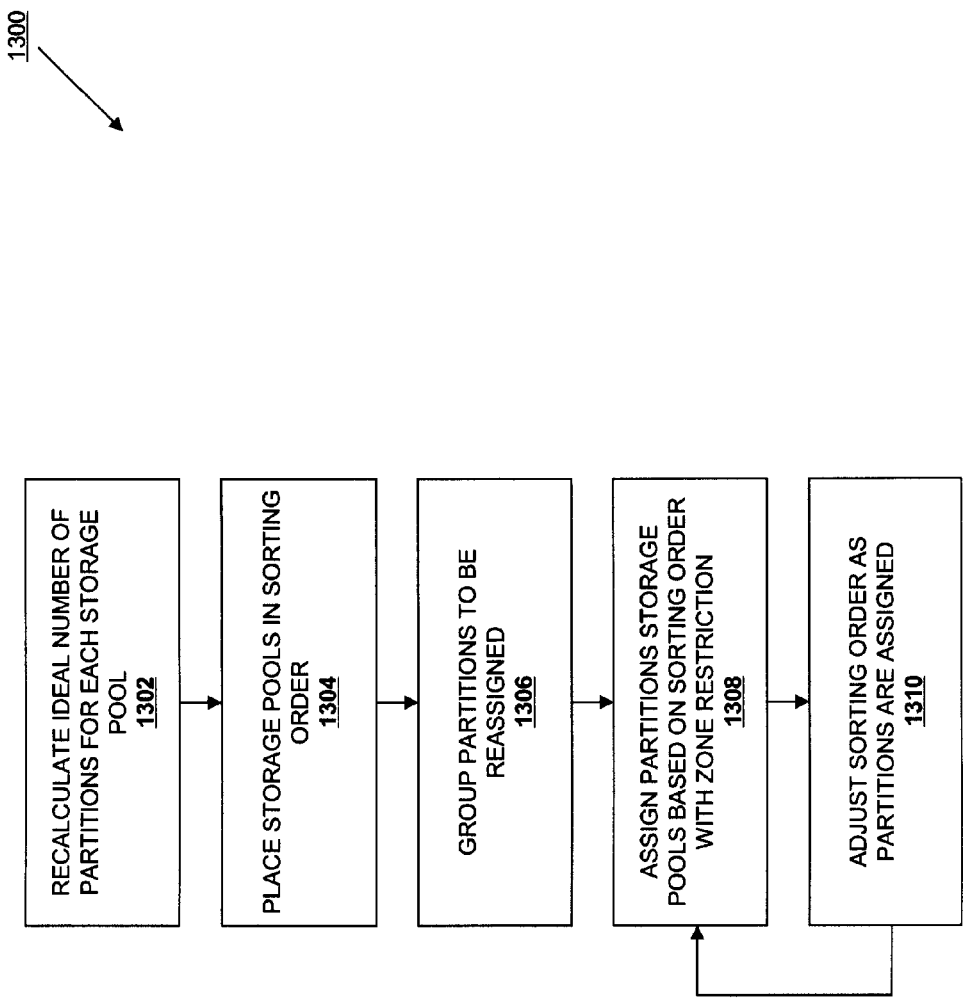
FIG. 13 is a flow chart illustrating an embodiment of a method for reassigning partitions in a ring according to one embodiment.

Periodically, partitions may need to be reassigned to different storage pools 814, and the reassignment of partitions will result in the building of a new ring from an old ring. Such an event may occur due to the removal and/or addition of a storage pool 814 from the object storage service 800 (e.g., a membership change.) Referring now to FIG. 13, a method 1300 for reassigning partitions in response to the removal of a storage pool is illustrated. The method 1300 begins at block 1302 where the ideal number of partitions for each storage pool is recalculated. In one embodiment, the ideal partition count for the storage pools 814 remaining in the object storage service 800 (subsequent to the removal of a storage pool) is recalculated. The method 1300 then proceeds to block 1304 where the storage pools are placed in a sorting order as described above with reference to block 504 of the method 500. The method then proceeds to block 1306 where partitions to be reassigned are grouped. In one embodiment, a partition list for the partitions to be reassigned is created. For example, any storage pools 814 that have been removed from the filesystem 800 may have all their assigned partitions unassigned and added to the partition list, and any storage pools 814 that have more partitions than their ideal partition count may have random partitions unassigned from them and added to the partition list (i.e., such that those storage pools have a number of partitions that is within a predetermined amount of their ideal partition count.) The partitions on the partition list may then be reassigned to the storage pool 814 in blocks 1308 and 610 of the method 1300 substantially as discussed above with reference to blocks 506 and 508 of the method 500. In one embodiment, at block 1308 of the method 1300, whenever a partition is reassigned to a storage pool 814, the time of the reassignment is recorded. Reassignment times may be used when gathering partitions to reassign to storage pools 814, such that no partition replica for a given partition is moved twice in a predetermined amount of time. However, such reassignment restrictions based on reassignment times may be ignored for partition replicas on storage pools 814 that have been removed from the object storage service 800, as removing a storage pool 814 only happens upon storage pool 814/storage server 816 failure and thus requires the reassignment of the partitions.

In one embodiment, the method 1300 is conducted periodically to help balance the amount of data stored by storage pools 814 in the object storage service 800. For example, the partition reassignment method 1300 discussed above may repeated until each storage pool 814 is within a predetermined threshold of a predetermined storage capacity (e.g., within 1% of 130% storage capacity for that storage pool) or when it is determined that partition reassignment will not improve the balance of data stored by the object storage service 800 by more than a predetermined amount. For example, if a first storage server 816 includes 2 TB of storage, a second storage server 816 includes 4 TB of storage, and a third storage server 816 includes 6 TB of storage, data balancing may be conducted to ensure that each of the storage servers 818 holds the same percentage of its storage capacity (i.e., the first storage server 816 holds 0.66 TB of data, the second storage server 816 holds 1.33 TB of data, and the third storage server 816 holds 2 TB of data such that each of the storage servers 818 is at 33% of its storage capacity.) Weights may be applied to storage servers 818 to balance the distribution of data on the storage servers 818 in the object storage service 800 to account for different storage capacities.

Those of skill in the art will recognize that the constrained mapping within the rings 806 are modifiable to deal with more than issues of availability. Even though the embodiment above has been described in terms of availability zones, any type of zone can be used for the mapping from partition to storage device.

In some implementations the constrained mapping is extensible via a plugin mechanism. The constrained mapping function is a rule-based hash, and so it can be extended similarly to other rule-based plugin mechanisms described herein. In one embodiment, the ring 806 has an API by which mapping rules can be set by user 802. In a second embodiment, a series of rules can be provided and loaded by the ring 806. This loadable ruleset can be implemented using a dynamically loadable or runnable program that has a series of expected inputs and provides its information on a defined series of outputs. In one embodiment these are "stdin" and "stdout." In a second embodiment, these are provided as function calls within a program module. When set of partitions is provided to the plugin, the constrained mapping function logically associates it with a particular resource and assigns the virtual partition to the applicable physical resource. When a request arrives addressed to that resource, the tenant-defined rules and filters are applied to the request and the appropriate object is uploaded, downloaded, edited, or redirected accordingly. In a further embodiment, the API provided to the user 802 is sufficient to for the user to direct the creation of the ring structure via interaction with a remote, user-controlled entity on the network.

There are two levels at which the user can direct the allocation of underlying resources via the plugin mechanism. At a first, high level, the user can present weights, correlations, or affinities between different groups of resources so that an underlying cloud-provider-specific ring generation function can take those into account. In a second embodiment, the user can have direct control over the allocation of storage resources and those can be mapped onto available physical resources provided by the cloud provider. Plugging into the constraint mapping portion of the ring generation function is sufficient for both levels of control, but it is anticipated that different cloud providers will favor or provide one level of control over another.

Object Service 808

As discussed above, the object service 808 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 816 and/or the storage servers 818. The object service 808 may include instructions that, when executed by a processor, provide object storage and objection manipulation functionality such that the object service 808 is operable to, for example, store, retrieve and delete stored objects in the storage pools 814. In one embodiment, an object service 808 is provided for each storage pool that holds object data. For example, an object service 808 may be included on a server that further includes one or more storage drives that provide a storage pool for objects. In one embodiment, the objects are stored as binary files with metadata stored as extended attributes of the file in the filesystem used by the object storage service. In such an embodiment, the object service 808 will uses the extended attributes of the filesystem to manage the metadata. In a second embodiment, the metadata is stored in a machine-readable format next to the data itself. For example, the metadata for a file is stored in a text file or single file database.

In one embodiment, subsequent processing based on file metadata is also pluggable by the end user. For example, one embodiment stores different sets of files and associates them with the same URL. An ordinary operation to read or modify the object could also have a "processor" function associated with it that allows for user-directed modification or logging of the request.

In one embodiment, objects are stored by the object service 808 using a path derived by applying a hash function to the name of the object along with a timestamp. For example, an incoming object for a user account to be written to a container will have a hash applied to its account/container/object name and the path generated for the object is:
/objects/<partition>/<storage pool location>/objectname_hash.15673.data
where "objects" indicate that the object data is stored in an object storage pool 814, <partition> is the partition identification that maps the object to a partition, <storage pool location> is the storage pool location that maps the partition replica to a storage pool 814 in a different zone than its related partition replicas, objectname_hash is the hash of the account/container/object name, and 15672 is the timestamp.

When there is a request for an object, the object storage service 800 will find all the object replicas in the object storage service 800 that include the objectname_hash and return the object data that has the most recent timestamp value. Special care is needed to record updates that should be persisted as the new canonical value. For example, when an object replica is deleted, a modification sentinel (e.g., a 0 byte "tombstone" file or ".ts" file) is written to the storage pool 814 where the deleted object replica was located and that includes the same objectname_hash as the deleted object replica (i.e., /objectname_hash.15784.ts,) and that tombstone file stays in the object storage service 800 for a predetermined amount of time (e.g., 7 days.) During object replication, discussed in further detail below, when the object storage service 800 encounters a tombstone file, the object storage service 800 checks whether the tombstone file has been in the system for 7 days. If not, the object storage service 800 searches for and deletes any object replicas that it finds related to that tombstone file (e.g., replicas that same objectname_hash as the tombstone file) to ensure that objects that were meant to be deleted from the object storage service 800 are removed and older versions of object replicas of a given object do not appear in the object storage service 800 due to, for example, the temporary failure of a storage server 816 or storage pool 814 that might have prevented the deletion of that object replica previously. If the object storage service 800 determines that a tombstone file has been in the object storage service 800 for longer than the predetermined time, that tombstone file is deleted.

The mechanism used for recording file deletion is also used to record other types of updates. For example, a "purge" marker indicates that the system should overwrite all copies of the object and set the space to free; a "version" marker indicates that the system should create a copy and mark the copy with a version number; and a "ttl" (time-to-live) marker indicates that the system should check an authoritative source for updates after the expiry of a set time period. Other types of out-of-band changes to the file are also contemplated.

Container Service 810

As discussed above, the container service 810 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 816 and/or the storage servers 818. The container service 810 may include instructions that, when executed by a processor, provide container storage and container manipulation functionality such that the container service 810 is operable to store, retrieve and delete stored containers in the storage pools 814. In one embodiment, a container service 810 is provided for each storage pool that holds container data. For example, a container service 810 may be included on a server that further includes one or more storage drives that provide a storage pool for containers, and the container service 810 may include the names of containers and objects in those containers. Thus, in one embodiment, the container service 810 handles the listing of containers, and does not hold the location where the objects are stored (e.g., the storage pool where a given object replica resides), but rather the locations of containers that hold the objects. The listings for the container locations may be stored as database files, and those listings may be replicated across the storage pools 814 in a manner that is similar to the replication of objects (e.g., through their association with partitions) as discussed above. Container storage statistics for the container service(s) 810 may be tracked by the object storage service 800 and may include total number of objects stored by one or more containers, the total storage provided by any given container, and/or a variety of other statistics known in the art.

Account Service 812

As discussed above, the account service 812 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 816 and/or the storage servers 818. The account service 812 may include instructions that, when executed by a processor, provide account storage and account manipulation functionality such that the account service 812 is operable to store, retrieve and delete stored accounts in the storage pools 814. In one embodiment, an account service 812 is provided for each storage pool that holds account data. For example, an account service 812 may be implemented by a server that includes storage drives that provide a storage pool for accounts, and the account service 812 may include the names of accounts and containers in those accounts. Thus, the account service 812 is very similar to the container service 810, discussed above, with the exception that account storage 812 handles the listings of accounts.

Other Services

As discussed above, other types of services may be implemented in similar fashion to the object, container, and account services described above. For example, one implementation includes an authorization service. The authorization service may include instructions that, when executed by a processor, handle the storage and manipulation of authorization metadata so that the authorization service is operable to store, retrieve, delete, and query stored credentials from in the storage pools 814. In one embodiment, an authorization service provides an ACL-based authorization. In a second embodiment, the authorization service provides posix-compatible authorization. In a third embodiment, the authorization service provides tree or graph-based authorization, such as would be provided with an LDAP-based authorization service.

A second implementation includes a structured data service. The structured data service may include instructions that, when executed by a processor, provide the storage and manipulation of structured data such that the structured data service is operable to store, retrieve, delete, and query tabular, graph, or tree-based data from in the storage pools 814. In one embodiment, a structured data service provides a JSON-based output. In a second embodiment, the structured data service provides XML-based output. In a third embodiment, the structured data service provides HTML output.

Proxy 804

The proxy 804 is implemented in a tailored electrical circuit or as software instructions to be used in conjunction with a processor to create a hardware-software combination that implements the specific functionality described herein. The proxy 804 is responsible for tying together the object storage service 800. For each request received from a user, the proxy 804 determines the location of the account, container, or object in the appropriate ring 806 (e.g., the object ring 806a, the container ring 806b, or the account ring 806c,) and routes the request accordingly. A public Application Programming Interface (API) may be exposed to users through the proxy 804. A large number of failures may be handled by the proxy 804. For example, if a storage server 816 and/or storage pool 814 is unavailable for an object PUT, the proxy 804 may use the rings 806 to determine an appropriate storage server 816 and/or storage pool 814 for that object and route the object there instead.

In another embodiment, there are multiple proxies associated with an object storage service. The existence of multiple proxies may be ascertainable from outside the object storage service, or it may be transparent. Different proxies may be used for different purposes. For example, in one embodiment different proxies are used for different types of files. In another embodiment, different proxies are used for different types of requests. In a third embodiment, an appropriate proxy is chosen to minimize latency, geographic, or network distance between the proxy and the system making the request.

Figure 14:
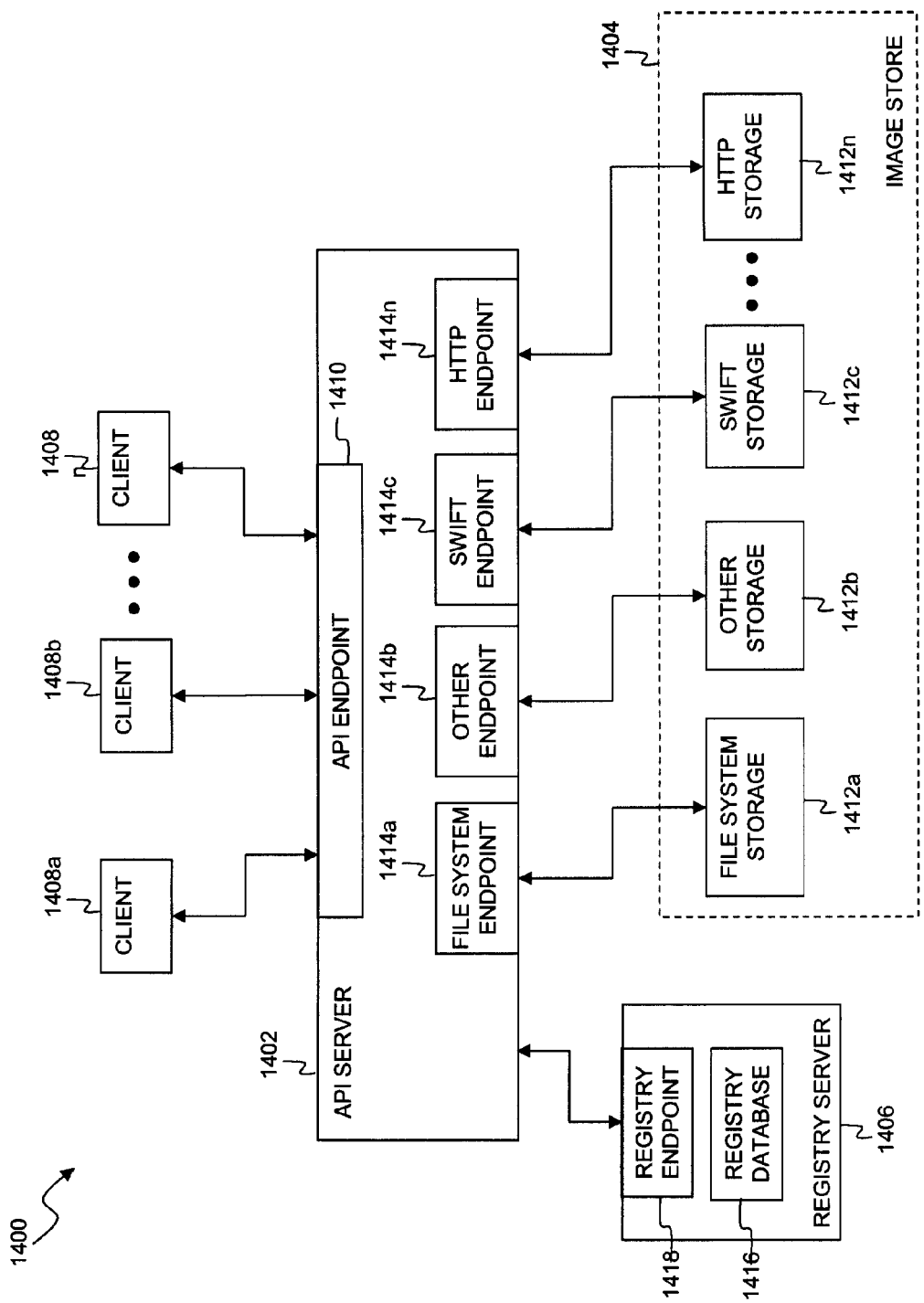
FIG. 14 is a PaaS-style image service according to various embodiments.

FIG. 14 is a functional block diagram of a virtual machine (VM) image service 1400 according to various aspects of the current disclosure. Generally, the VM image service 1400 is an IaaS-style cloud computing system for registering, storing, and retrieving virtual machine images and associated metadata. In a preferred embodiment, the VM image service 1400 is deployed as a service resource 130 in the cloud computing system 110 (FIG. 1). The service 1400 presents to clients of the cloud computing system 110 an endpoint from which the clients may store, lookup, and retrieve virtual machine images on demand.

As shown in the illustrated embodiment of FIG. 14, the VM image service 1400 comprises a component-based architecture that includes an API server 1402, an image store 1404, and a registry server 1406. The API server 1402 is a communication hub that routes VM image requests and data between clients 1408a-n and the image store 1404 and registry server 1406. The image store 1404 is an autonomous and extensible storage resource that stores VM images managed by the service 1400, and the registry server 1406 is a componentized service that stores metadata associated with the managed VM images. In the illustrated embodiment, the API server 1402 includes an "external" API endpoint 1410 through which the clients 1408a-n may programmatically access VM images managed by the service 1400. In that regard, the API endpoint 1410 exposes both metadata about managed VM images and the image data itself to requesting clients. In one embodiment, the API endpoint 1410 is implemented with an RPC-style system, such as CORBA, DCE/COM, SOAP, or XML-RPC, and adheres to the calling structure and conventions defined by these respective standards. In another embodiment, the external API endpoint 1410 is a basic HTTP web service adhering to a representational state transfer (REST) style and may be identifiable via a URL. Specific functionality of the API endpoint 1410 will be described in greater detail below.

The API server 1402 may be implemented in software or in a tailored electrical circuit or as software instructions to be used in conjunction with a processor to create a hardware-software combination that implements the specific functionality described herein. To the extent that software is used to implement the API server 1402, it may include software that is stored on a non-transitory computer-readable medium in an information processing system, such as the information processing system 210 of FIG. 2.

As mentioned above, the VM image service 1400 stores VM images in the image store 1404. In the illustrated embodiment, the image store 1404 is any local or remote storage resource that is programmatically accessible by an "internal" API endpoint within the API server 1402. In one embodiment, the image store 1404 may simply be a file system storage 1412a that is physically associated with the API server 1402. In such an embodiment, the API server 1402 includes a file system API endpoint 1414a that communicates natively with the file system storage 1412a. The file system API endpoint 1414a conforms to a standardized storage API for reading, writing, and deleting VM image data. Thus, when a client 1408 requests a VM image that is stored in the file system storage 1412a, the API server 1402 makes an internal API call to the file system API endpoint 1414a, which, in turn, sends a read command to the file system storage. In other embodiments, the image store 1404 may be implemented with an outside cloud storage 1412b, object storage service storage 1412c, and/or HTTP storage 1412n that are respectively associated with an outside cloud service endpoint 1414b, object storage service endpoint 1414c, and HTTP endpoint 1414n on the API server 1402. In one embodiment, the HTTP storage 1412n may comprise a URL that points to a virtual machine image hosted somewhere on the Internet, and thus may be read-only. It is understood that any number of additional storage resources, such as Sheepdog, a RADOS block device (RBD), a storage area network (SAN), and any other programmatically accessible storage solutions, may be provisioned as the image store 1404. Further, in some embodiments, multiple storage resources may be simultaneously available as image stores within service 1400 such that the API server 1402 may select a specific storage option based on the size, availability requirements, etc of a VM image. Accordingly, the image store 1404 provides the image service 1400 with redundant, scalable, and/or distributed storage for VM images.

Additionally, in some embodiments, the API server 1402 may include a local image cache that temporarily stores VM image data. In such a scenario, if a client requests a VM image that is held in the image cache, the API server can distribute the VM image to the client without having to retrieve the image from the image store 1404. Locally caching VM images on the API server not only decreases response time but it also enhances the scalability of the VM image service 1400. For example, in one embodiment, the image service 1400 may include a plurality of API servers, where each may cache the same VM image and simultaneously distribute portions of the image to a client.

The registry server 1406 stores and publishes VM image metadata corresponding to VM images stored by the system 1400 in the image store 1404. In one embodiment, each VM image managed by the service 1400 includes at least the following metadata properties stored in the registry server 1406: UUID, name, status of the image, disk format, container format, size, public availability, and user-defined properties. Additional and/or different metadata may be associated with VM images in alternative embodiments. The registry server 1406 includes a registry database 1416 in which the metadata is stored. In one embodiment, the registry database 1416 is a relational database such as MySQL, but, in other embodiments, it may be a non-relational structured data storage system like MongoDB, Apache Cassandra, or Redis. For standardized communication with the API server 1402, the registry server 1406 includes a registry API endpoint 1418. The registry API endpoint 1418 is a RESTful API that programmatically exposes the database functions to the API server 1402 so that the API server may query, insert, and delete VM image metadata upon receiving requests from clients. In one embodiment, the registry server 1406 may be any public or private web service that exposes the RESTful API to the API server 1402. In alternative embodiments, the registry server 1402 may be implemented on a dedicated information processing system of may be a software component stored on a non-transitory computer-readable medium in the same information processing system as the API server 1402.

In operation, clients 1408*a-n* exploit the external API endpoint 1410 exposed by the API server 1402 to lookup, store, and retrieve VM images managed by the VM image service 1400. In the example embodiment described below, clients may issue HTTP GETs, PUTs, POSTs, and HEADs to communicate with the API server 1402. For example, a client may issue a GET request to <API_server_URL>/images/ to retrieve the list of available public images managed by the image service 1400. Upon receiving the GET request from the client, the API server sends a corresponding HTTP GET request to the registry server 1406. In response, the registry server 1406 queries the registry database 1416 for all images with metadata indicating that they are public. The registry server 1406 returns the image list to the API server 1402 which forwards it on to the client. For each image in the returned list, the client may receive a JSON-encoded mapping containing the following information: URI, name, disk_format, container format, and size. As another example, a client may retrieve a virtual machine image from the service 1400 by sending a GET request to <API_server_URL>/imageskimage_URI>. Upon receipt of the GET request, the API server 1404 retrieves the VM image data from the image store 1404 by making an internal API call to one of the storage API endpoints 1414*a-n* and also requests the metadata associated with the image from the registry server 1406. The API server 1402 returns the metadata to the client as a set of HTTP headers and the VM image as data encoded into the response body. Further, to store a VM image and metadata in the service 1400, a client may issue a POST request to <API_server_URL>/images/ with the metadata in the HTTP header and the VM image data in the body of the request. Upon receiving the POST request, the API server 1402 issues a corresponding POST request to the registry API endpoint 1418 to store the metadata in the registry database 1416 and makes an internal API call to one of the storage API endpoints 1414*a-n* to store the VM image in the image store 1404. It should be understood that the above is an example embodiment and communication via the API endpoints in the VM image service 1400 may be implemented in various other manners, such as through non-RESTful HTTP interactions, RPC-style communications, internal function calls, shared memory communication, or other communication mechanisms.

In one embodiment, the API server 1402 includes a plugin mechanism that allows for a user-configurable response to image requests. For example, in one embodiment sensitive security information is held by a user outside the scope of the cloud computing system. When a request is made for a generic VM image, the plugin creates a secure connection to a user-controlled endpoint and receives the necessary information from the user's system. The plugin then injects the custom authentication information into the image prior to the image being instantiated. Other embodiments can modify the image or the image request in arbitrary user-defined ways.

Further, in some embodiments, the VM image service 1400 may include security features such as an authentication manager to authenticate and manage user, account, role, project, group, quota, and security group information associated with the managed VM images. For example, an authentication manager may filter every request received by the API server 1402 to determine if the requesting client has permission to access specific VM images. In some embodiments, Role-Based Access Control (RBAC) may be implemented in the context of the VM image service 1400, whereby a user's roles defines the API commands that user may invoke. For example, certain API calls to the API server 1402, such as POST requests, may be only associated with a specific subset of roles.

To the extent that some components described relative to the VM image service 1400 are similar to components of the larger cloud computing system 110, those components may be shared between the cloud computing system and the VM image service, or they may be completely separate. Further, to the extend that "controllers," "nodes," "servers," "managers," "VMs," or similar terms are described relative to the VM image service 1400, those can be understood to comprise any of a single information processing device 210 as described relative to FIG. 2, multiple information processing devices 210, a single VM as described relative to FIG. 2, a group or cluster of VMs or information processing devices as described relative to FIG. 3. These may run on a single machine or a group of machines, but logically work together to provide the described function within the system.

Figure 15:
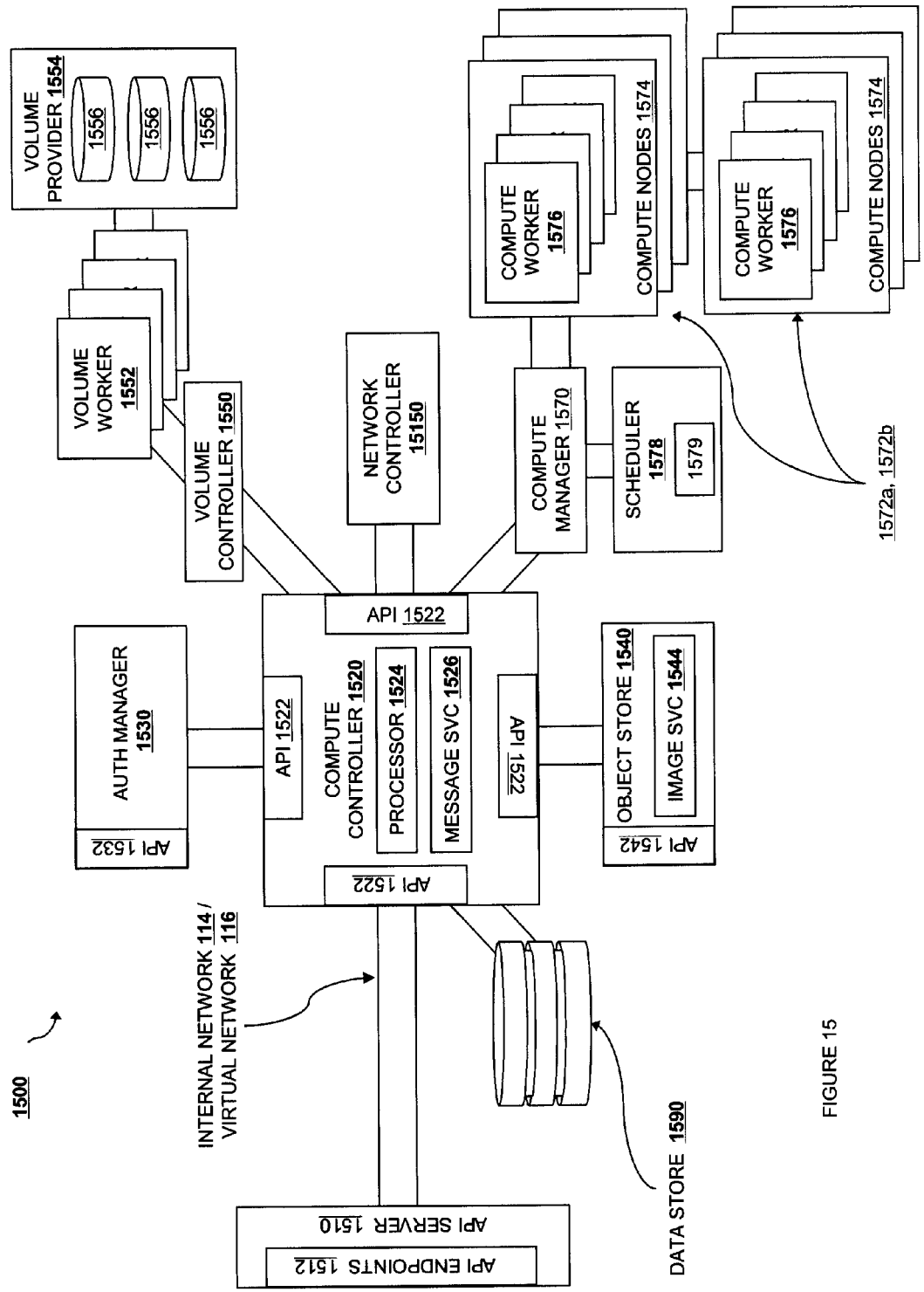
FIG. 15 is an IaaS-style computational cloud service according to various embodiments.

Turning now to FIG. 15, an IaaS-style computational cloud service (a "compute" service) is shown at 1500 according to one embodiment. This is one embodiment of a cloud controller 120 with associated cloud service 130 as described relative to FIG. 1. Except as described relative to specific embodiments, the existence of a compute service does not require or prohibit the existence of other portions of the cloud computing system 110 nor does it require or prohibit the existence of other cloud controllers 120 with other respective services 130.

To the extent that some components described relative to the compute service 1500 are similar to components of the larger cloud computing system 110, those components may be shared between the cloud computing system 110 and the compute service 1500, or they may be completely separate. Further, to the extend that "controllers," "nodes," "servers," "managers," "VMs," or similar terms are described relative to the compute service 1500, those can be understood to comprise any of a single information processing device 210 as described relative to FIG. 2, multiple information processing devices 210, a single VM as described relative to FIG. 2, a group or cluster of VMs or information processing devices as described relative to FIG. 3. These may run on a single machine or a group of machines, but logically work together to provide the described function within the system.

In one embodiment, compute service 1500 includes an API Server 1510, a Compute Controller 1520, an Auth Manager 1530, an Object Store 1540, a Volume Controller 1550, a Network Controller 1560, and a Compute Manager 1570. These components are coupled by a communications network of the type previously described. In one embodiment, communications between various components are message-oriented, using HTTP or a messaging protocol such as AMQP, ZeroMQ, or STOMP.

Although various components are described as "calling" each other or "sending" data or messages, one embodiment makes the communications or calls between components asynchronous with callbacks that get triggered when responses are received. This allows the system to be architected in a "shared-nothing" fashion. To achieve the shared-nothing property with multiple copies of the same component, compute service 1500 further includes distributed data store 1590. Global state for compute service 1500 is written into this store using atomic transactions when required. Requests for system state are read out of this store. In some embodiments, results are cached within controllers for short periods of time to improve performance. In various embodiments, the distributed data store 1590 can be the same as, or share the same implementation as Object Store 800 discussed relative to FIG. 8.

In one embodiment, the API server 1510 includes external API endpoints 1512. In one embodiment, the external API endpoints 1512 are provided over an RPC-style system, such as CORBA, DCE/COM, SOAP, or XML-RPC. These follow the calling structure and conventions defined in their respective standards. In another embodiment, the external API endpoints 1512 are basic HTTP web services following a REST pattern and identifiable via URL. Requests to read a value from a resource are mapped to HTTP GETs, requests to create resources are mapped to HTTP PUTs, requests to update values associated with a resource are mapped to HTTP POSTs, and requests to delete resources are mapped to HTTP DELETEs. In some embodiments, other REST-style verbs are also available, such as the ones associated with WebDav. In a third embodiment, the API endpoints 1512 are provided via internal function calls, IPC, or a shared memory mechanism. Regardless of how the API is presented, the external API endpoints 1512 are used to handle authentication, authorization, and basic command and control functions using various API interfaces. In one embodiment, the same functionality is available via multiple APIs, including APIs associated with other cloud computing systems. This enables API compatibility with multiple existing tool sets created for interaction with offerings from other vendors.

The Compute Controller 1520 coordinates the interaction of the various parts of the compute service 1500. In one embodiment, the various internal services that work together to provide the compute service 1500, are internally decoupled by adopting a service-oriented architecture (SOA). The Compute Controller 1520 serves as an internal API server, allowing the various internal controllers, managers, and other components to request and consume services from the other components. In one embodiment, all messages pass through the Compute Controller 1520. In a second embodiment, the Compute Controller 1520 brings up services and advertises service availability, but requests and responses go directly between the components making and serving the request. In a third embodiment, there is a hybrid model in which some services are requested through the Compute Controller 1520, but the responses are provided directly from one component to another.

In one embodiment, communication to and from the Compute Controller 1520 is mediated via one or more internal API endpoints 1522, provided in a similar fashion to those discussed above. The internal API endpoints 1522 differ from the external API endpoints 1512 in that the internal API endpoints 1522 advertise services only available within the overall compute service 1500, whereas the external API endpoints 1512 advertise services available outside the compute service 1500. There may be one or more internal APIs 1522 that correspond to external APIs 1512, but it is expected that there will be a greater number and variety of internal API calls available from the Compute Controller 1520.

In one embodiment, the Compute Controller 1520 includes an instruction processor 1524 for receiving and processing instructions associated with directing the compute service 1500. For example, in one embodiment, responding to an API call involves making a series of coordinated internal API calls to the various services available within the compute service 1500, and conditioning later API calls on the outcome or results of earlier API calls. The instruction processor 1524 is the component within the Compute Controller 1520 responsible for marshalling arguments, calling services, and making conditional decisions to respond appropriately to API calls.

In one embodiment, the instruction processor 1524 is implemented as described above relative to FIG. 3, specifically as a tailored electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor 1524, running as a discrete operating environment, as a process in an active operating environment, or can be run from a low-power embedded processor. In a second embodiment, the instruction processor 1524 takes the form of a series of interoperating but discrete components, some or all of which may be implemented as software programs. In another embodiment, the instruction processor 1524 is a discrete component, using a small amount of flash and a low power processor, such as a low-power ARM processor. In a further embodiment, the instruction processor includes a rule engine as a submodule as described herein.

In one embodiment, the Compute Controller 1520 includes a message queue as provided by message service 1526. In accordance with the service-oriented architecture described above, the various functions within the compute service 1500 are isolated into discrete internal services that communicate with each other by passing data in a well-defined, shared format, or by coordinating an activity between two or more services. In one embodiment, this is done using a message queue as provided by message service 1526. The message service 1526 brokers the interactions between the various services inside and outside the Compute Service 1500.

In one embodiment, the message service 1526 is implemented similarly to the message service described relative to FIGS. 6a-6c. The message service 1526 may use the message service 140 directly, with a set of unique exchanges, or may use a similarly configured but separate service.

The Auth Manager 1530 provides services for authenticating and managing user, account, role, project, group, quota, and security group information for the compute service 1500. In a first embodiment, every call is necessarily associated with an authenticated and authorized entity within the system, and so is or can be checked before any action is taken. In another embodiment, internal messages are assumed to be authorized, but all messages originating from outside the service are suspect. In this embodiment, the Auth Manager checks the keys provided associated with each call received over external API endpoints 1512 and terminates and/or logs any call that appears to come from an unauthenticated or unauthorized source. In a third embodiment, the Auth Manager 1530 is also used for providing resource-specific information such as security groups, but the internal API calls for that information are assumed to be authorized. External calls are still checked for proper authentication and authorization. Other schemes for authentication and authorization can be implemented by flagging certain API calls as needing verification by the Auth Manager 1530, and others as needing no verification. In one embodiment, the Auth Manager 1530 is implemented similarly to or as a proxy to authn/authz service 700 as described relative to FIG. 7.

In one embodiment, external communication to and from the Auth Manager 1530 is mediated via one or more authentication and authorization API endpoints 1532, provided in a similar fashion to those discussed above. The authentication and authorization API endpoints 1532 differ from the external API endpoints 1512 in that the authentication and authorization API endpoints 1532 are only used for managing users, resources, projects, groups, and rules associated with those entities, such as security groups, RBAC roles, etc. In another embodiment, the authentication and authorization API endpoints 1532 are provided as a subset of external API endpoints 1512.

In one embodiment, the Auth Manager 1530 includes a rules processor 1534 for processing the rules associated with the different portions of the compute service 1500. In one embodiment, this is implemented in a similar fashion to the instruction processor 1524 described above.

The Object Store 1540 provides redundant, scalable object storage capacity for arbitrary data used by other portions of the compute service 1500. At its simplest, the Object Store 1540 can be implemented one or more block devices exported over the network. In a second embodiment, the Object Store 1540 is implemented as a structured and possibly distributed data organization system. Examples include relational database systems—both standalone and clustered—as well as non-relational structured data storage systems like MongoDB, Apache Cassandra, or Redis. In a third embodiment, the Object Store 1540 is implemented as a redundant, eventually consistent, fully distributed data storage service, such as the object storage service 800 described relative to FIG. 8.

In one embodiment, external communication to and from the Object Store 1540 is mediated via one or more object storage API endpoints 1542, provided in a similar fashion to those discussed above. In one embodiment, the object storage API endpoints 1542 are internal APIs only. In a second embodiment, the Object Store 1540 is provided by a separate cloud service 130, so the "internal" API used for compute service 1500 is the same as the external API provided by the object storage service itself.

In one embodiment, the Object Store 1540 includes an Image Service 1544. The Image Service 1544 is a lookup and retrieval system for virtual machine images. In one embodiment, various virtual machine images can be associated with a unique project, group, user, or name and stored in the Object Store 1540 under an appropriate key. In this fashion multiple different virtual machine image files can be provided and programmatically loaded by the compute service 1500. In one embodiment, the image service 1544 is implemented as image service 1400, as described relative to FIG. 14.

The Volume Controller 1550 coordinates the provision of block devices for use and attachment to virtual machines. In one embodiment, the Volume Controller 1550 includes Volume Workers 1552. The Volume Workers 1552 are implemented as unique virtual machines, processes, or threads of control that interact with one or more backend volume providers 1554 to create, update, delete, manage, and attach one or more volumes 1556 to a requesting VM.

In a first embodiment, the Volume Controller 1550 is implemented using a SAN that provides a sharable, network-exported block device that is available to one or more VMs, using a network block protocol such as iSCSI. In this embodiment, the Volume Workers 1552 interact with the SAN to manage and iSCSI storage to manage LVM-based instance volumes, stored on one or more smart disks or independent processing devices that act as volume providers 1554 using their embedded storage 1556. In a second embodiment, disk volumes 1556 are stored in the Object Store 1540 as image files under appropriate keys. The Volume Controller 1550 interacts with the Object Store 1540 to retrieve a disk volume 1556 and place it within an appropriate logical container on the same information processing system 240 that contains the requesting VM. An instruction processing module acting in concert with the instruction processor and hypervisor on the information processing system 240 acts as the volume provider 1554, managing, mounting, and unmounting the volume 1556 on the requesting VM. In a further embodiment, the same volume 1556 may be mounted on two or more VMs, and a block-level replication facility may be used to synchronize changes that occur in multiple places. In a third embodiment, the Volume Controller 1550 acts as a block-device proxy for the Object Store 1540, and directly exports a view of one or more portions of the Object Store 1540 as a volume. In this embodiment, the volumes are simply views onto portions of the Object Store 1540, and the Volume Workers 1554 are part of the internal implementation of the Object Store 1540.

In one embodiment, the Network Controller 1560 manages the networking resources for VM hosts managed by the compute manager 1570. Messages received by Network Controller 1560 are interpreted and acted upon to create, update, and manage network resources for compute nodes within the compute service, such as allocating fixed IP addresses, configuring VLANs for projects or groups, or configuring networks for compute nodes.

In one embodiment, the Network Controller 1560 is implemented similarly to the network service 400 described relative to FIG. 4. The network controller 1560 may use a shared cloud controller directly, with a set of unique addresses, identifiers, and routing rules, or may use a similarly configured but separate service. In another embodiment In one embodiment, the Compute Manager 1570 manages computing instances for use by API users using the compute service 1500. In one embodiment, the Compute Manager 1570 is coupled to a plurality of resource pools 1572, each of which includes one or more compute nodes 1574. Each compute node 1574 is a virtual machine management system as described relative to FIG. 3 and includes a compute worker 1576, a module working in conjunction with the hypervisor and instruction processor to create, administer, and destroy multiple user- or system-defined logical containers and operating environments—VMs—according to requests received through the API. In various embodiments, the certain portions of the overall resource pool 1572 may be organized into clusters, such as clusters 1572a and 1572b. In one embodiment, each resource pool 1572 is organized into a cluster, physically located in one or more data centers in one or more different locations. In another embodiment, resource pools have different physical or software resources, such as different available hardware, higher-throughput network connections, or lower latency to a particular location.

In one embodiment, the Compute Manager 1570 allocates VM images to particular compute nodes 1574 via a Scheduler 1578. The Scheduler 1578 is a matching service; requests for the creation of new VM instances come in and the most applicable Compute nodes 1574 are selected from the pool of potential candidates. In one embodiment, the Scheduler 1578 selects a compute node 1574 using a random algorithm. Because the node is chosen randomly, the load on any particular node tends to be non-coupled and the load across all resource pools tends to stay relatively even.

In a second embodiment, a smart scheduler 1578 is used. A smart scheduler analyzes the capabilities associated with a particular resource pool 1572 and its component services to make informed decisions on where a new instance should be created. When making this decision it consults not only all the Compute nodes across the resource pools 1572 until the ideal host is found.

In a third embodiment, a distributed scheduler 1578 is used. A distributed scheduler is designed to coordinate the creation of instances across multiple compute services 1500. Not only does the distributed scheduler 1578 analyze the capabilities associated with the resource pools 1572 available to the current compute service 1500, it also recursively consults the schedulers of any linked compute services until the ideal host is found.

In one embodiment, either the smart scheduler or the distributed scheduler is implemented using rules engine 1579 and a series of associated rules regarding costs and weights associated with desired compute node characteristics. When deciding where to place an Instance, rules engine 1579 compares a Weighted Cost for each node. In one embodiment, the Weighting is just the sum of the total Costs. In a second embodiment, a Weighting is calculated using a exponential or polynomial algorithm. In the simplest embodiment, costs are nothing more than integers along a fixed scale, although costs can also be represented by floating point numbers, vectors, or matrices. Costs are computed by looking at the various Capabilities of the available node relative to the specifications of the Instance being requested. The costs are calculated so that a "good" match has lower cost than a "bad" match, where the relative goodness of a match is determined by how closely the available resources match the requested specifications.

In one embodiment, specifications can be hierarchical, and can include both hard and soft constraints. A hard constraint is a constraint is a constraint that cannot be violated and have an acceptable response. This can be implemented by having hard constraints be modeled as infinite-cost requirements. A soft constraint is a constraint that is preferable, but not required. Different soft constraints can have different weights, so that fulfilling one soft constraint may be more cost-effective than another. Further, constraints can take on a range of values, where a good match can be found where the available resource is close, but not identical, to the requested specification. Constraints may also be conditional, such that constraint A is a hard constraint or high-cost constraint if Constraint B is also fulfilled, but can be low-cost if Constraint C is fulfilled.

As implemented in one embodiment, the constraints are implemented as a series of rules with associated cost functions. These rules can be abstract, such as preferring nodes that don't already have an existing instance from the same project or group. Other constraints (hard or soft), may include: a node with available GPU hardware; a node with an available network connection over 100 Mbps; a node that can run Windows instances; a node in a particular geographic location, etc.

When evaluating the cost to place a VM instance on a particular node, the constraints are computed to select the group of possible nodes, and then a weight is computed for each available node and for each requested instance. This allows large requests to have dynamic weighting; if 1000 instances are requested, the consumed resources on each node are "virtually" depleted so the Cost can change accordingly.

In a further embodiment, the scheduler can be directly accessed or modified using an API and/or a plugin interface. In one embodiment, a plugin is implemented as a series of loadable and executable rules that can be provided to the compute service 1500 and run by the scheduler as part of its weighting or allocation process. In one embodiment, this loadable ruleset can be implemented using a dynamically loadable or runnable program that has a series of expected inputs and provides its information on a defined series of outputs. In one embodiment these are "stdin" and "stdout." In a second embodiment, these are provided as function calls within a program module.

Figure 16:
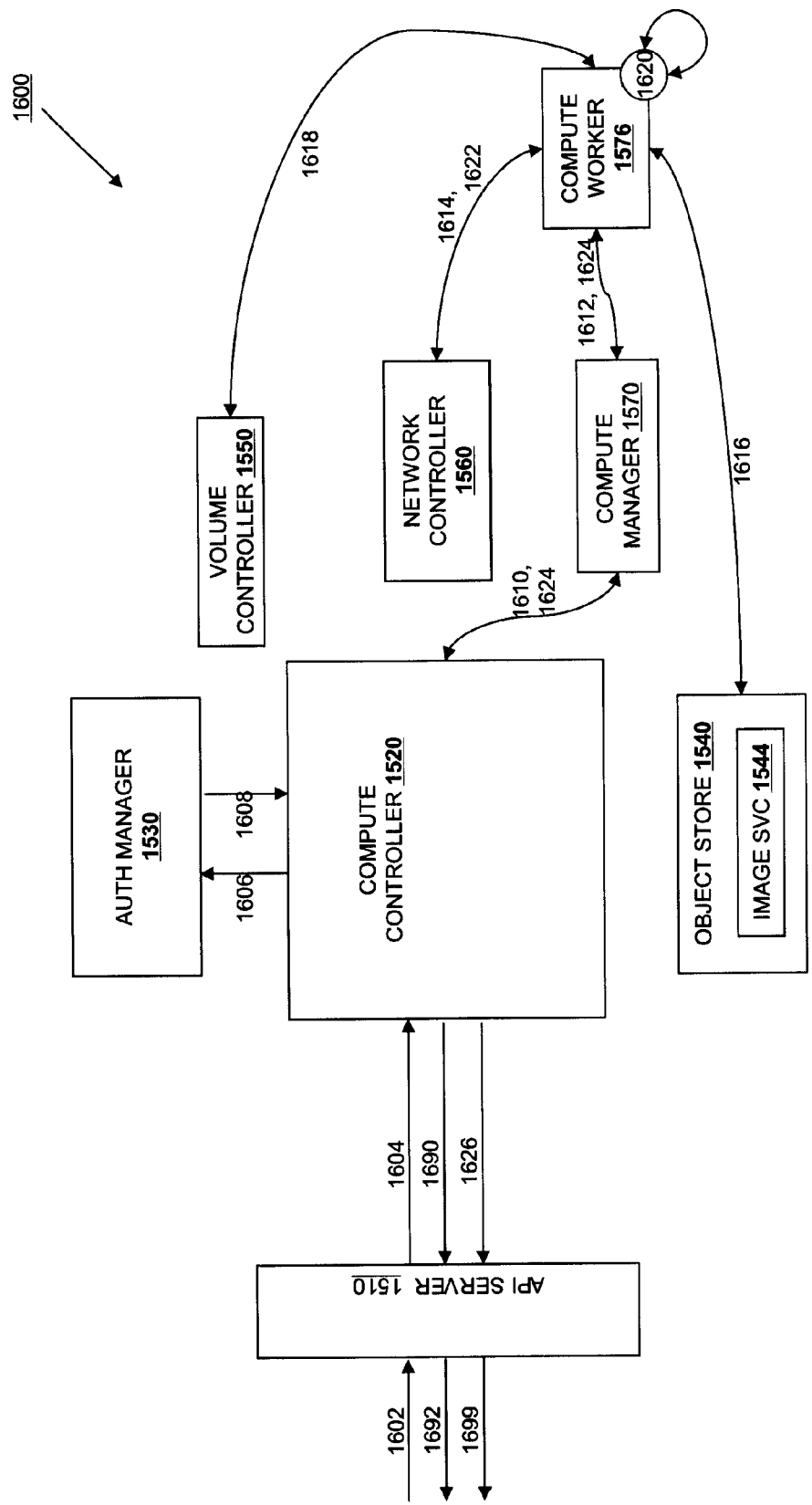
FIG. 16 is an instantiating and launching process for virtual resources according to various embodiments.

Turning now to FIG. 16, a diagram showing one embodiment of the process of instantiating and launching a VM instance is shown as diagram 1600. Although the implementation of the image instantiating and launching process will be shown in a manner consistent with the embodiment of the compute service 1500 as shown relative to FIG. 15, the process is not limited to the specific functions or elements shown in FIG. 15. For clarity of explanation, internal details not relevant to diagram 1600 have been removed from the diagram relative to FIG. 15. Further, while some requests and responses are shown in terms of direct component-to-component messages, in at least one embodiment the messages are sent via a message service, such as message service 1526 as described relative to FIG. 15.

At time 1602, the API Server 1510 receives a request to create and run an instance with the appropriate arguments. In one embodiment, this is done by using a command-line tool that issues arguments to the API server 1510. In a second embodiment, this is done by sending a message to the API Server 1510. In one embodiment, the API to create and run the instance includes arguments specifying a resource type, a resource image, and control arguments. A further embodiment includes requester information and is signed and/or encrypted for security and privacy. At time 1604, API server 1510 accepts the message, examines it for API compliance, and relays a message to Compute Controller 1520, including the information needed to service the request. In an embodiment in which user information accompanies the request, either explicitly or implicitly via a signing and/or encrypting key or certificate, the Compute Controller 1520 sends a message to Auth Manager 1530 to authenticate and authorize the request at time 1606 and Auth Manager 1530 sends back a response to Compute Controller 1520 indicating whether the request is allowable at time 1608. If the request is allowable, a message is sent to the Compute Manager 1570 to instantiate the requested resource at time 1610. At time 1612, the Compute Manager selects a Compute Worker 1576 and sends a message to the selected Worker to instantiate the requested resource. At time 1614, Compute Worker identifies and interacts with Network Controller 1560 to get a proper VLAN and IP address as described in steps 451-457 relative to FIG. 4. At time 1616, the selected Worker 1576 interacts with the Object Store 1540 and/or the Image Service 1544 to locate and retrieve an image corresponding to the requested resource. If requested via the API, or used in an embodiment in which configuration information is included on a mountable volume, the selected Worker interacts with the Volume Controller 1550 at time 1618 to locate and retrieve a volume for the to-be-instantiated resource. At time 1620, the selected Worker 1576 uses the available virtualization infrastructure as described relative to FIG. 2 to instantiate the resource, mount any volumes, and perform appropriate configuration. At time 1622, selected Worker 1576 interacts with Network Controller 1560 to configure routing as described relative to step 460 as discussed relative to FIG. 4. At time 1624, a message is sent back to the Compute Controller 1520 via the Compute Manager 1570 indicating success and providing necessary operational details relating to the new resource. At time 1626, a message is sent back to the API Server 1510 with the results of the operation as a whole. At time 1699, the API-specified response to the original command is provided from the API Server 1510 back to the originally requesting entity. If at any time a requested operation cannot be performed, then an error is returned to the API Server at time 1690 and the API-specified response to the original command is provided from the API server at time 1692. For example, an error can be returned if a request is not allowable at time 1608, if a VLAN cannot be created or an IP allocated at time 1614, if an image cannot be found or transferred at time 1616, etc.

Figure 17:
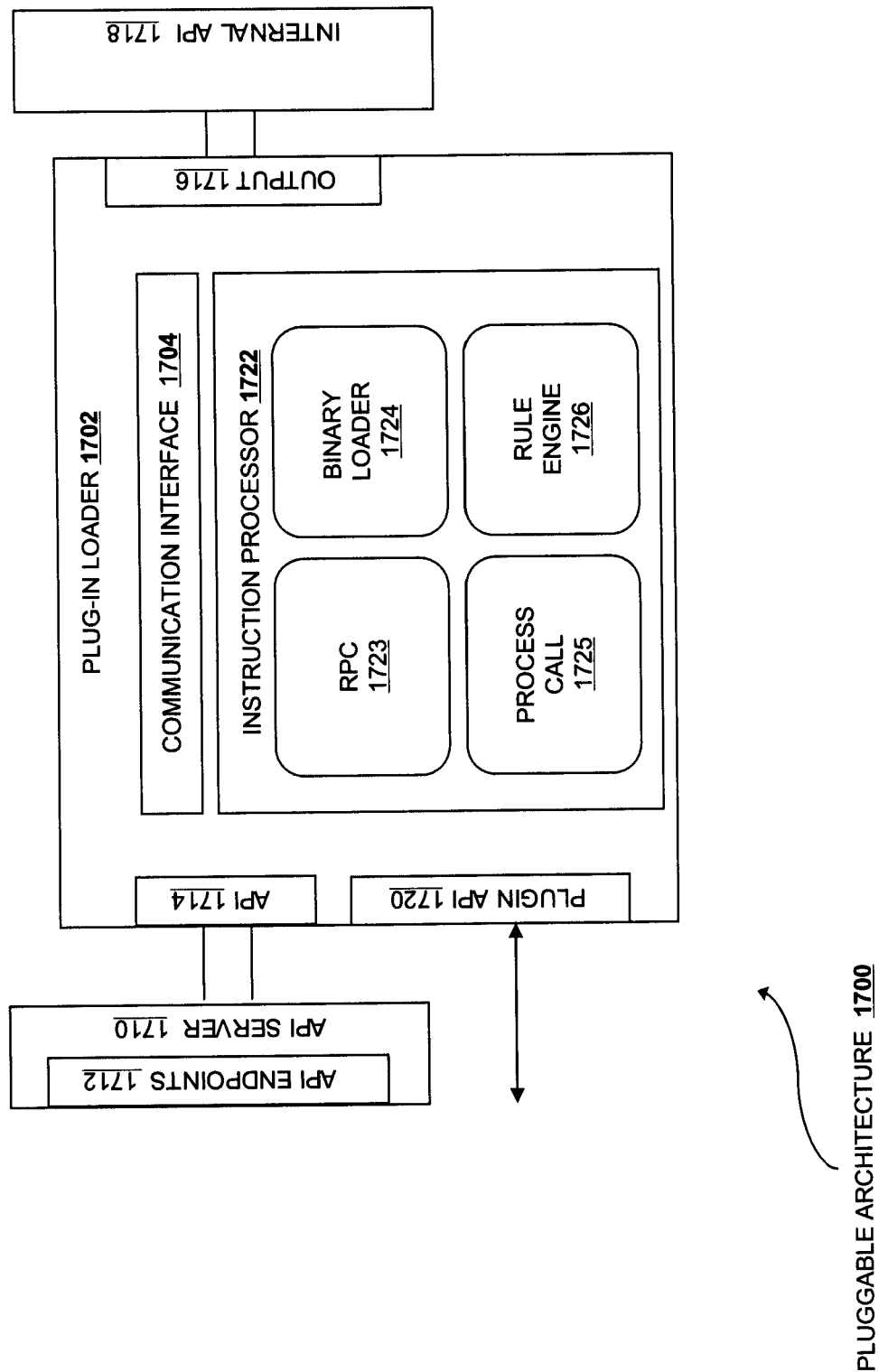
FIG. 17 is an exemplary plug-in facility according to various embodiments.

Various elements have been described as being pluggable, and the operation of particular components in a pluggable fashion has been described relative to the respective underlying systems. A general architecture for pluggability 1700 is described below relative to FIG. 17. Individual adaptation to different systems is contemplated and expected.

In one embodiment, the pluggable architecture 1700 is in-line with an API endpoint 1712. This API endpoint may be internal or external, and may be hosted on a server external to the plug-in architecture 1700 such as API server 1710.

The plug-in loader 1702 coordinates the interaction of the various parts of the plugin system. In one embodiment, the plugin system is disposed between an internal API 1714 and an output 1716 which calls or interacts with an internal system or API, shown in FIG. 17 as internal API 1718. In the event that no plug-in is loaded, calls on the API 1714 are proxied directly through to the output 1716 and from there to the internal API 1718. In this fashion the plug-in system can be transparent to ordinary calls.

If a user wishes to interact with the plugin system 1700, the user interacts with a special plugin API 1720. By means of this plugin API 1720 the plugin system itself can be modified.

In one embodiment, the plugin API is an HTTP API, and it uses the same authentication services as previously described. The HTTP API allows control signals to be set using headers or uploaded with a PUT or POST.

The plugin API 1720 interfaces with the plugin loader 1702. In one embodiment, the plugin loader includes a communication interface 1704 and an instruction processor 1722. The communication interface 1704 allows the plugin system to interact with other remote systems to implement a portion of a plugin. The instruction processor allows various types of plugins to be used by the plugin system 1700.

In particular, one embodiment of the plug-in loader 1702 includes an RPC module 1723, a binary loader module 1724, a process call module 1725 and a rule engine 1726. In one embodiment, the instruction processor 1722 and each submodule is implemented as described above relative to FIG. 3, specifically as a tailored electrical circuit or as software instructions to be used in conjunction with a hardware processor to create a hardware-software combination that implements the specific functionality described herein. To the extent that one embodiment includes processor-executable instructions, those instructions may include software that is stored on a processor-readable medium. Further, one or more embodiments have associated with them a buffer. The buffer can take the form of data structures, a memory, a processor-readable medium, or an off-script-processor facility. For example, one embodiment uses a language runtime as an instruction processor 1722, running as a discrete operating environment, as a process in an active operating environment, or can be run from a low-power embedded processor. In a second embodiment, the instruction processor 1722 takes the form of a series of interoperating but discrete components, some or all of which may be implemented as software programs. In another embodiment, the instruction processor 1722 is a discrete component, such as an embedded hardware processor.

In one embodiment, the RPC submodule 1723 allows direct interaction with a remote service in the implementation of a plugin. In a first embodiment, the plugin is defined completely in the context of the remote system. A call from the internal API 1714 is sent to a specified remote system via an RPC call. This RPC call is sent over the communication interface 1704 and is formatted as an HTTP request, XML-RPC request, SOAP request, COM request, CORBA request, or similar. The remote system (not shown) processes the request based on the arguments and returns a response. The plug-in loader 1702 then proxies the result from the RPC request to internal API 1718 via output 1716.

In one embodiment, the binary loader submodule 1724 is used to load a user-provided script or binary module. Via the plugin API 1720, a user posts the module and entry point information where it is saved in a location accessible to the plug-in loader 1702. A call from the internal API 1714 is sent to the binary loader submodule 1724, which loads the user-provided module and calls the appropriate entry point with the provided arguments. The plugin processes the request based on the arguments and returns a response. The plug-in loader 1702 then proxies the result from the binary loader submodule 1724 request to internal API 1718 via output 1716.

In one embodiment, the binary loader submodule 1725 is used to call a user-provided script or binary module that is run out-of-process. Via the plugin API 1720, a user posts the program and call information where it is saved in a location accessible to the plug-in loader 1702. A call from the internal API 1714 is sent to the process call submodule 1725, which uses the operating system API to load can call the user-provided program with the correct arguments. The plugin processes the request based on the arguments and returns a response. The plug-in loader 1702 then proxies the result from the process call submodule 1725 request to internal API 1718 via output 1716.

Those of skill in the art will recognize that the loadable modules provided to the binary loader submodule 1724 or the process call submodule 1725 may need to be verified, signed, or run in a sandbox or in some type of secure operating environment to avoid issues of privilege escalation or overuse of resources.

In one embodiment, the rule engine submodule 1726 is used to process a user-provided set of rules. Via the plugin API 1720, a user posts a set of processing rules that are evaluated in order via the rule engine 1726. The outcome after all applicable rules have been followed is sent to internal API 1718 via output 1716.

Using the plugin-based architecture allows various advantages over existing systems. The plugin mechanisms described allow the specialization of the system to particular datasets or processing loads, giving better performance and a lower total cost per operation.

In another embodiment, the plugin-based architecture allows multi-zone optimization. By allowing different types of resources in various zones, a user can dictate where various elements of the cloud computing system should be placed. Because the end user has more knowledge concerning the "hot spots" in a particular application, the exact mix of resources available for a particular call can be optimized to the program being run, allowing maximum flexibility and parallel speed when performing all different types of jobs.

In a further embodiment, the plugin-based architecture can change the composition of the processors while a program is being executed, allowing types of optimizations impossible with a fixed set of hardware resources. For example, in a further embodiment, the plugin-based architecture includes user-provided logic to optimize for non-speed considerations, such as cost.

In a further embodiment, the plugins are used as part of a machine learning process. Machine learning is an umbrella term in which one or more algorithms are automatically developed using an interactive process to characterize or optimize a set of inputs. Using machine learning, systems are able to automatically learn to recognize complex patterns and make intelligent decisions based on data. Using the plugin-based architecture described herein, machine learning is used to tune the characteristics and number of hardware resources during a run so as to come closer to the desired parameters. For example, one particular computation may be practicable using either ten very powerful virtual machines, or 100 much weaker virtual machines, or some mix of both. By observing the use of machines over time, a machine learning algorithm can determine that the calculation can be done in the least amount of time using 12 powerful machines and 17 less powerful machines; that it can be performed using the least amount of money using 2 powerful machines and 68 less powerful machines, or that optimizing for the most efficient use of time and money together uses 6 powerful machines and 24 less powerful machines. In this fashion, exposing the underlying APIs via a plugin system allows automatic "on the fly" tuning. Unlike prior art systems, which do not allow for user-directed prioritization, the plugin-based architecture allows higher-dimensional user-directed learning and prioritization.

In one embodiment, the machine learning process runs as another module in instruction processor 1722, on a compute server, or on a dedicated processor. The input to the machine learning process is provided via the API 1714 and sent via the RPC submodule 1723 to the machine learning process. The output of the machine learning process is returned via the RPC submodule 1723 and guides the allocation of machines.

In one embodiment, the plugin-based architecture scheduler selects a host to run a command based on a set of constraints, which are specified as key/value pairs. Different clusters, vendors, or workloads do better with different types of resource allocation, and the plugin-based architecture allows modification of the allocation at a service provider level and at a tenant level. For example, a first embodiment achieves better performance with horizontal allocation, placing each new VM in a new rack, round robin style. A second embodiment achieves better performance with vertical allocation, placing each new VM in the same rack until the rack is full.

In a further embodiment, resources that are in the same project can be placed "next" to each other for better latency. For example, one embodiment uses the plugin architecture to split up a large dataset between background storage pools based upon a user-directed sharding key and then uses the locations of different parts of the dataset to place compute VMs on the same or nearby physical machines, reducing latency and network transit time.

Some of the constraints may be user-specified, and may include both hard and soft constraints. Pluggable architecture for various algorithms may be provided, with the possibility of providing an allocator via an API call or discovering the available constraints that can be specified through API calls.

In one embodiment, the pluggable allocator uses a weighted allocation scheme. This allocator finds a "best fit" VM or storage allocation based upon the available resources and available constraints. The provisioned VM may not necessarily be exactly what was asked, but would instead be provisioned according to a fitness function that evaluated the "best" VM available at the time. In various embodiments, different weights are placed on price, geographic location, proximity to other VMs, particular capabilities (CPU, disk, GPU), network throughput, and latency to a particular location.

In one embodiment, the pluggable allocator uses a dynamic weighting scheme. In this embodiment, the fitness function and weights used to determine the "best" allocation of resources are changed over time. This is done either directly by a user through the plugin API or in response to an equation or change in another value.

In one embodiment, the pluggable allocator uses an auction weighting scheme. In this embodiment, different datacenters, clusters, zones, or other entities "bid" for different VMs, storage resources, or network resources to be allocated to their region. Bidding is used in this embodiment as a method to adaptively find an equilibrium in a distributed system. This allows better balancing between clusters and more optimal utilization. In a further embodiment, price is used in an auction weighting scheme to dynamically balance between vendors.

Those of skill in the art will appreciate that it would be difficult or impossible to have an auction weighting scheme that balances between multiple cloud vendors in a prior art system. Not only would it be difficult to get multiple vendors to work together as closely as required, but the plugin-based architecture is required for different users to input their preferences in a way that makes the system respond appropriately to their desires.

In one embodiment, the pluggable allocator uses an energy-minimization scheme. Multiple zones corresponding to different physical locations are used to optimize energy use. For example, compute-intensive workloads migrate around the globe so that they are always on the nighttime side of the planet. In a second embodiment, hot datacenters shed load to decrease their total energy output.

Further embodiments are contemplated that integrate the plugin-based architecture for more than one service or component. For example, the plugin-based network service can be used in conjunction with the plugin-based authn/authz service to provide a cloud-based virtual private network that incorporates cloud resources but authenticates to a private LDAP server behind a company firewall. In this embodiment, the network service plugin is used to create and route virtual private networks and to encrypt those networks based on a user-defined key or certificate. The authn/authz service uses a plugin to proxy authentication duties to a private LDAP server that is connected via the network service to authenticate users and machines using the VPN.

In a further embodiment, the authn/authz service uses a plugin to provide private RBAC security for consumption by other services. The object storage service uses a plugin to consume the private RBAC security and to modify the response to individual requests based on responses from the authn/authz service.

With each service instrumented and provided with the plugin-based architecture as described above, user-based modification of the cloud system is possible while still maintaining multi-tenant security and availability. Although illustrative embodiments have been shown and described, a wide range of modification, change and substitution is contemplated in the foregoing disclosure and in some instances, some features of the embodiments may be employed without a corresponding use of other features. In particular, the use of multiple plugin-based services to modify the working of an individual cloud computing system or an individual group of resources is contemplated. Accordingly, it is appropriate that the appended claims be construed broadly and in a manner consistent with the scope of the embodiments disclosed herein.

What is claimed is:

1. A cloud computing system, the system comprising:
a compute service, the compute service including a request application programming interface (API), an allocator, and a physical resource pool; the allocator including a processor, a computer-readable storage medium, and a network interface, and a compute plug-in facility; the physical resource pool including a plurality of information processing devices, each information processing device including a processor, a computer-readable medium, and network interface;
a network service logically coupling the request API, the allocator and the physical resource pool, the network service further including a default packet routing policy, a default packet filtering policy, and a network plug-in facility;
wherein the allocator is operative to instantiate one or more virtual resources based on one or more requests received via the request API, and wherein each virtual resource, when instantiated, is associated with one of the plurality of physical resources according to an allocation policy; and wherein there is a default allocation policy;
wherein the compute plug-in facility further comprises a plug-in API, and wherein the compute plug-in facility is operable to modify the allocation policy in response to a request to use a non-default allocation policy via the plug-in API;
wherein the network plug-in facility is operable to modify one of the default packet routing policy and the default packet filtering policy in response to a request to use a non-default routing policy; and wherein the subsequent routing and/or filtering of packets is directed by the non-default packet routing policy; and
wherein the subsequent association of virtual resources with physical resources is directed by the non-default allocation policy.

2. The cloud computing system of claim 1, wherein the default allocation policy is provided by a first party and the non-default allocation policy is provided by a second party.

3. The cloud computing system of claim 2, wherein the physical resource pool is controlled by the first party and resources from the physical resource pool are temporarily provided to the second party.

4. The cloud computing system of claim 1, wherein the virtual resources include one or more of a logical container, an operating environment, and a virtual router.

5. The cloud computing system of claim 1, wherein the default routing policy is provided by a first party and the non-default routing policy is provided by a second party.

6. The cloud computing system of claim 1, wherein the system further comprises an authentication and authorization service.

7. The cloud computing system of claim 6, wherein the authentication and authorization service includes a plug-in facility; and wherein requests received via the request API are authenticated via the plug-in facility.

8. A cloud computing system, the system comprising:
a storage service, a compute service, a network service, and a physical resource pool,
the storage service including a storage request application programming interface (API) and a storage allocator, the storage allocator including a processor, a computer-readable storage medium, and a network interface, and a storage plug-in facility;
the compute service including a compute request API and a compute allocator, the compute allocator including a processor, a computer-readable storage medium, and a network interface, and a compute plug-in facility;
the network service including a default packet routing policy, a default packet filtering policy, and a network plug-in facility;
the physical resource pool including a plurality of information processing devices, each information processing device including a processor, a computer-readable medium, and network interface;
wherein the storage allocator is operative to associate one or more objects accessed via the storage request API with one or more of the plurality of physical resources according to a storage allocation policy; and wherein there is a default storage allocation policy;
wherein the storage plug-in facility further comprises a storage plug-in API, and wherein the storage plug-in facility is operable to modify the storage allocation policy in response to a request to use a non-default storage allocation policy via the storage plug-in API; and wherein the subsequent association of objects with physical resources by the storage allocator is directed by the non-default allocation policy;
wherein the compute allocator is operative to instantiate one or more virtual resources based on one or more requests received via the compute request API, and wherein each virtual resource, when instantiated, is associated with one of the plurality of physical resources according to a compute allocation policy; and wherein there is a default compute allocation policy;
wherein the compute plug-in facility further comprises a compute plug-in API, and wherein the compute plug-in facility is operable to modify the compute allocation policy in response to a request to use a non-default compute allocation policy via the compute plug-in API;

wherein the network plug-in facility is operable to modify one of the default packet routing policy and the default packet filtering policy in response to a request to use a non-default routing policy; and wherein the subsequent routing and/or filtering of packets is directed by the non-default packet routing policy; and wherein the subsequent association of virtual resources with physical resources by the compute allocator is directed by the non-default allocation policy.

9. The cloud computing system of claim 8, wherein the default storage allocation policy is provided by a first party and the non-default storage allocation policy is provided by a second party.

10. The cloud computing system of claim 9, wherein the physical resource pool is controlled by the first party and resources from the physical resource pool are temporarily provided to the second party.

11. The cloud computing system of claim 8, wherein the default compute allocation policy is provided by a first party and the non-default compute allocation policy is provided by a second party.

12. The cloud computing system of claim 11, wherein the physical resource pool is controlled by the first party and resources from the physical resource pool are temporarily provided to the second party.

13. The cloud computing system of claim 8, wherein the default routing policy is provided by a first party and the non-default routing policy is provided by a second party.

14. The cloud computing system of claim 8, wherein the system further comprises an authentication and authorization service.

15. The cloud computing system of claim 14, wherein the authentication and authorization service includes a plug-in facility; and wherein requests received via the storage plug-in API and compute plug-in API are authenticated via the plug-in facility.

16. The cloud computing system of claim 8, wherein the storage allocator is operative to associate one or more objects stored via the storage API with one of the plurality of information processing devices from the physical resource pool; and wherein the storage plug-in facility is operable to modify the compute allocation policy in response to a request to use a non-default allocation policy; and wherein the subsequent association of virtual resources with physical resources minimizes the latency between the virtual resources instantiated by the compute allocator and the objects stored via the storage service.

17. A cloud computing system, the system comprising:

a compute service, a network service, a physical network, and a physical resource pool, the compute service including a compute request API and a compute allocator, the compute allocator including a processor, a computer-readable storage medium, and a network interface, and a compute plug-in facility;

the network service including a default network policy, the default network policy including a default packet routing policy and a default packet filtering policy, and a network plug-in facility, the network plug-in facility including a network plug-in API;

the physical resource pool including a plurality of information processing devices, each information processing device including a processor, a computer-readable medium, and network interface;

the physical network including a plurality of communications media, each communications medium including a physical transport layer and a link transport layer, wherein the communications media are coupled via a plurality of communications routers;

and wherein the compute service, and physical resource pool are coupled via the physical network and logically coupled via the network service;

and wherein the network plug-in facility is operable to modify one of the default packet routing policy and the default packet filtering policy in response to a request received via the network plug-in API to use a non-default network policy; and wherein the subsequent routing and/or filtering of packets is directed by the non-default packet network policy.

18. The system of claim 17 wherein the compute allocator is operative to instantiate one or more virtual resources based on one or more requests received via the compute request API, and wherein each virtual resource, when instantiated, is associated with one of the plurality of physical resources according to a compute allocation policy; and wherein there is a default compute allocation policy; and wherein the compute plug-in facility further comprises a compute plug-in API, and wherein the compute plug-in facility is operable to modify the compute allocation policy in response to a request to use a non-default compute allocation policy via the compute plug-in API; and wherein the subsequent association of virtual resources with physical resources by the compute allocator is directed by the non-default allocation policy.

* * * * *